United States Patent
Inoue et al.

(10) Patent No.: US 10,945,367 B2
(45) Date of Patent: Mar. 16, 2021

(54) COMBINE HAVING A TEMPORARY RETENTION UNIT AND A SHUTTER

(71) Applicant: Kubota Corporation, Osaka (JP)

(72) Inventors: Hirotsugu Inoue, Sakai (JP); Kazuhiro Takahara, Sakai (JP); Hiroshi Ikeda, Sakai (JP); Kazunori Matsufuji, Sakai (JP); Katsuhide Kato, Sakai (JP)

(73) Assignee: Kubota Corporation, Osaka (JP)

( * ) Notice: Subject to any disclaimer, the term of this patent is extended or adjusted under 35 U.S.C. 154(b) by 235 days.

(21) Appl. No.: 16/177,801

(22) Filed: Nov. 1, 2018

(65) Prior Publication Data

US 2019/0069482 A1 Mar. 7, 2019

Related U.S. Application Data

(63) Continuation of application No. 15/730,467, filed on Oct. 11, 2017, now Pat. No. 10,143,132, which is a (Continued)

(30) Foreign Application Priority Data

Mar. 27, 2013 (JP) ................. 2013-067032
Mar. 27, 2013 (JP) ................. 2013-067033
Mar. 27, 2013 (JP) ................. 2013-067034

(51) Int. Cl.
 *A01D 41/127* (2006.01)
 *A01D 41/12* (2006.01)

(52) U.S. Cl.
 CPC ....... *A01D 41/127* (2013.01); *A01D 41/1208* (2013.01); *A01D 41/1272* (2013.01);
 (Continued)

(58) Field of Classification Search
 CPC ............ G01N 33/10; G01N 2021/8592; A01F 12/60; A01D 41/1277; A01D 41/1275;
 (Continued)

(56) References Cited

U.S. PATENT DOCUMENTS 3,714,818 A * 2/1973 Relph ............... G01N 33/10
 73/73
4,403,191 A * 9/1983 Satake ............... G01N 33/10
 324/452
(Continued)

FOREIGN PATENT DOCUMENTS

JP 56128449 A * 10/1981 ............ G01N 33/10
JP 58216943 A * 12/1983 ............ G01N 33/10
(Continued)

*Primary Examiner* — Arpad Fabian-Kovacs
(74) *Attorney, Agent, or Firm* — The Webb Law Firm

(57) ABSTRACT

A combine including a grain tank that retains grain conveyed from a threshing device; a discharge auger; a temporary retention unit within the grain tank that temporarily retains part of the grain and has a discharge port; a quality measurement unit that detects quality of the grain retained in the temporary retention unit; a shutter transitionable between a position where the discharge port is open and a position where the discharge port is closed; a control unit that opens the shutter when the measurement by the quality measurement unit is completed and closes the shutter when all of the grain in the temporary retention unit is discharged; a volume measurement unit that detects the retention volume of the grain retained in the grain tank; and a determination unit that determines whether the retention volume exceeds a predetermined value, and if so, the control unit stops the opening/closing control.

10 Claims, 25 Drawing Sheets

Related U.S. Application Data continuation of application No. 14/780,069, filed as application No. PCT/JP2014/054025 on Feb. 20, 2014, now Pat. No. 9,820,436.

(52) U.S. Cl.
CPC ..... *A01D 41/1274* (2013.01); *A01D 41/1275* (2013.01); *A01D 41/1277* (2013.01)

(58) Field of Classification Search
CPC .............. A01D 41/127; A01D 41/1208; A01D 41/1272; A01D 41/1274
See application file for complete search history.

(56) References Cited

U.S. PATENT DOCUMENTS

| | | | |
|---|---|---|---|
| 4,487,278 A * | 12/1984 | Rosenthal | G01G 19/414 177/1 |
| 4,841,230 A * | 6/1989 | Sugimoto | G01N 27/048 324/689 |
| 5,092,819 A * | 3/1992 | Schroeder | A01D 41/1277 460/7 |
| 5,173,079 A * | 12/1992 | Gerrish | A01F 12/50 460/7 |
| 5,327,708 A * | 7/1994 | Gerrish | A01F 12/00 56/1 |
| 5,751,421 A | 5/1998 | Wright et al. | |
| 5,957,773 A | 9/1999 | Olmsted et al. | |
| 5,991,025 A | 11/1999 | Wright et al. | |
| 6,155,103 A * | 12/2000 | Diekhans | G01N 1/2035 460/114 |
| 6,483,583 B1 | 11/2002 | Wright et al. | |
| 6,845,326 B1 * | 1/2005 | Panigrahi | G01J 3/02 250/339.02 |
| 7,343,262 B2 | 3/2008 | Baumgarten et al. | |
| 7,861,606 B2 * | 1/2011 | Kormann | A01D 41/127 73/863.53 |
| 7,877,181 B2 | 1/2011 | Chervenka et al. | |
| 8,175,775 B2 | 5/2012 | Foster et al. | |
| 9,645,006 B2 | 5/2017 | Phelan et al. | |
| 9,671,273 B2 * | 6/2017 | Emerick | G01G 17/00 |
| 9,702,753 B2 | 7/2017 | Johnson et al. | |
| 2002/0133309 A1 | 9/2002 | Hardt | |
| 2004/0050138 A1 | 3/2004 | Beck et al. | |
| 2006/0046800 A1 | 3/2006 | Kaltenheuser | |
| 2009/0325658 A1 | 12/2009 | Phelan et al. | |
| 2011/0086684 A1 * | 4/2011 | Luellen | A01D 41/1277 460/79 |
| 2012/0253611 A1 | 10/2012 | Zielke et al. | |
| 2013/0102369 A1 | 4/2013 | Johnson et al. | |
| 2013/0317696 A1 | 11/2013 | Koch et al. | |
| 2014/0019018 A1 | 1/2014 | Baumgarten et al. | |
| 2014/0095032 A1 | 4/2014 | Mulder et al. | |
| 2014/0262548 A1 | 9/2014 | Acheson et al. | |
| 2014/0284118 A1 | 9/2014 | Van Mill et al. | |
| 2014/0286731 A1 | 9/2014 | Van Mill et al. | |
| 2014/0326066 A1 * | 11/2014 | Mears | G01F 23/266 |
| 2014/0372166 A1 | 12/2014 | Chanasyk et al. | |
| 2016/0035319 A1 | 2/2016 | Koike et al. | |
| 2016/0041027 A1 * | 2/2016 | Dierneder | G01G 21/244 177/136 |
| 2016/0066507 A1 | 3/2016 | Inoue et al. | |
| 2016/0086032 A1 | 3/2016 | Pickett | |
| 2016/0330906 A1 | 11/2016 | Acheson et al. | |
| 2017/0115211 A1 * | 4/2017 | Morimoto | G01N 21/359 |
| 2018/0058900 A1 * | 3/2018 | Tevs | G01F 23/0061 |
| 2018/0153100 A1 * | 6/2018 | Takahara | A01D 41/1277 |

FOREIGN PATENT DOCUMENTS

| | | |
|---|---|---|
| JP | 4267814 A | 9/1992 |
| JP | 42678114 A | 9/1992 |
| JP | 523039 A | 2/1993 |
| JP | 9103169 A | 4/1997 |
| JP | 1056868 A | 3/1998 |
| JP | 10164967 A | 6/1998 |
| JP | 3186102 B2 | 5/2001 |
| JP | 2002186348 A | 7/2002 |
| JP | 2002223629 A | 8/2002 |
| JP | 2003189733 A | 7/2003 |
| JP | 2003289712 A | 10/2003 |
| JP | 2004129522 A | 4/2004 |
| JP | 200524381 A | 1/2005 |
| JP | 200580549 A | 3/2005 |
| JP | 200587155 A | 4/2005 |
| JP | 200681478 A | 3/2006 |
| JP | 200681480 A | 3/2006 |
| JP | 200681485 A | 3/2006 |
| JP | 200681490 A | 3/2006 |
| JP | 2006081484 A | 3/2006 |
| JP | 2006246831 A | 9/2006 |
| JP | 2006246845 A | 9/2006 |
| JP | 2006246849 A | 9/2006 |
| JP | 200774963 A | 3/2007 |
| JP | 200886247 A | 4/2008 |
| JP | 200944995 A | 3/2009 |
| JP | 2010227078 A | 10/2010 |
| JP | 201136193 A | 2/2011 |
| JP | 201177980 A | 4/2011 |
| JP | 5098277 B2 | 12/2012 |
| JP | 2013118857 A | 6/2013 |
| JP | 2013118858 A | 6/2013 |
| JP | 201468561 A | 4/2014 |
| JP | 201468562 A | 4/2014 |
| WO | 2013012080 A1 | 1/2013 |

* cited by examiner

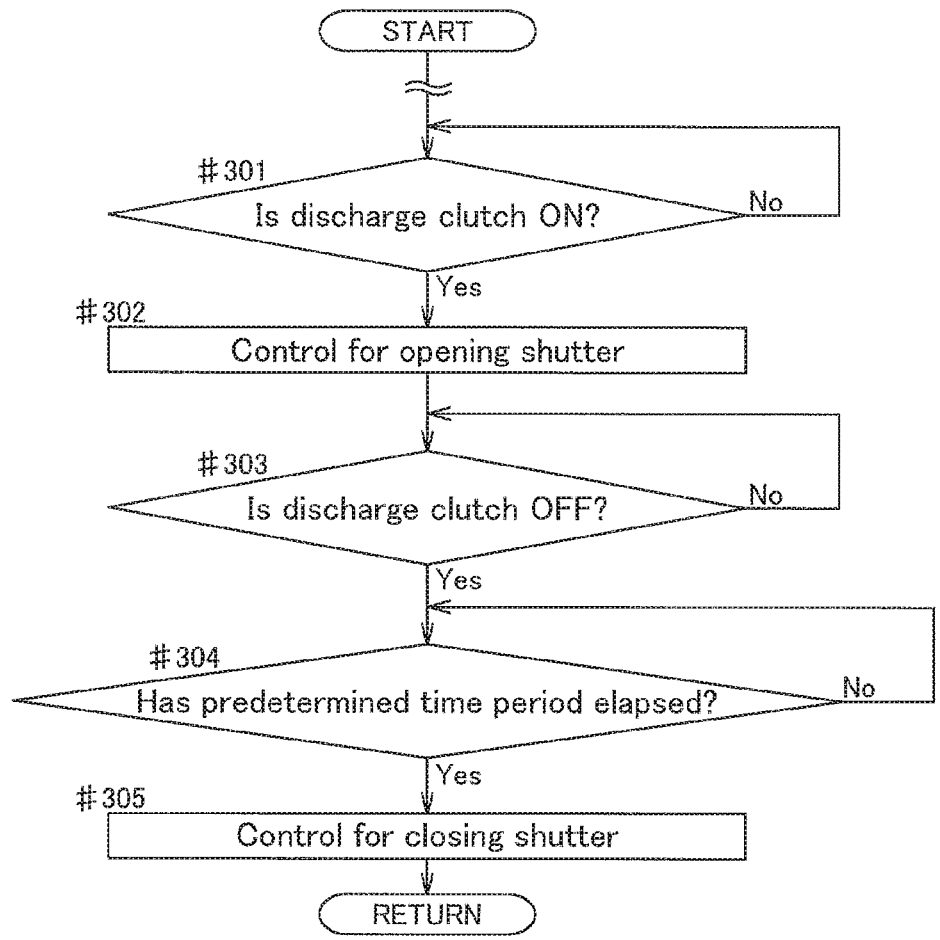
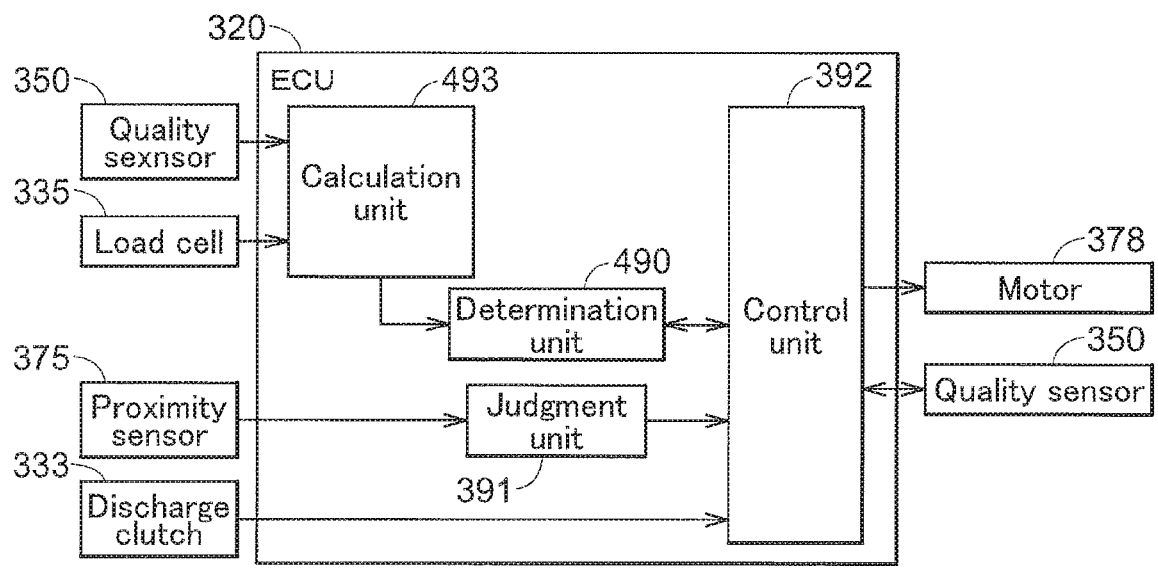

COMBINE HAVING A TEMPORARY RETENTION UNIT AND A SHUTTER

CROSS-REFERENCE TO RELATED APPLICATIONS

This application is a continuation of U.S. patent application Ser. No. 15/730,467 filed Oct. 11, 2017, which is a continuation of U.S. patent application Ser. No. 14/780,069 filed Sep. 25, 2015, now U.S. Pat. No. 9,820,436, which is the United States national phase of International Application No. PCT/JP2014/054025 filed Feb. 20, 2014, and claims priority to Japanese Patent Application Nos. 2013-067032, 2013-067033, and 2013-067034, all filed Mar. 27, 2013, the disclosures of which are hereby incorporated in their entirety by reference.

BACKGROUND OF THE INVENTION

Field of the Invention

The present invention relates to a combine provided with a grain tank that retains grain.

Description of Related Art

Background Art 1

An example of a conventional combine is disclosed in, for example, Patent Document 1. The combine disclosed in Patent Document 1 is provided with a weight measurement unit ("load cell" in Patent Document 1) that measures the weight of grain retained in a grain tank ("grain tank" in Patent Document 1).

Background Art 2

An example of a conventional combine is disclosed in, for example, Patent Document 2. The combine disclosed in Patent Document 2 is provided with level sensors ("chaff sensors" in Patent Document 2) for detecting the extent of retention of grain in a grain tank ("grain tank" in Patent Document 2), the level sensors being able to detect multiple stages of retention levels of different heights. In such a combine, when the measurement sensor at, for example, the highest stage detects the grain, an operator can be informed that the grain in the grain tank has reached a predetermined amount, for example, the maximum amount.

Background Art 3

An example of a conventional combine is disclosed in, for example, Patent Document 3. The combine disclosed in Patent Document 3 is configured to be able to crush grain that has flowed into a grain tank ("grain tank" in Patent Document 3) from a grain supply port provided in the grain tank, and measure the quality of the crushed grain.

PRIOR ART DOCUMENTS

Patent Documents

Patent Document 1: JP 10-164967A (Paragraphs [0009] and [0010], FIG. 1)
Patent Document 2: JP 5098277B2
Patent Document 3: JP 2006-246831A

SUMMARY OF THE INVENTION

"Problem 1" of the above-described "Background Art 1" is as follows:

In the conventional combine, the measurement of the weight of grain retained in the grain tank can be performed even when the combine is in the working state. However, if the work is being done when the measurement is performed, there is a risk that the grain tank will vibrate due to the work, causing weight measurement results to vary.

In view of such circumstances, there is demand for providing a combine capable of accurately measuring the weight of grain retained in a grain tank.

Furthermore, "Problem 2" of the above-described "Background Art 2" is as follows:

In the conventional technique, a retention volume amount of grain that can be detected in the grain tank is determined by the height at which a level sensor is disposed, and thus the retention volume amount of grain in the grain tank has a fixed threshold for performing notification. Therefore, it is not possible to perform flexible reaping work in which, for example, it is notified that the exact amount of grain that can be accommodated in a container, a grain bag, or the like having a fixed capacity is retained.

In view of such circumstances, there is demand for providing a combine that can perform notification of the fact that a predetermined amount of grain is retained in the grain tank and change the predetermined amount to a certain amount.

Moreover, "Problem 3" of the above-described "Background Art 3" is as follows:

In contrast to grain quality measurement of a conventional combine, a method is considered in which a shutter capable of being subjected to opening/closing control is provided within the grain tank, grain is temporarily retained on the shutter, and the quality of the grain is measured. In the method for performing grain quality measurement using such a shutter, there is a risk that an increase in the amount of the grain in the grain tank deteriorates the opening/closing operation of the shutter.

In view of such circumstances, there is demand for providing a combine in which opening/closing of a shutter, which can temporarily retain grain to measure the quality of the grain, can appropriately be performed, without being hindered by the grain.

Means for Solving Problem

Means for solving the above-described "Problem 1" may be as follows:

That is, a combine according to the present invention relates to a combine including:

a traveling device that supports a traveling machine body;
a reaper unit that reaps standing grain culms;
a threshing device that threshes the reaped grain culms;
a grain tank that retains the grain threshed by the threshing device;
a weight measurement unit that performs weight measurement on the grain retained in the grain tank;
a measurement instruction unit that outputs a weight measurement signal;
a working state determination unit that performs working state determination for determining whether the combine is in a working state or a non-working state, based on states of the traveling device, the reaper unit, and the threshing device; and a control unit that instructs the weight measurement unit to perform the weight measurement based on the weight measurement signal, wherein the control unit instructs the working state determination unit to perform the working state determination when the weight measurement signal is output from the measurement instruction unit, and if it is determined that the combine is in the working state, the control unit does not instruct the weight measurement unit to perform the weight measurement.

According to the present invention, when a weight measurement signal is output from the measurement instruction unit in order that weight measurement of the grain retained in the grain tank is performed, working state determination for determining whether the combine is in the working state or the non-working state is performed based on states of the traveling device, the reaper unit, and the threshing device. If it is determined that the combine is in the working state, weight measurement of the grain retained in the grain tank by the weight measurement unit is not performed. In other words, according to the present invention, since weight measurement of the grain retained in the grain tank by the weight measurement unit is not performed in the working state in which the grain tank is vibrating, a possibility that an incorrect value will be measured for the weight of the grain in the grain tank is eliminated, and, as a result, it is possible to accurately measure the weight of the grain retained in the grain tank.

In the above-described configuration, preferably provided are an orientation determination unit that detects a tilt of the traveling machine body; and an orientation determination unit that performs orientation determination for determining whether or not the tilt of the traveling machine body is within a predetermined acceptable range of tilt, wherein the control unit instructs the orientation detection unit to perform the orientation determination if it is determined by the working state determination unit that the combine is in the non-working state, and if the tilt of the traveling machine body is within the predetermined acceptable range of tilt, the control unit instructs the weight measurement unit to perform the weight measurement, whereas if it is determined that the tilt of the traveling machine body is not within the acceptable range of tilt, the control unit does not instruct the weight measurement unit to perform the weight measurement.

Since the tilt of the traveling machine body also causes the grain tank to be tilted, there is a risk that the weight measured in the state in which the traveling machine body is tilted will not be correct. However, according to the present configuration, if after the determination that the combine is in the non-working state, it is determined that the tilt of the traveling machine body is within a predetermined acceptable range of tilt, the weight measurement unit measures the weight of the grain in the grain tank. That is, if it is determined that the tilt of the traveling machine body is not within the acceptable range of tilt, the weight measurement unit does not measure the weight of the grain in the grain tank. Accordingly, a possibility that an incorrect value will be measured for the weight of the grain in the grain tank is eliminated, and, as a result, it is possible to accurately measure the weight of the grain retained in the grain tank.

In the above-described configuration, preferably provided are a left/right orientation change unit that changes a left/right tilt orientation of the traveling machine body, and a left/right tilt angle detection unit that detects a left/right tilt angle of the traveling machine body, the left/right tilt angle detection unit serving as the orientation detection unit, wherein if it is determined by the orientation determination unit that the left/right tilt angle is not within the predetermined acceptable range of left/right tilt, the control unit does not instruct the weight measurement unit to perform the weight measurement, but controls the left/right orientation change unit so that the left/right tilt angle is within the acceptable range of left/right tilt, and when the left/right tilt angle falls within the acceptable range of left/right tilt, the control unit then instructs the weight measurement unit to perform the weight measurement.

According to this configuration, the left/right tilt angle detection unit that detects a left/right tilt angle of the traveling machine body is provided, and if it is determined that the left/right tilt is not within a predetermined acceptable range of left/right tilt, the left/right orientation change unit is first controlled so that the left/right tilt angle is within the acceptable range of left/right tilt. Then, when the left/right tilt angle falls within the acceptable range of left/right tilt, the weight measurement unit measures the weight of the grain in the grain tank. Accordingly, in this configuration, if the left/right tilt angle of the traveling machine body is large, the left/right tilt angle will automatically be adjusted, and it is thus possible to smoothly execute correct weight measurement by the weight measurement unit.

In the above-described configuration, preferably provided are a front/rear orientation change unit that changes a front/rear tilt orientation of the traveling machine body, and a front/rear tilt angle detection unit that detects a front/rear tilt angle of the traveling machine body, the front/rear tilt angle detection unit serving as the orientation detection unit, wherein if it is determined by the orientation determination unit that the front/rear tilt angle is not within a predetermined acceptable range of front/rear tilt, the control unit does not instruct the weight measurement unit to perform the weight measurement, but controls the front/rear orientation change unit so that the front/rear tilt angle is within the acceptable range of front/rear tilt, and when the front/rear tilt angle falls within the acceptable range of front/rear tilt, the control unit instructs the weight measurement unit to perform the weight measurement.

According to this configuration, the front/rear tilt angle detection unit that detects a front/rear tilt angle of the traveling machine body is provided, and if it is determined that the front/rear tilt angle is not within a predetermined acceptable range of front/rear tilt, the front/rear orientation change unit is first controlled so that the front/rear tilt angle is within the acceptable range of front/rear tilt. Then, when the front/rear tilt angle is within the acceptable range of front/rear tilt, the weight measurement unit measures the weight of the grain in the grain tank. Accordingly, in this configuration, if the front/rear tilt angle of the traveling machine body is large, the front/rear tilt angle will automatically be adjusted, and it is thus possible to smoothly execute correct weight measurement by the weight measurement unit.

In the above-described configuration, preferably provided is a vehicle speed sensor that detects a traveling speed of the traveling device, wherein the working state determination unit determines that the combine is in the non-working state on at least the condition that the traveling speed is zero.

When the traveling speed of the traveling device is other than zero, that is, during traveling, the vibration of the grain tank is significantly, and thus there is a risk that a significant error in weight measurement will occur. However, according to this configuration, when the traveling speed of the traveling device that is detected by the vehicle speed sensor is other than zero, it is determined that the combine is not in the non-working state and thus the weight measurement unit does not measure the weight of the grain in the grain tank. Accordingly, a possibility that an incorrect value will be measured for the weight of the grain in the grain tank is eliminated, and, as a result, it is possible to accurately measure the weight of the grain retained in the grain tank.

In the above-described configuration, preferably provided is a threshing clutch that switches on/off power transmission to the threshing device, wherein the working state determination unit determines that the combine is in the non-working state on at least the condition that the threshing clutch is switched off.

When the threshing clutch is switched on, a state is realized in which the operation of the threshing device transmits vibration to the grain tank, and thus there is a risk that an error in the weight measurement is large. However, according to this configuration, when the threshing clutch, which switches on/off power transmission to the threshing device, is not switched off, that is, when the threshing clutch is switched on, it is determined that the combine is not in the non-working state, and thus the weight measurement unit does not measure the weight of the grain in the grain tank. Accordingly, a possibility that an incorrect value will be measured for the weight of the grain in the grain tank is eliminated, and, as a result, it is possible to accurately measure the weight of the grain retained in the grain tank.

In the above-described configuration, preferably provided is a grain culm sensor that is provided on the reaper unit and detects the existence of the reaped grain culms, wherein the working state determination unit determines that the combine is in the non-working state on at least the condition that there are no reaped grain culms in the reaper unit.

In the state in which there are grain culms in the reaper unit and reaped grain culms are detected by the grain culm sensor, that is, when the reaper unit is operating, vibration from the operating reaper unit is transmitted to the grain tank, and thus there is a risk that an error in the weight measurement is large. However, according to this configuration, since the condition for determining that the combine is in the non-working state is at least that there are no reaped grain culms in the reaper unit, a possibility that an incorrect value will be measured for the weight of the grain in the grain tank is eliminated, and, as a result, it is possible to accurately measure the weight of the grain retained in the grain tank.

In the above-described configuration, it is preferable that the reaper unit be supported by the traveling machine body so as to be able to be vertically raised and lowered, a reaping height sensor that detects a vertical position of the reaper unit be provided, and even if it is determined by the working state determination unit that the combine is in the non-working state, the control unit do not instruct the weight measurement unit to perform the weight measurement when the vertical position is located lower than a predetermined height.

According to this configuration, when the combine is in the non-working state and the vertical position of the reaper unit is located higher than the predetermined height, the weight measurement unit measures the weight of the grain retained in the grain tank. Accordingly, it is possible to prevent a disadvantage that the front end or the like of the reaper unit comes into contact with an agricultural field unexpectedly when control for leveling the traveling machine body is performed and the traveling machine body is lowered, before the weight measurement, for example.

In the above-described configuration, preferably provided is an unloader that includes a longitudinal auger connected to the grain tank, and a transverse auger that is connected to the longitudinal auger and is capable of discharging the grain retained in the grain tank to the outside from one end of the transverse auger, the transverse auger being able to swing vertically and pivot between an accommodation position and an operation position, an auger receiver that supports the transverse auger in the accommodation position, and an accommodation detection unit that detects whether or not the transverse auger is in an accommodated state of being accommodated in the auger receiver, wherein the control unit checks a detection result by the accommodation detection unit if it is determined by the working state determination unit that the combine is in the non-working state, and if it is detected that the transverse auger is in the accommodated state, the control unit instructs the weight measurement unit to perform the weight measurement, whereas if it is detected that the transverse auger is not in the accommodated state, the control unit does not instruct the weight measurement unit to perform the weight measurement.

The transverse auger of the unloader is supported by the longitudinal auger in a cantilever manner, and the position of the center of gravity in the grain tank changes between the state in which the transverse auger is correctly accommodated in the auger receiver and the state in which the transverse auger is not correctly accommodated in the auger receiver, leading to the risk that results of the weight measurements will be different from each other. According to this configuration, if after the determination that the combine is in the non-working state, it is determined that the transverse auger is correctly accommodated in the auger receiver, the weight measurement unit measures the weight of the grain in the grain tank. However, even if it is determined that the combine is in the non-working state, the weight measurement unit does not measure the weight of the grain in the grain tank if it is determined that the transverse auger is not correctly accommodated in the auger receiver. Accordingly, in the stable state in which the transverse auger is correctly accommodated in the auger receiver, the weight measurement unit measures the weight of the grain in the grain tank, making it possible to obtain a highly accurate weight value.

In the above-described configuration, preferably provided is a vertical swing driving unit that vertically swings the transverse auger; and a pivot driving unit that pivots the transverse auger, wherein if it is detected by the accommodation detection unit that the transverse auger is not in the accommodated state, the control unit does not instruct the weight measurement unit to perform the weight measurement, but controls the vertical swing driving unit and the pivot driving unit so that the transverse auger is in the accommodated state, and after the accommodated state is realized, the control unit instructs the weight measurement unit to perform the weight measurement.

According to this configuration, when the transverse auger is not correctly accommodated in the auger receiver in the accommodation position, the transverse auger is caused to be correctly accommodated in the auger receiver and then the weight measurement unit measures the weight of the grain in the grain tank. Accordingly, in this configuration, weight measurement is automatically performed when the transverse auger is correctly accommodated in the auger receiver, thus making it possible for the weight measurement unit to smoothly execute the correct weight measurement.

In the above-described configuration, preferably provided is an unloader that includes a longitudinal auger connected to the grain tank, and a transverse auger that is connected to the longitudinal auger and is capable of discharging the grain retained in the grain tank to the outside from one end of the transverse auger, the transverse auger being able to swing vertically and pivot between an accommodation position and an operation position, a vertical swing driving unit that vertically swings the transverse auger; and an auger receiver that supports the transverse auger in the accommodation position;

wherein if it is determined by the working state determination unit that the combine is in the non-working state, the control unit controls the vertical swing driving unit to lower the transverse auger for a predetermined time period, and then instructs the weight measurement unit to perform the weight measurement.

It is often the case that rather than the pivot position, the vertical position of the transverse auger of the unloader is shifted due to vibration or the like at the time of traveling. According to this configuration, if the transverse auger is not correctly accommodated in the auger receiver in the accommodation position, the transverse auger is lowered for a predetermined time period and then the measurement of the weight of the grain in the grain tank by the weight measurement unit is performed. In such a case, by lowering the transverse auger for a predetermined time period, the transverse auger is correctly accommodated in the auger receiver. Accordingly, in this configuration, the transverse auger is automatically correctly accommodated in the auger receiver and then weight measurement is performed, thus making it possible for the weight measurement unit to smoothly execute the correct weight measurement.

In the above-described configuration, it is preferable that if the control unit does not instruct the weight measurement unit to perform the weight measurement, the control unit notify an operator of information relating to measurement.

According to this configuration, when the weight measurement unit is not instructed to perform weight measurement, an operator can be notified of information relating to measurement, for example, information indicating that weight measurement is not possible. Accordingly, the operator can immediately recognize that weight measurement is not possible, and can take various measures.

Means for solving the above-described "Problem 2" may be as follows:

That is, a combine according to the present invention relates to a combine including:

a reaper unit that reaps standing grain culms;

a threshing device that threshes the reaped grain culms;

a grain tank that retains the grain threshed by the threshing device;

a measurement sensor that measures a retention volume amount of the grain retained in the grain tank;

a determination unit that determines whether or not the retention volume amount measured by the measurement sensor exceeds a preset threshold;

a notification unit that, if it is determined by the determination unit that the retention volume amount exceeds the threshold, notifies an operator of information indicating that the amount of the grain exceeds the threshold; and a change unit that can change the threshold.

According to the present invention, since the determination unit and the notification unit are provided, an operator can understand that a predetermined amount of grain is retained. Furthermore, according to the present invention, since the change unit is provided, it is possible to perform notification corresponding to the capacity of a container or the like serving as a destination for discharging.

In the above-described configuration, it is preferable that the measurement sensor be a weight sensor that performs weight measurement on the grain retained in the grain tank.

According to this configuration, since the measurement sensor is a weight sensor that measures the weight of the grain retained in the grain tank, it is possible to obtain a detailed value when obtaining the retention volume amount of the grain retained in the grain tank, than that of a level sensor positioned at a fixed height. Accordingly, it is possible for the change unit to change a threshold more precisely, making it possible to flexibly change the threshold.

In the above-described configuration, preferably provided is a quality sensor that measures at least a moisture value of the grain retained in the grain tank; and a calculation unit that calculates the retention volume amount based on the moisture value of the grain that was detected by the quality sensor and the weight of the grain retained in the grain tank that was measured by the weight sensor, wherein the threshold is set in units of volume.

According to this configuration, since the retention volume amount is calculated based on the moisture value of the grain that was detected by the quality sensor and the weight of the grain retained in the grain tank that was measured by the weight sensor, it is possible to calculate a highly accurate retention volume amount, taking into consideration the actual quality of the grain. For example, since the approximate specific weight of the grain is obtained by the quality sensor measuring at least the moisture value of the grain retained in the grain tank, it is possible to obtain the correct retention volume amount that matches the actual characteristics of the grain retained in the grain tank based on the weight of the grain retained in the grain tank that was measured by the weight sensor, and to compare the calculated retention volume amount with the threshold set in units of volume. Furthermore, since a threshold can be set in units of volume, it is easier to envision the degree of retention as compared with the case where, for example, a threshold is set in units of weight, facilitating the threshold setting.

In the above-described configuration, preferably provided is a level sensor that measures a retention level of the grain retained in the grain tank, wherein the threshold is set in units of volume.

According to this configuration, it is possible to arbitrarily change the threshold for the retention volume amount of the grain retained in the grain tank, the threshold functioning as a standard for notifying an operator. In this case, the retention level of the grain retained in the grain tank is measured by the level sensor, and it is determined whether or not the measured retention level reaches the threshold. Assume that the level sensor includes, for example, a first sensor, a second sensor, a third sensor, and a fourth sensor that are disposed at different heights in the stated order moving upward from the bottom. For example, when a threshold corresponding to detection of the grain by the fourth sensor is set in advance, it is possible for the change unit to change the threshold to a new threshold corresponding to detection of the grain by the third sensor, which is disposed lower than the fourth sensor. Accordingly, the retention volume amount of the grain in the grain tank that is to be notified can arbitrarily be changed. Since a threshold can be set in units of volume, it is easier to envision the degree of retention as compared with the case where, for example, a threshold is set in units of weight, facilitating the threshold setting.

In the above-described configuration, preferably provided is a communication unit that communicates with an external server, wherein the change unit is configured to be able to change the threshold based on data received from the external server.

According to this configuration, it is possible to change the threshold, for example, from an external server that is disposed in a remote management center or the like, making it possible to externally manage the retention volume amount.

In the above-described configuration, preferably provided is a communication unit that communicates with the external server, wherein the communication unit is configured to, if the threshold is changed by the change unit, transmit a change result to the external server.

According to this configuration, if the threshold is changed by the change unit, a change result can be transmitted to the external server via the communication unit. Accordingly, even if, for example, the threshold is changed by the operator by mistake, the threshold change result can be checked in the external server, and thus it is possible to prevent various disadvantages. Taking a case where a grain drying machine or the like in the management center or the like has a fixed reception capacity as an example, changing the threshold is sometimes not preferable, and since, in such a case, a result that the operator has changed the threshold can be checked in the external server, it is possible to take an appropriate measure such as one of prompting the operator to change the threshold again. Moreover, when thresholds are managed together by the external server, for example, it is possible to automatically rewrite old data to new data.

In the above-described configuration, it is preferable that the determination unit be configured to be able to set a plurality of thresholds.

According to this configuration, since the determination unit can set a plurality of thresholds, it is possible to notify the operator of the retention volume amount of the grain in the grain tank at a plurality of stages. In other words, it is assumed, for example, that a first threshold of a desired amount and a second threshold, which is smaller than the first threshold, are set by the determination unit, preliminary notification for notifying that a desired amount of retention will be achieved soon can be performed with respect to the operator when the retention volume amount reaches the second threshold, and then real notification for notifying that the desired amount of retention has been achieved can be performed with respect to the operator when the retention volume amount reaches the first threshold. Accordingly, it is easy for the operator to understand the situation of retention of the grain.

In the above-described configuration, preferably provided are a display unit that displays the retention volume amount; and a discharge auger that is provided on the bottom of the grain tank, and discharges the grain retained in the grain tank to the outside, wherein the retention volume amount before the discharge auger starts operating continues to be displayed on the display unit during a time period from the start of the operation of the discharge auger to the next reaping work.

According to this configuration, in case where an operator has forgotten a previous retention amount for example, the operator can easily check the previous retention amount before the next reaping work is started.

Means for solving the above-described "Problem 3" may be as follows:

That is, a combine according to the present invention relates to a combine including:

a grain tank that retains grain conveyed from a threshing device;

a discharge auger that is provided on the bottom of the grain tank, and discharges the grain retained in the grain tank to the outside;

a temporary retention unit that is provided within the grain tank, has a take-in port, and temporarily retains part of the grain conveyed from the threshing device, the part of the grain being taken in from the take-in port;

a quality measurement unit that detects quality of the grain retained in the temporary retention unit;

a discharge port that is formed in the temporary retention unit and is capable of discharging the retained grain into the grain tank;

a shutter whose position can be changed between an open position at which the discharge port is opened and a closed position at which the discharge port is closed;

a control unit that performs opening/closing control in which the shutter is moved to the open position when the measurement by the quality measurement unit is completed, and the shutter is moved to the closed position when all of the grain in the temporary retention unit is discharged into the grain tank; and a determination unit that determines whether or not the retention volume of the grain retained in the grain tank exceeds a predetermined value, wherein if it is determined by the determination unit that the retention volume exceeds the predetermined value, the control unit stops the opening/closing control.

According to the present invention, the grain taken in from the take-in port is temporarily retained in the temporary retention unit that is formed on the shutter in the closed position, quality measurement by the quality measurement unit is performed on the grain retained in the temporary retention unit, the shutter is moved to the open position after the completion of the quality measurement so that the grain subjected to the quality measurement is discharged from the discharge port. According to the present invention, such opening/closing control for the shutter is ordinarily performed, and the quality measurement of the grain is performed. Also, in the present invention, when the retention volume of the grain retained in the grain tank exceeds a predetermined value, the opening/closing control for the shutter is stopped. By setting a value at which there is a risk that the grain interferes with the opening/closing operation of the shutter as a predetermined value, the opening/closing operation of the shutter is not hindered by the retained grain, making it possible to smoothly perform the quality measurement of the grain. According to the present invention, the shutter on which grain can temporarily be retained can appropriately be opened and closed for quality measurement of the grain, without being hindered by the grain.

In the above-described configuration, it is preferable that if it is determined by the determination unit that the retention volume exceeds the predetermined value, the control unit do not control the shutter to move to the open position even when the measurement by the quality measurement unit is completed.

If the retention volume of the grain retained in the grain tank exceeds the predetermined value, the opening operation of the shutter will possibly be hindered by the retained grain. According to the present configuration, in such a case, even when measurement by the quality measurement unit is completed, the shutter is not controlled to move to the open position. Accordingly, it is possible to avoid the disadvantage that the shutter is not opened.

In the above-described configuration, it is preferable that a discharge count ensuring section whose side portion is separated from the internal space of the grain tank and whose lower portion is in communication with the internal space be provided below and adjacent to the shutter, the discharge count ensuring section being in communication with the temporary retention unit via the discharge port.

According to this configuration, the discharge count ensuring section is separated from the internal space although the lower portion thereof is in communication with the internal space, and thus even if the retention level of the grain retained in the internal space increases, the discharge count ensuring section is not affected by the grain retained in the internal space above the lower portion of the discharge count ensuring section. That is, an increase in the retention level in the discharge count ensuring section will largely depend on the amount of the grain discharged from the temporary retention unit. Therefore, in the present configuration, by setting the size and the like of the discharge count ensuring section appropriately, it is possible to achieve balance between the number of times of the quality measurement and the degree of retention in the internal space.

In the above-described configuration, preferably provided is a volume measurement unit that detects the retention volume, wherein if it is detected by the volume measurement unit that the retention volume exceeds a preliminary value, which is a value lower than the predetermined value, and after the detection, the number of times that the shutter is opened exceeds a predetermined number of times, the determination unit determines that the retention volume exceeds the predetermined value.

According to this configuration, a preliminary value, which is lower than a predetermined value at which there is a risk that the grain interferes with the opening/closing operation of the shutter, can be detected by the volume measurement unit. Accordingly, if the retention volume of the grain retained in the grain tank exceeds the preliminary value, it is apparent that the remaining volume of the discharge count ensuring section is limited to some extent. Therefore, according to the present configuration, if the number of times that the shutter is opened exceeds a predetermined number of times after the retention volume of the grain retained in the grain tank exceeded the preliminary value, it is deemed that the retention volume of the grain retained in the grain tank exceeds the predetermined value, and the opening/closing control for the shutter can be stopped before the grain interferes with the opening/closing operation of the shutter.

In the above-described configuration, preferably provided is a volume measurement unit that detects the retention volume, wherein if it is detected by the volume measurement unit that the retention volume exceeds a preliminary value, which is a value lower than the predetermined value, and a predetermined time period has elapsed since the detection, the determination unit determines that the retention volume exceeds the predetermined value.

According to this configuration, a preliminary value, which is lower than a predetermined value at which there is a risk that the grain interferes with the opening/closing operation of the shutter, can be detected by the volume measurement unit. Accordingly, if the retention volume of the grain retained in the grain tank exceeds the preliminary value, it is apparent that the remaining volume of the discharge count ensuring section is limited to some extent. Therefore, according to the present configuration, if, for example, a predetermined time period in which the shutter is opened a predetermined number of times and the discharge count ensuring section no longer has a sufficient empty volume has elapsed since the retention volume of the grain retained in the grain tank exceeded the preliminary value, it is deemed that the retention volume of the grain retained in the grain tank exceeds the predetermined value, and the opening/closing control for the shutter can be stopped before the grain interferes with the opening/closing operation of the shutter.

In the above-described configuration, preferably provided is a discharge clutch that switches on/off driving power transmission to the discharge auger, wherein when the discharge clutch is switched on after the opening/closing control is stopped, the control unit restarts the opening/closing control.

According to this configuration, when the discharge clutch is switched on, the discharge auger is operated, and the amount of the grain in the grain tank is reduced, that is, the amount of the grain present below the shutter is also reduced. Accordingly, even when the opening/closing operation of the shutter is restarted, the grain does not interfere with the opening/closing operation of the shutter. Accordingly, by restarting the opening/closing control for the shutter when the discharge clutch is switched on, it is possible to immediately restart the quality measurement of the grain.

In the above-described configuration, preferably provided is a requisite amount measurement unit that detects whether or not the amount of grain needed for the measurement by the quality measurement unit is retained in the temporary retention unit, wherein in the opening/closing control, if a state in which the amount of grain needed for the quality measurement unit is not retained in the temporary retention unit continues for a predetermined time period after the shutter is moved to the open position, the control unit controls the shutter to move to the closed position.

According to this configuration, after the shutter is moved to the open position, and the state in which the amount of grain needed for the quality measurement unit is not retained in the temporary retention unit is confirmed based on the detection by the requisite amount measurement unit, the shutter is controlled to move to the closed position. Accordingly, the shutter is subjected to closing control after it is confirmed that the grain has been reliably discharged from the temporary retention unit based on the state of the shutter in the open position, and thus it is possible to improve the reliability of the quality measurement of the grain.

In the above-described configuration, preferably provided is a level measurement device that detects a retention level of the grain in the grain tank, the level measurement device serving as the volume measurement unit that detects the retention volume, wherein the retention volume is determined based on a detection result of the level measurement device.

According to this configuration, for example, by using the level measurement device such as a simple contact sensor, it is possible to detect the retention volume of the grain retained in the grain tank at a lower cost, and to appropriately use the detection result of the level measurement device in opening/closing control for the shutter.

In the above-described configuration, preferably provided is a weight measurement device that performs weight measurement on the grain retained in the grain tank, the weight measurement device serving as the volume measurement unit that detects the retention volume, wherein the retention volume is determined based on a detection result of the weight measurement device.

According to this configuration, it is possible to calculate the retention volume of the grain retained in the grain tank using the weight of the grain retained in the grain tank based on the measurement result of the weight measurement device. For example, by using the weight measurement device that can accurately measure the weight of the grain retained in the grain tank, it is possible to obtain the retention volume of the grain retained in the grain tank in detail, making it possible to appropriately use the detection result of the weight measurement device in opening/closing control for the shutter.

In the above-described configuration, it is preferable that the grain retained in the grain tank be discharged from the rear portion of the grain tank by the discharge auger, and the temporary retention unit be provided in the front portion of the grain tank.

According to this configuration, when the retained grain is discharged from the rear portion of the grain tank by the discharge auger, the retention level of the grain in the front portion of the grain tank is likely to decrease relatively quickly. Accordingly, providing the temporary retention unit in the front portion of the grain tank makes it possible to rapidly reduce the retention level of the grain below the temporary retention unit when the discharge auger is operated, and to restart the opening/closing control for the shutter immediately.

Furthermore, a combine according to the present invention relates to a combine including:

a grain tank that retains grain conveyed from a threshing device;

a discharge auger that is provided on the bottom of the grain tank, and discharges the grain retained in the grain tank to the outside;

a temporary retention unit that is provided within the grain tank, has a take-in port, and temporarily retains part of the grain conveyed from the threshing device, the part of the grain being taken in from the take-in port;

a quality measurement unit that detects the quality of the grain retained in the temporary retention unit;

a discharge port that is formed in the temporary retention unit and is capable of discharging the retained grain into the grain tank;

a shutter whose position can be changed between an open position at which the discharge port is opened and a closed position at which the discharge port is closed;

a control unit that performs opening/closing control in which the shutter is moved to the open position when the measurement by the quality measurement unit is completed, and the shutter is moved to the closed position when all of the grain in the temporary retention unit is discharged into the grain tank; and a discharge clutch that switches on/off driving power transmission to the discharge auger, wherein the control unit controls the shutter to move to the open position when the discharge clutch is switched on.

According to the present invention, the grain taken in from the take-in port is temporarily retained in the temporary retention unit that is formed on the shutter in the closed position, quality measurement by the quality measurement unit is performed on the grain retained in the temporary retention unit, and the shutter is moved to the open position after the completion of the quality measurement so that the grain subjected to the quality measurement is discharged from the discharge port. According to the present invention, such opening/closing control for the shutter is ordinarily performed, and the quality measurement of the grain is performed. Also, in the present invention, when the discharge clutch is switched on and the discharge auger is driven so that the grain in the grain tank is entirely discharged to the outside, the shutter is controlled to move to the open position, and the grain in the temporary retention unit is discharged into the internal space. Furthermore, in the present invention, it is possible to prevent the grain from remaining in the temporary retention unit. According to the present invention, the shutter on which grain can temporarily be retained can appropriately be opened and closed for quality measurement of the grain, without being hindered by the grain.

In the above-described configuration, it is preferable that when the discharge clutch is switched off after the control unit has controlled the shutter to move to the open position, the control unit control the shutter to move to the closed position.

According to this configuration, the state in which the discharge clutch is switched off and the discharge auger is stopped means that the discharge of the grain in the grain tank is completed. Accordingly, it is possible to control the shutter to move to the closed position without interference with the grain.

In the above-described configuration, it is preferable that when a predetermined time period has elapsed since the control unit controlled the shutter to move to the open position, the control unit controls the shutter to move to the closed position.

According to this configuration, even if the shutter is in the state of being buried in the grain when the shutter is moved to the open position, the discharge clutch is switched on, and thus upon the elapse of a predetermined time period since the shutter was controlled to move to the open position, a state is realized in which the retention level of the grain has decreased and the shutter is not buried in the grain. Accordingly, by controlling the shutter to move to the closed position upon the elapse of a predetermined time period since the discharge clutch was switched on and the shutter was moved to the open position, it is possible to control the shutter to move to the closed position while preventing interference with the grain.

BRIEF DESCRIPTION OF THE DRAWINGS

FIG. 26 is a flowchart schematically illustrating the control according to a third example of the third embodiment.

FIG. 27 is a block diagram illustrating a control configuration according to a fourth example of the third embodiment.

DESCRIPTION OF THE INVENTION

First Embodiment

Hereinafter, a first embodiment of the present invention will be described with reference to the drawings.

<Schematic Configuration of Combine>

Figure 1:
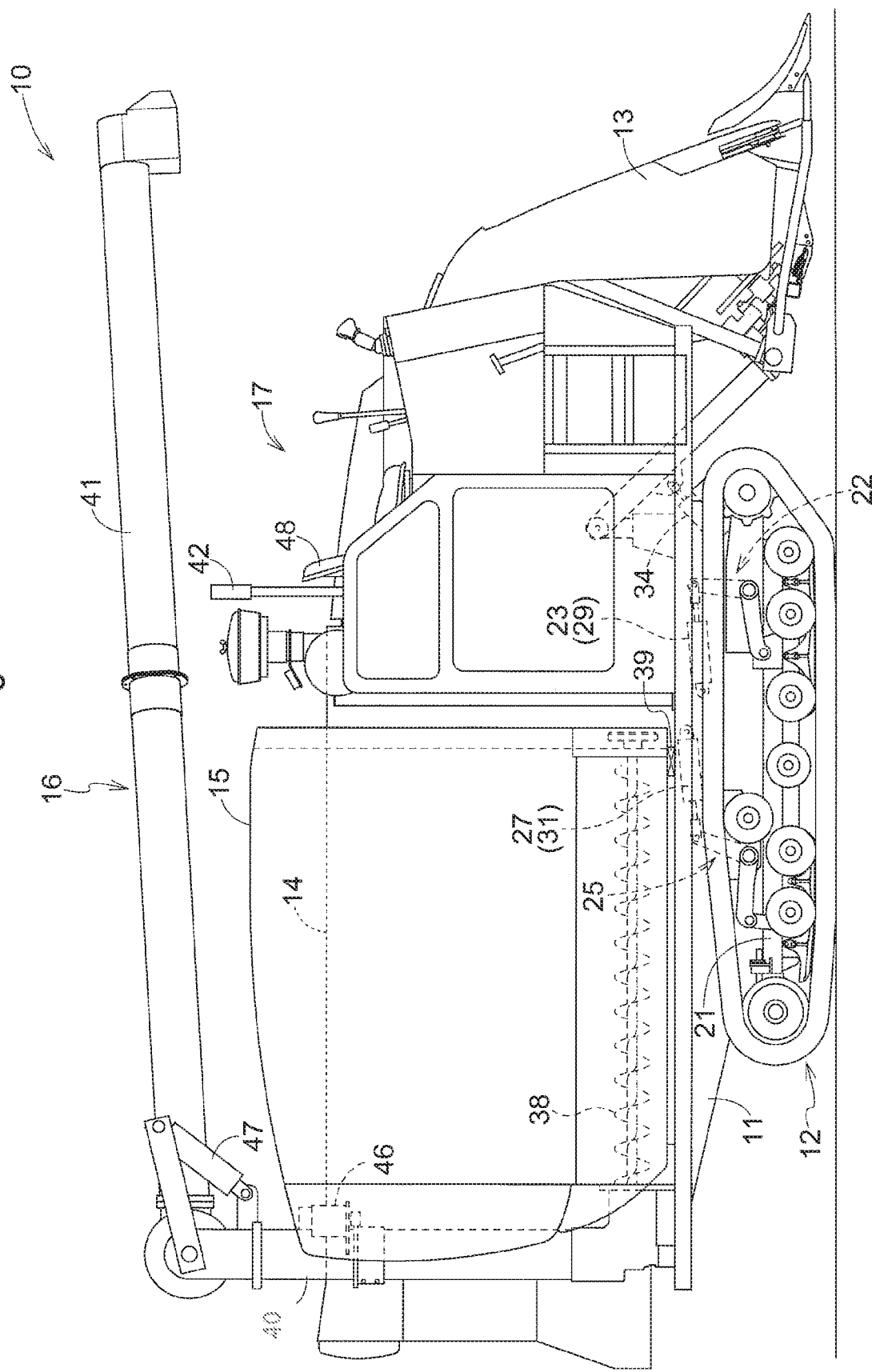
FIG. 1 is an overall side view illustrating a combine according to a first embodiment.
Figure 2:
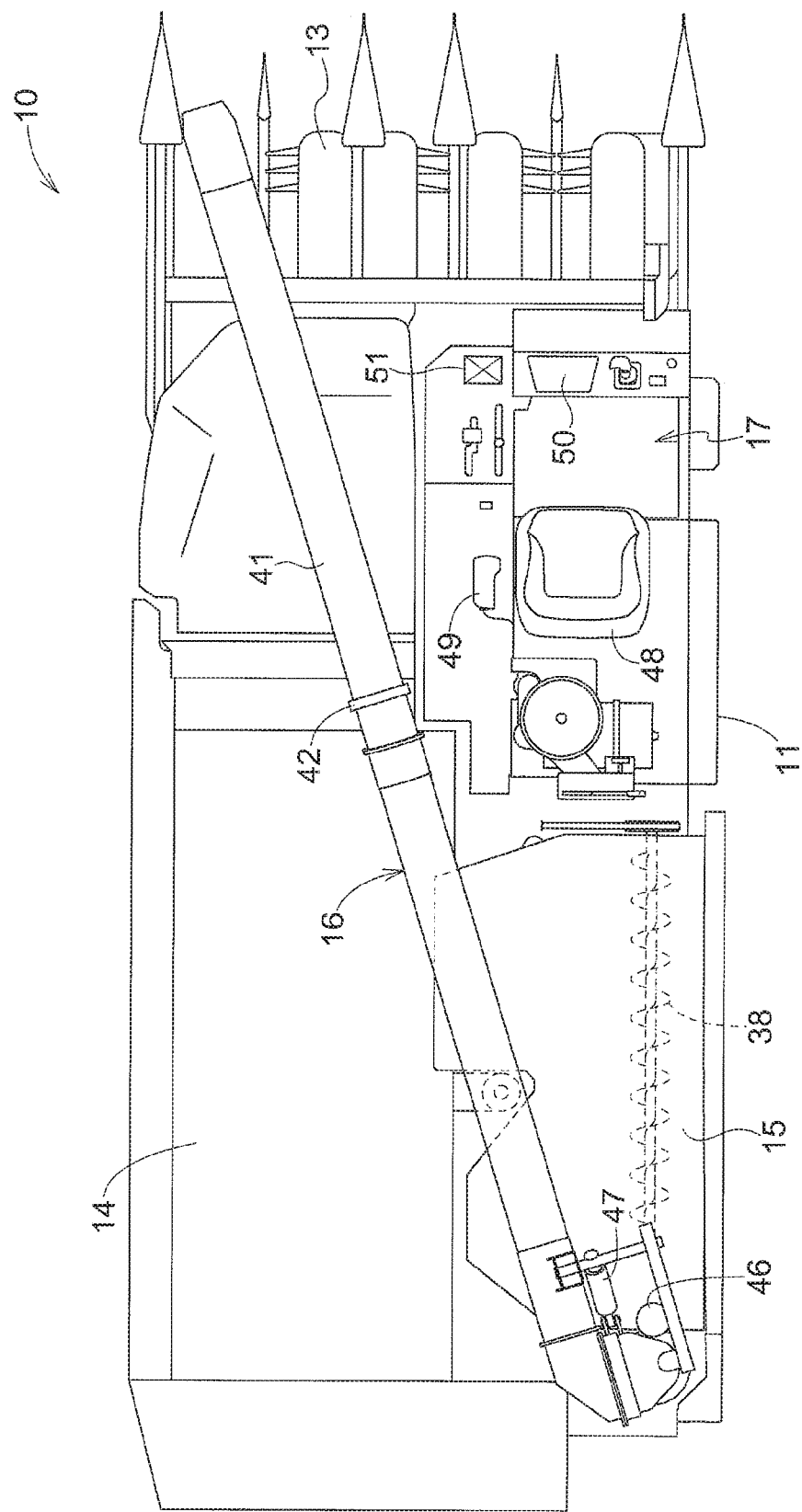
FIG. 2 is an overall plan view illustrating the combine according to the first embodiment.
Figure 3:
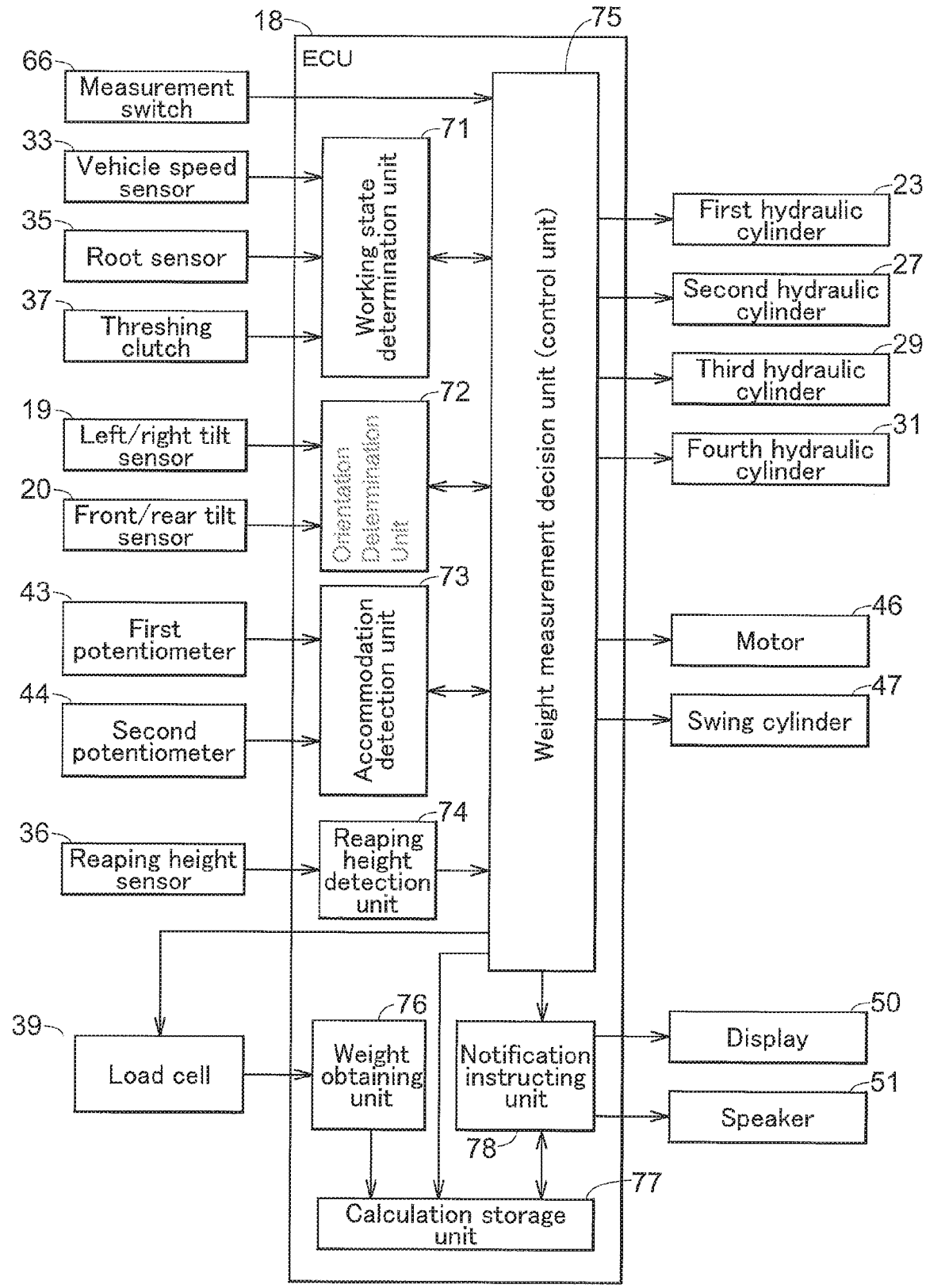
FIG. 3 is a block diagram illustrating a control configuration according to the first embodiment.

A combine 10 is a crawler traveling type culm-head feeding combine, and is provided with, as shown in FIGS. 1 to 3, a traveling machine body 11, a right and left pair of crawler traveling devices 12 that support the traveling machine body 11, a reaper unit 13 that reaps standing grain culms, a threshing device 14 that threshes the reaped grain culms, a grain tank 15 that retains the grain threshed by the threshing device 14, an unloader 16 that discharges the grain in the grain tank 15 to the outside, and an operation and steering unit 17 on which an operator is seated.

The traveling machine body 11 is provided with, as shown in FIG. 3, a left/right tilt sensor 19 (which corresponds to a "left/right tilt angle detection unit") and a front/rear tilt sensor 20 (which corresponds to a "front/rear tilt angle detection unit"), the sensors serving as orientation detection units that detect the tilt of the traveling machine body 11. The left/right tilt sensor 19 is configured to detect the left/right tilt angle of the traveling machine body 11. The front/rear tilt sensor 20 is configured to detect the front/rear tilt angle of the traveling machine body 11.

As shown in FIGS. 1 and 2, the right crawler traveling device 12 includes a truck frame 21 that is capable of raising and lowering the traveling machine body 11. One end of a front link mechanism 22 is coupled to the front portion of the truck frame 21 so as to be rotatable about a horizontal axis. One end of a first hydraulic cylinder 23 is coupled to the other end of the front link mechanism 22 so as to be rotatable about the horizontal axis. The other end of the first hydraulic cylinder 23 is coupled to a part of the traveling machine body 11. A configuration is used in which the front right portion of the traveling machine body 11 is lowered by extending the first hydraulic cylinder 23, and the front right portion of the traveling machine body 11 is raised by retracting the first hydraulic cylinder 23. One end of a rear link mechanism 25 is coupled to the rear portion of the truck frame 21 so as to be rotatable about the horizontal axis. One end of a second hydraulic cylinder 27 is coupled to the other end of the rear link mechanism 25 so as to be rotatable about the horizontal axis. The other end of the second hydraulic cylinder 27 is coupled to a part of the traveling machine body 11 that is different from the part to which the first hydraulic cylinder 23 is coupled. A configuration is used in which the rear right portion of the traveling machine body 11 is raised by extending the second hydraulic cylinder 27, and the rear right portion of the traveling machine body 11 is lowered by retracting the second hydraulic cylinder 27.

The left crawler traveling device 12, although details thereof are not illustrated, is in a left/right symmetrical configuration with the right crawler traveling device 12. Note that the left crawler traveling device 12 is provided with a third hydraulic cylinder 29 and a fourth hydraulic cylinder 31. A configuration is used in which the front left portion of the traveling machine body 11 is lowered by extending the third hydraulic cylinder 29, and the front left portion of the traveling machine body 11 is raised by retracting the third hydraulic cylinder 29. A configuration is used in which the rear left portion of the traveling machine body 11 is raised by extending the fourth hydraulic cylinder 31, and the rear left portion of the traveling machine body 11 is lowered by retracting the fourth hydraulic cylinder 31.

A "front/rear orientation change unit" that changes the front/rear tilt orientation of the traveling machine body 11 is constituted by the first hydraulic cylinder 23, the second hydraulic cylinder 27, the third hydraulic cylinder 29, and the fourth hydraulic cylinder 31. Furthermore, a "left/right orientation change unit" that changes the left/right tilt orientation of the traveling machine body 11 is constituted by the first hydraulic cylinder 23, the second hydraulic cylinder 27, the third hydraulic cylinder 29, and the fourth hydraulic cylinder 31.

Furthermore, the combine 10 is provided with a vehicle speed sensor 33 that detects the traveling speed (see FIG. 3).

As shown in FIGS. 1 and 2, the reaper unit 13 is supported by the traveling machine body 11, and is capable of vertically rising and falling about the horizontal axis P of the traveling machine body 11 by a lift cylinder 34. The reaper unit 13 includes a root sensor 35 (which corresponds to a "grain culm sensor") (see FIG. 3). The root sensor 35 is configured to detect the roots of the reaped grain culms that were taken in by the reaper unit 13 so as to detect the existence of the reaped grain culms in the reaper unit 13. Furthermore, the reaper unit 13 includes a reaping height sensor 36 that is configured to detect the vertical position of the reaper unit 13 (see FIG. 3).

As shown in FIGS. 1 and 2, the threshing device 14 is arranged rearward of the reaper unit 13, and power transmission thereto is switched on/off by a threshing clutch 37 (see FIG. 3). That is, the threshing device 14 is operated when the threshing clutch 37 is in an engaged state, and the threshing device 14 is stopped when the threshing clutch 37 is in a disengaged state.

As shown in FIGS. 1 and 2, the grain tank 15 is provided alongside the threshing device 14, and retains the threshed grain that has flowed from the threshing device 14. A discharge auger 38 for conveying the grain retained in the grain tank 15 to the unloader 16 to discharge it to the outside is provided in the bottom portion of the grain tank 15. When a discharge clutch (not shown) is in an engaged state, the discharge auger 38 is operated and conveys the grain retained in the grain tank 15 to the unloader 16 to discharge it to the outside, whereas when the discharge clutch (not shown) is in a disengaged state, the discharge auger 38 is stopped. In the vicinity of the grain tank 15, a load cell 39 (which corresponds to a "weight measurement unit") is provided. The load cell 39 is arranged below the grain tank 15, and is configured to be capable of measuring the weight of the grain retained in the grain tank 15.

As shown in FIGS. 1 and 2, the unloader 16 is provided with a longitudinal auger 40 and a transverse auger 41. The longitudinal auger 40 is connected to the grain tank 15. The transverse auger 41 is connected to the longitudinal auger 40, is supported in a cantilever manner by the longitudinal auger 40, and is configured to be capable of discharging the grain retained in the grain tank 15 to the outside from one end thereof. Also, the transverse auger 41 is configured to be able to vertically swing and pivot between an accommodation position and an operation position. An auger receiver 42 for receiving and supporting the transverse auger 41 is provided in the accommodation position at which the transverse auger 41 is accommodated. The unloader 16 is provided with, as shown in FIG. 3, a first potentiometer 43 and a second potentiometer 44. The first potentiometer 43 is configured to detect the vertical swing angle of the transverse auger 41.

The second potentiometer 44 is configured to detect the pivot angle of the transverse auger 41.

As shown in FIGS. 1 and 2, a motor 46 (which corresponds to a "pivot driving unit") that pivots the transverse auger 41, and a swing cylinder 47 (which corresponds to "vertical swing driving unit") that swings the transverse auger 41 in the vertical direction are provided.

As shown in FIGS. 1 and 2, the operation and steering unit 17 is provided with an operator seat 48 on which an operator is seated, a remote controller 49 for use in operating the unloader 16 and the like, a display 50 capable of displaying various types of information, a speaker 51 capable of outputting a sound, and the like.

<Remote Controller>

Figure 6:
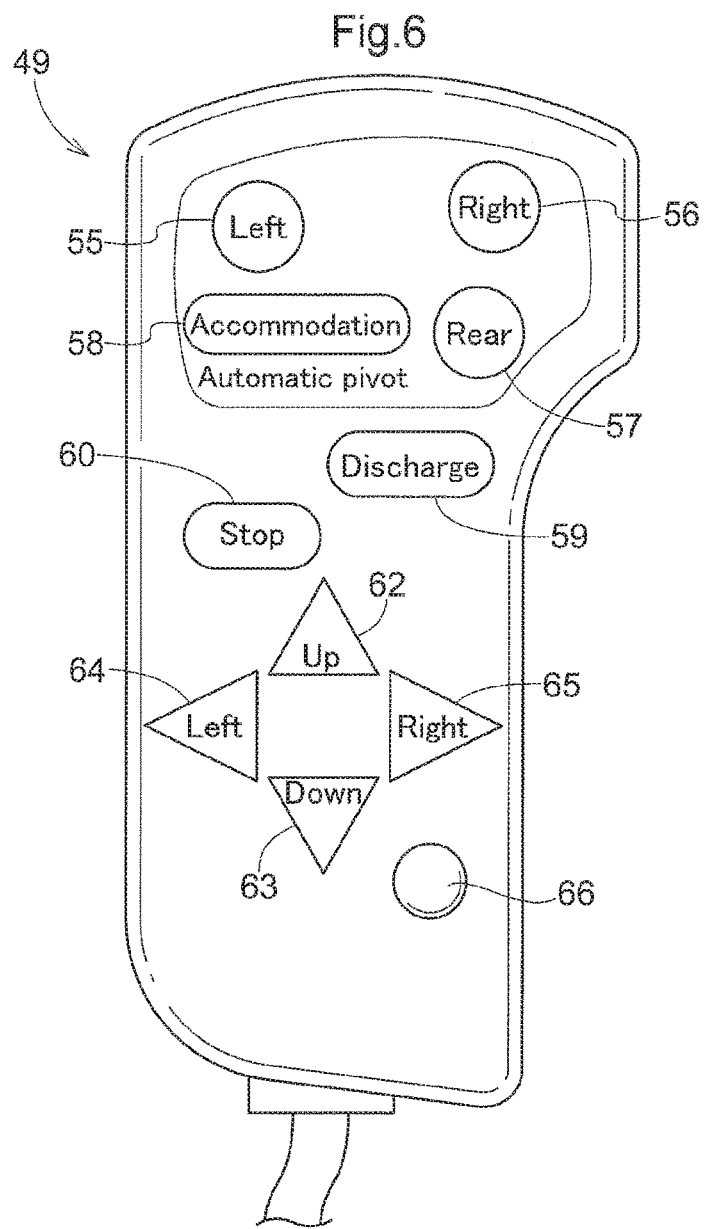
FIG. 6 is a diagram illustrating a remote controller according to the first embodiment.

As shown in FIG. 6, the remote controller 49 is provided with an automatic left pivot switch 55, an automatic right pivot switch 56, an automatic rear pivot switch 57, an automatic accommodation switch 58, a discharge switch 59, a stop switch 60, an up switch 62, a down switch 63, a manual left pivot switch 64, a manual right pivot switch 65, and a measurement switch 66 (which corresponds to a "measurement instruction unit").

When the automatic left pivot switch 55 is operated by being pressed, the transverse auger 41 is automatically pivoted to the left to a predetermined left discharge position. When the automatic right pivot switch 56 is operated by being pressed, the transverse auger 41 is automatically pivoted to the right to a predetermined right discharge position. When the automatic rear pivot switch 57 is operated by being pressed, the transverse auger 41 is automatically pivoted to a predetermined rear discharge position. When the automatic accommodation switch 58 is operated by being pressed, the transverse auger 41 is automatically pivoted and swung vertically so as to be accommodated in the auger receiver 42. When the discharge switch 59 is operated by being pressed, the discharge clutch is put into the ON state, and the discharge auger 38 is operated to discharge the grain from the grain tank 15 to the outside via the unloader 16. When the stop switch 60 is operated by being pressed, the discharge auger 38 is stopped and the discharge of the grain from the grain tank 15 is stopped.

The transverse auger 41 rises while the up switch 62 is operated by being pressed. The transverse auger 41 falls while the down switch 63 is operated by being pressed. The transverse auger 41 pivots to the left while the manual left pivot switch 64 is operated by being pressed. The transverse auger 41 pivots to the right while the manual right pivot switch 65 is operated by being pressed.

When operated by being pressed, the measurement switch 66 outputs a "weight measurement signal" for instructing the load cell 39 to measure the weight of the grain in the grain tank 15. Since the remote controller 49 for instructing orientation change of the unloader 16 or turning on/off of the discharge auger 38 includes the measurement switch 66 for instructing the weight measurement, the switches for giving instructions to the devices relating to the same grain tank 15 can be arranged closer together, improving the operability.

<ECU>

The combine 10 is provided with, as shown in FIG. 3, an ECU 18 that performs weight measurement control and the like. The ECU 18 includes a working state determination unit 71, an orientation determination unit 72, an accommodation detection unit 73, a reaping height detection unit 74, a weight measurement decision unit 75 (which corresponds to a "control unit"), a weight obtaining unit 76, a calculation storage unit 77, and a notification instructing unit 78.

The working state determination unit 71 is connected to the vehicle speed sensor 33, the root sensor 35, the threshing clutch 37, and the weight measurement decision unit 75. The working state determination unit 71 is configured to, upon receiving an input of a working state determination instruction from the weight measurement decision unit 75, perform a working state determination for determining whether the combine 10 is in the working state or the non-working state based on the states of the crawler traveling devices 12, the reaper unit 13, and the threshing device 14.

Upon receiving an input of a working state determination instruction from the weight measurement decision unit 75, the working state determination unit 71 determines, that the combine 10 is in the non-working state if all conditions, namely, a condition that the traveling speed detected by the vehicle speed sensor 33 is zero, a condition that the threshing clutch 37 is in the disengaged state, and a condition that the root sensor 35 is in the non-detecting state are satisfied, and outputs a "non-working signal" to the weight measurement decision unit 75. On the other hand, if any one of the conditions, namely, the condition that the traveling speed detected by the vehicle speed sensor 33 is zero, the condition that the threshing clutch 37 is in the disengaged state, and the condition that the root sensor 35 is in the non-detecting state is not satisfied, the working state determination unit 71 determines that the combine 10 is in the working state and does not output the "non-working signal" to the weight measurement decision unit 75, even when an input of a working state determination instruction is received from the weight measurement decision unit 75.

The orientation determination unit 72 is connected to the front/rear tilt sensor 20, the left/right tilt sensor 19, and the weight measurement decision unit 75. The orientation determination unit 72 is configured to, upon receiving an input of an orientation determination instruction from the weight measurement decision unit 75, perform an orientation determination for determining whether or not the tilt of the traveling machine body 11 is in a predetermined acceptable range of tilt, based on the left/right tilt angle input from the left/right tilt sensor 19 and the front/rear tilt angle input from the front/rear tilt sensor 20.

Upon receiving an input of an orientation determination instruction from the weight measurement decision unit 75, the orientation determination unit 72 determines that the orientation of the traveling machine body 11 is appropriate if the left/right tilt angle input from the left/right tilt sensor 19 is in an acceptable range of left/right tilt and the front/rear tilt angle input from the front/rear tilt sensor 20 is in an acceptable range of front/rear tilt, and outputs an "appropriate orientation signal" to the weight measurement decision unit 75. Furthermore, when outputting the "appropriate orientation signal" to the weight measurement decision unit 75, the orientation determination unit 72 also outputs, to the weight measurement decision unit 75, the left/right tilt angle input from the left/right tilt sensor 19 and the front/rear tilt angle input from the front/rear tilt sensor 20 that are used when it is determined that the orientation of the traveling machine body 11 is appropriate.

On the other hand, upon receiving an input of an orientation determination instruction from the weight measurement decision unit 75, the orientation determination unit 72 determines that the left/right tilt angle is inappropriate if the left/right tilt angle input from the left/right tilt sensor 19 is not in the acceptable range of left/right tilt. Furthermore, in this case, the orientation determination unit 72 determines whether or not the left/right tilt angle is in an adjustable range in which the angle can be adjusted so as to be in the acceptable range of left/right tilt. If the left/right tilt angle is not in the adjustable range, the orientation determination unit 72 outputs an "adjustment impossible signal" to the weight measurement decision unit 75. On the other hand, upon receiving an input of an orientation determination instruction from the weight measurement decision unit 75, if the left/right tilt angle is in the adjustable range, the orientation determination unit 72 outputs, a "left/right tilt adjustment signal" to the weight measurement decision unit 75 so that it drives the first hydraulic cylinder 23, the second hydraulic cylinder 27, the third hydraulic cylinder 29, and the fourth hydraulic cylinder 31, and performs control such that the left/right tilt angle of the traveling machine body 11 falls within the acceptable range of left/right tilt.

Meanwhile, upon receiving an input of an orientation determination instruction from the weight measurement decision unit 75, the orientation determination unit 72 determines that the front/rear tilt angle is inappropriate if the front/rear tilt angle input from the front/rear tilt sensor 20 is not in the acceptable range of front/rear tilt. Furthermore, in this case, the orientation determination unit 72 determines whether or not the front/rear tilt angle is in an adjustable range in which the angle can be adjusted so as to be in the acceptable range of front/rear tilt. If the front/rear tilt angle is not in the adjustable range, the orientation determination unit 72 outputs an "adjustment impossible signal" to the weight measurement decision unit 75. On the other hand, upon receiving an input of an orientation determination instruction from the weight measurement decision unit 75, if the front/rear tilt angle is in the adjustable range, the orientation determination unit 72 outputs a "front/rear tilt adjustment signal" to the weight measurement decision unit 75 so that it drives the first hydraulic cylinder 23, the second hydraulic cylinder 27, the third hydraulic cylinder 29, and the fourth hydraulic cylinder 31, and performs control such that the front/rear tilt angle of the traveling machine body 11 falls within the acceptable range of front/rear tilt.

The accommodation detection unit 73 is connected to the first potentiometer 43 and the second potentiometer 44. Upon receiving an input of an accommodation determination instruction from the weight measurement decision unit 75, the accommodation detection unit 73 determines whether or not the transverse auger 41 has correctly been accommodated in the auger receiver 42, based on the swing angle input from the first potentiometer 43 and the pivot angle input from the second potentiometer 44.

Upon receiving an input of an accommodation determination instruction from the weight measurement decision unit 75, the accommodation detection unit 73 determines that the transverse auger 41 has appropriately been accommodated if the transverse auger 41 is in the accommodation position, and outputs an "appropriate accommodation signal" to the weight measurement decision unit 75. On the other hand, upon receiving an input of an accommodation determination instruction from the weight measurement decision unit 75, if the transverse auger 41 is not in the accommodation position, the accommodation detection unit 73 outputs, a "accommodation adjustment signal" to the weight measurement decision unit 75, the accommodation adjustment signal instructing the weight measurement decision unit 75 to drive the motor 46 and the swing cylinder 47 and to perform control such that the transverse auger 41 is correctly accommodated in the auger receiver 42.

The reaping height detection unit 74 is connected to the reaping height sensor 36 and the weight measurement decision unit 75. Upon receiving an input of a reaping height determination instruction from the weight measurement decision unit 75, the reaping height detection unit 74 determines whether or not the vertical position of the reaper unit 13 is lower than a predetermined height.

The reaping height detection unit 74 determines, upon receiving an input of a reaping height determination instruction from the weight measurement decision unit 75, that the reaping height is appropriate if the reaping height input from the reaping height sensor 36 is not smaller than a predetermined height, and outputs an "appropriate reaping height signal" to the weight measurement decision unit 75. On the other hand, upon receiving an input of a reaping height determination instruction from the weight measurement decision unit 75, the reaping height detection unit 74 determines that the reaping height is inappropriate if the reaping height input from the reaping height sensor 36 is smaller than the predetermined height, and does not output the "appropriate reaping height signal" to the weight measurement decision unit 75.

The weight measurement decision unit 75 is connected to the measurement switch 66, the working state determination unit 71, the orientation determination unit 72, the accommodation detection unit 73, the reaping height detection unit 74, the load cell 39, the calculation storage unit 77, the notification instructing unit 78, the first hydraulic cylinder 23, the second hydraulic cylinder 27, the third hydraulic cylinder 29, the fourth hydraulic cylinder 31, the motor 46, and the swing cylinder 47. The weight measurement decision unit 75 performs decision of whether or not to allow weight measurement by the load cell 39, adjustment of the orientation of the traveling machine body 11, adjustment of the position of the unloader 16, and instructions for notification.

Upon receiving an input of a "weight measurement signal" from the measurement switch 66, the weight measurement decision unit 75 outputs an instruction to request the working state determination unit 71 to determine the working state, and checks whether or not a "non-working signal" is sent as a response. If the "non-working signal" is not sent as a response, the weight measurement decision unit 75 outputs a "working signal" to the notification instructing unit 78. Upon recognizing that the "non-working signal" was sent as a response, the weight measurement decision unit 75 then outputs an instruction to request the reaping height detection unit 74 to perform reaping height determination, and checks whether or not a "reaping height signal" is sent as a response.

If the "appropriate reaping height signal" is not sent as a response, the weight measurement decision unit 75 output an "inappropriate reaping height signal" to the notification instructing unit 78. On the other hand, upon recognizing that the "appropriate reaping height signal" was sent as a response, the weight measurement decision unit 75 then outputs an instruction to request the orientation determination unit 72 to perform orientation determination, and checks the response. Upon recognizing that an "appropriate orientation signal", the left/right tilt angle, and the front/rear tilt angle were sent as a response from the orientation determination unit 72, the weight measurement decision unit 75 outputs the left/right tilt angle and the front/rear tilt angle to the calculation storage unit 77, then inputs an accommodation determination instruction to the accommodation detection unit 73, and checks the response.

On the other hand, upon recognizing that an "adjustment impossible signal" was sent as a response from the orientation determination unit 72, the weight measurement decision unit 75 outputs a "non-flat signal" to the notification instructing unit 78.

Furthermore, upon recognizing that a "left/right tilt adjustment signal" or a "front/rear tilt adjustment signal" was sent as a response from the orientation determination unit 72, the weight measurement decision unit 75 drives the first hydraulic cylinder 23, the second hydraulic cylinder 27, the third hydraulic cylinder 29, and the fourth hydraulic cylinder 31, and performs control such that the left/right tilt angle or the front/rear tilt angle of the traveling machine body 11 is brought closer to being flat.

Upon recognizing that an "appropriate accommodation signal" was sent as a response from the accommodation detection unit 73, the weight measurement decision unit 75 instructs the load cell 39 to measure the weight for a predetermined time period, and to output the measured weights to the weight obtaining unit 76, and outputs a "normal measurement signal" to the notification instructing unit 78. On the other hand, upon recognizing that a "accommodation adjustment signal" was sent as a response from the accommodation detection unit 73, the weight measurement decision unit 75 does not instruct the load cell 39 to perform weight measurement, and drives the motor 46 and the swing cylinder 47 to perform control such that the orientation of the transverse auger 41 is correctly changed to the accommodation position, thereby adjusting the position of the transverse auger 41 to the accommodation position.

The weight obtaining unit 76 is connected to the load cell 39 and the calculation storage unit 77. Upon obtaining the weight of the grain tank 15 from the load cell 39, the weight obtaining unit 76 calculates measurement data by obtaining the weight of this grain tank 15 for a predetermined time period and averaging the obtained values, and outputs this measurement data to the calculation storage unit 77.

The calculation storage unit 77 is connected to the weight measurement decision unit 75, the weight obtaining unit 76, and the notification instructing unit 78. The calculation storage unit 77 obtains the approximate weight value of the grain in the grain tank 15 by subtracting the tare weight of the grain tank 15 from the measurement data input from the weight obtaining unit 76. Then, the calculation storage unit 77 further corrects the approximate weight value based on the left/right tilt angle and the front/rear tilt angle of the traveling machine body 11 that were input from the weight measurement decision unit 75 so as to obtain the corrected weight value, and stores the corrected weight value.

The notification instructing unit 78 is connected to the weight measurement decision unit 75, the calculation storage unit 77, the display 50, and the speaker 51. Upon receiving an input of a "working signal" from the weight measurement decision unit 75, the notification instructing unit 78 causes the display 50, the speaker 51, or the like to display, for example, "weight measurement is not possible because the combine is in the working state" or the like or output a sound, thereby notifying the operator of this fact. Furthermore, upon receiving an input of an "inappropriate reaping height signal" from the weight measurement decision unit 75, the notification instructing unit 78 causes the display 50, the speaker 51, or the like to display, for example, "weight measurement is not possible because the reaping height is too small" or the like or output a sound, thereby notifying the operator of this fact. Furthermore, upon receiving an input of a "non-flat signal" from the weight measurement decision unit 75, the notification instructing unit 78 performs notification of the operator by causing the display 50, the speaker 51, or the like to output by display or sound "Measure the weight at a flat location" or the like.

Furthermore, upon the elapse of the time period for weight measurement, the notification instructing unit 78 reads the corrected weight value stored in the calculation storage unit 77, and causes the display 50, the speaker 51, or the like to display the "corrected weight value", that is, the "weight of the grain in the grain tank 15", or to output a sound, thereby notifying the operator of this fact.

<Flowchart>

Figure 4:
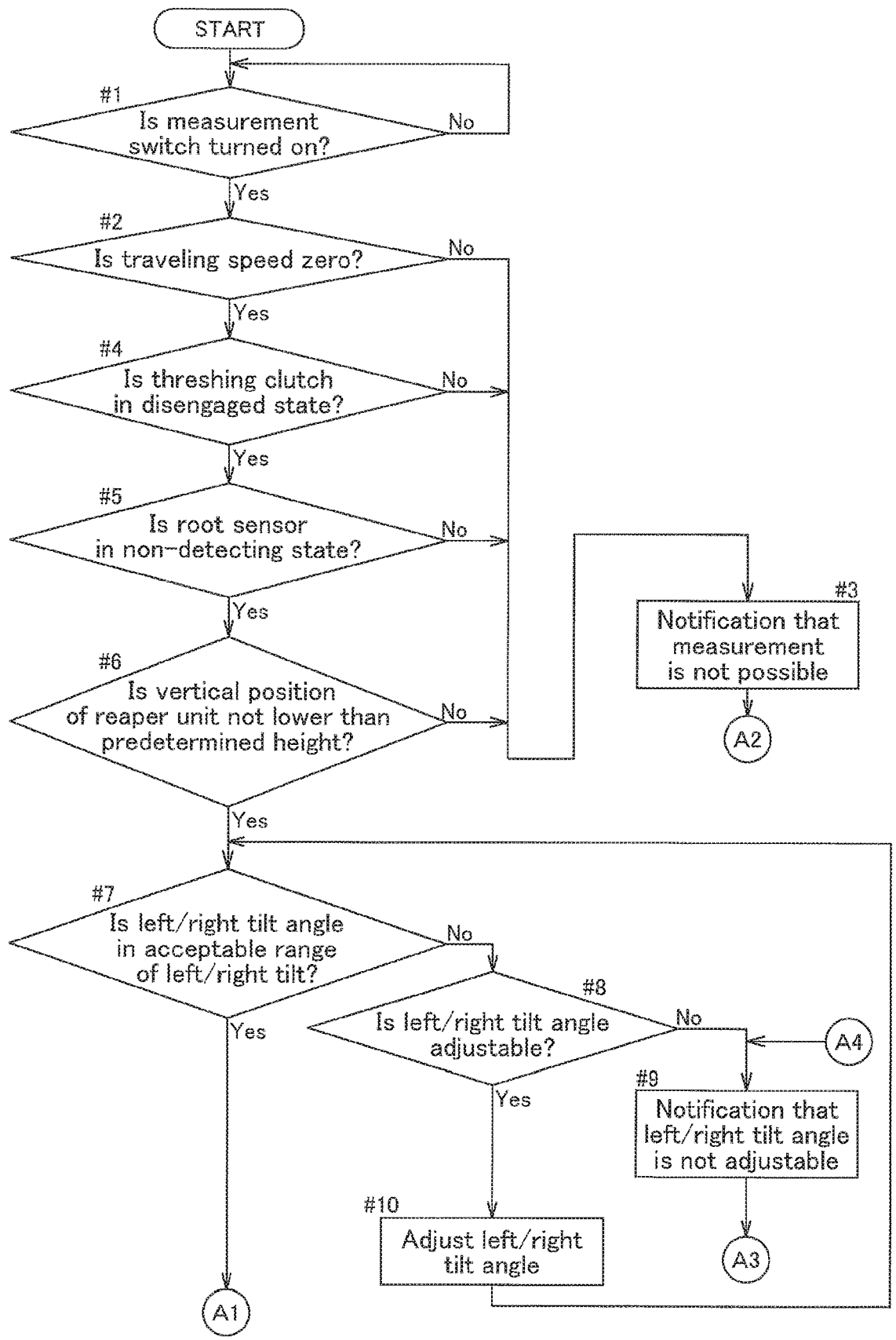
FIG. 4 is a flowchart schematically illustrating the control according to the first embodiment.
Figure 5:
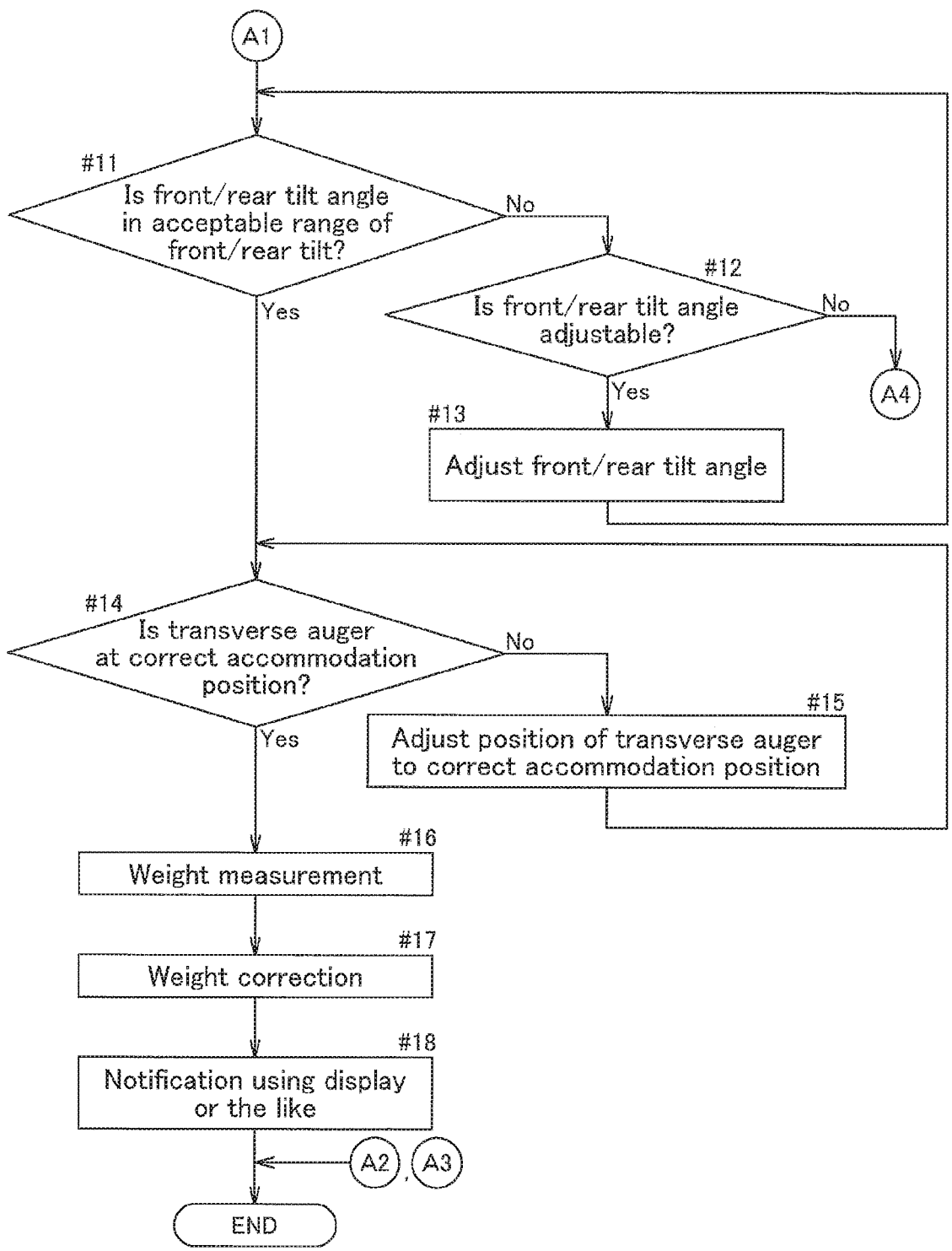
FIG. 5 is a flowchart schematically illustrating the control according to the first embodiment.

The procedure for measuring the weight of grain in the grain tank 15 that is realized by the above-described ECU 18 will be described with reference to the flowchart shown by FIGS. 4 and 5 together.

First, it is checked whether or not the measurement switch 66 has been operated and turned on (step #1). If it is determined in step #1 that the measurement switch 66 has not been operated and turned on (No in step #1), the procedure returns to step #1. If it is determined in step #1 that the measurement switch 66 has been operated and turned on (Yes in step #1), then it is determined whether or not the traveling speed of the traveling machine body 11 is zero (step #2). If it is determined in step #2 that the traveling speed of the traveling machine body 11 is not zero (No in step #2), notification for notifying that measurement is not possible is performed (step #3), and the procedure ends. On the other hand, if it is determined in step #2 that the traveling speed of the traveling machine body 11 is zero (Yes in step #2), then it is determined whether or not the threshing clutch 37 is in the disengaged state (step #4). If it is determined in step #4 that the threshing clutch 37 is not in the disengaged state (No in step #4), the procedure advances to step #3. On the other hand, if it is determined in step #4 that the threshing clutch 37 is in the disengaged state (Yes in step #4), then it is determined whether or not the root sensor 35 is in the non-detecting state (step #5). If it is determined in step #5 that the root sensor 35 is not in the non-detecting state (No in step #5), the procedure advances to step #3. On the other hand, if it is determined in step #5 that the root sensor 35 is in the non-detecting state (Yes in step #5), then it is determined whether or not the reaper unit 13 is not located lower than a predetermined height (step #6).

If it is determined in step #6 that the reaper unit 13 is located not higher than the predetermined height (No in step #6), the procedure advances to step #3. On the other hand, if it is determined in step #6 that the reaper unit 13 is located higher than the predetermined height (Yes in step #6), then it is determined whether or not the left/right tilt angle of the traveling machine body 11 is in an acceptable range of left/right tilt (step #7).

Figure 7:
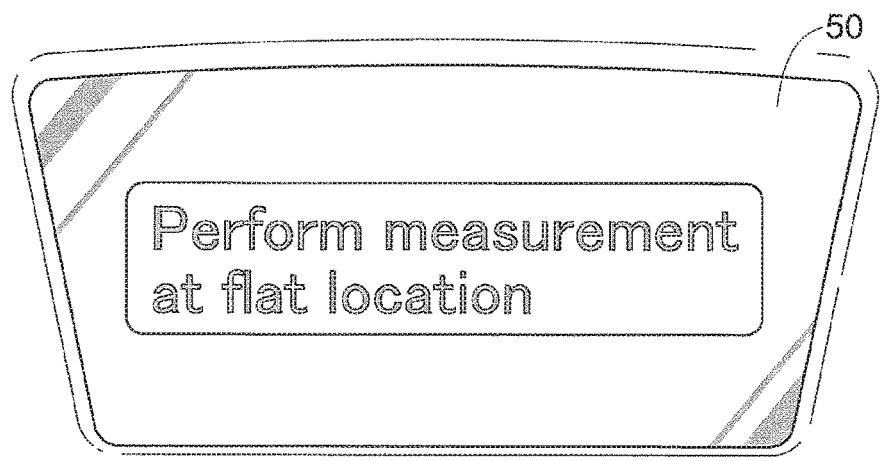
FIG. 7 is a diagram illustrating a display example on a display according to the first embodiment.

If it is determined in step #7 that the left/right tilt angle of the traveling machine body 11 is not in the acceptable range of left/right tilt (No in step #7), then it is determined whether or not the left/right tilt angle of the traveling machine body 11 is adjustable (step #8). If it is determined in step #8 that the left/right tilt angle of the traveling machine body 11 is not adjustable (No in step #8), notification for notifying that the left/right tilt angle is not adjustable is performed (step #9). In step #9, notification for prompting the operator to address the situation is performed, for example, by displaying a message such as "Perform measurement at a flat location" as shown in FIG. 7 on the display 50, by outputting a sound from the speaker 51, or by performing another method. If it is determined in step #8 that the left/right tilt angle of the traveling machine body 11 is adjustable (Yes in step #8), the left/right tilt angle of the traveling machine body 11 is adjusted (step #10), and the procedure returns to step #7.

If it is determined in step #7 that the left/right tilt angle of the traveling machine body 11 is in the acceptable range of left/right tilt (Yes in step #7), then it is determined whether or not the front/rear tilt angle of the traveling machine body 11 is in an acceptable range of front/rear tilt (step #11). If it is determined in step #11 that the front/rear tilt angle of the traveling machine body 11 is not in the acceptable range of front/rear tilt (No in step #11), then it is determined whether or not the front/rear tilt angle of the traveling machine body 11 is adjustable (step #12). If it is determined in step #12 that the front/rear tilt angle of the traveling machine body 11 is not adjustable (No in step #12), the procedure advances to step #9. If it is determined in step #12 that the front/rear tilt angle of the traveling machine body 11 is adjustable (Yes in step #12), the front/rear tilt angle of the traveling machine body 11 is adjusted (step #13), and the procedure returns to step #11.

If it is determined in step #11 that the front/rear tilt angle of the traveling machine body 11 is in the acceptable range of front/rear tilt (Yes in step #11), then it is determined whether or not the transverse auger 41 is at a correct accommodation position (step #14).

If it is determined in step #14 that the transverse auger 41 is not the correct accommodation position (No in step #14), control is performed such that the transverse auger 41 is moved to the correct accommodation position (step #15), and the procedure advances to step #14. If it is determined in step #14 that the transverse auger 41 is at the correct accommodation position (Yes in step #14), then weight measurement by the load cell 39 is executed (step #16). After step #16, weight correction for calculating a corrected value by correcting the measured value is executed (step #17). After step #17, the notification by the display or the like is made (step #18) and the procedure ends.

Other Aspects of First Embodiment (1-1) The foregoing first embodiment shows an example in which it is determined that the combine is in the non-working state if all conditions, namely, a condition that the traveling speed detected by the vehicle speed sensor 33 is zero, a condition that the threshing clutch 37 is in the disengaged state, and a condition that the root sensor 35 is in the non-detecting state are satisfied, but the present invention is not limited to this. A configuration is also possible in which it is determined that the combine is in the non-working state if, for example, any one or two of the conditions, namely, the condition that the traveling speed input from the vehicle speed sensor 33 is zero, the condition that the threshing clutch 37 is in the disengaged state, and the condition that the root sensor 35 is in the non-detecting state are satisfied.

(1-2) The foregoing first embodiment shows an example in which it is determined whether or not the reaping height is not lower than a predetermined height, but the present invention is not limited to this and the determination regarding the reaping height does not necessarily need to be made.

(1-3) The foregoing first embodiment shows an example in which it is determined whether or not the front/rear tilt angle is in an acceptable range of front/rear tilt, but the present invention is not limited to this and the determination for determining whether or not the front/rear tilt angle is in an acceptable range of front/rear tilt does not necessarily need to be made.

(1-4) The foregoing first embodiment shows an example in which it is determined whether or not the left/right tilt angle is in an acceptable range of left/right tilt, but the present invention is not limited to this and the determination for determining whether or not the left/right tilt angle is in an acceptable range of left/right tilt does not necessarily need to be made.

Figure 8:
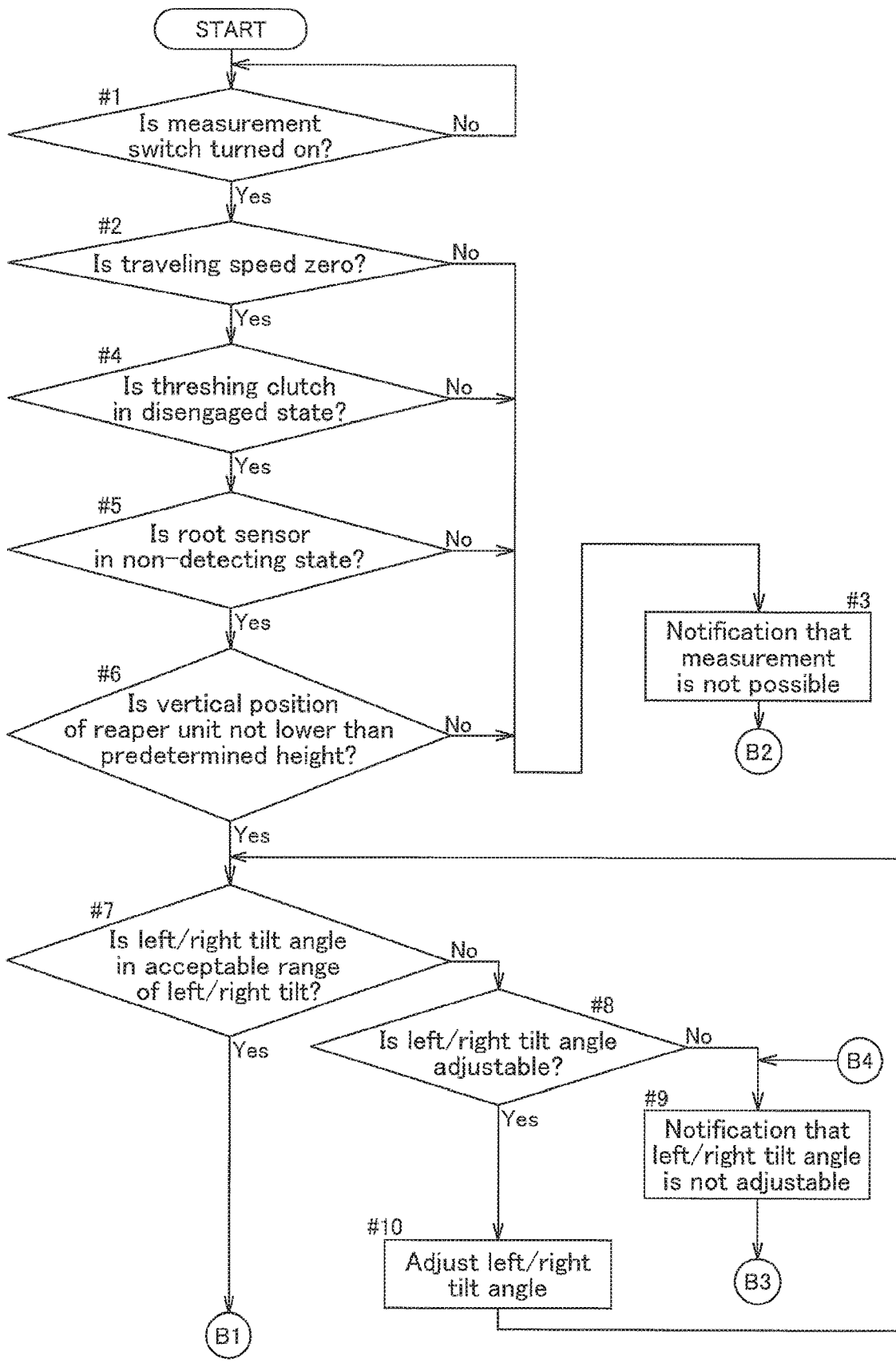
FIG. 8 is a flowchart according to another aspect of the first embodiment.
Figure 9:
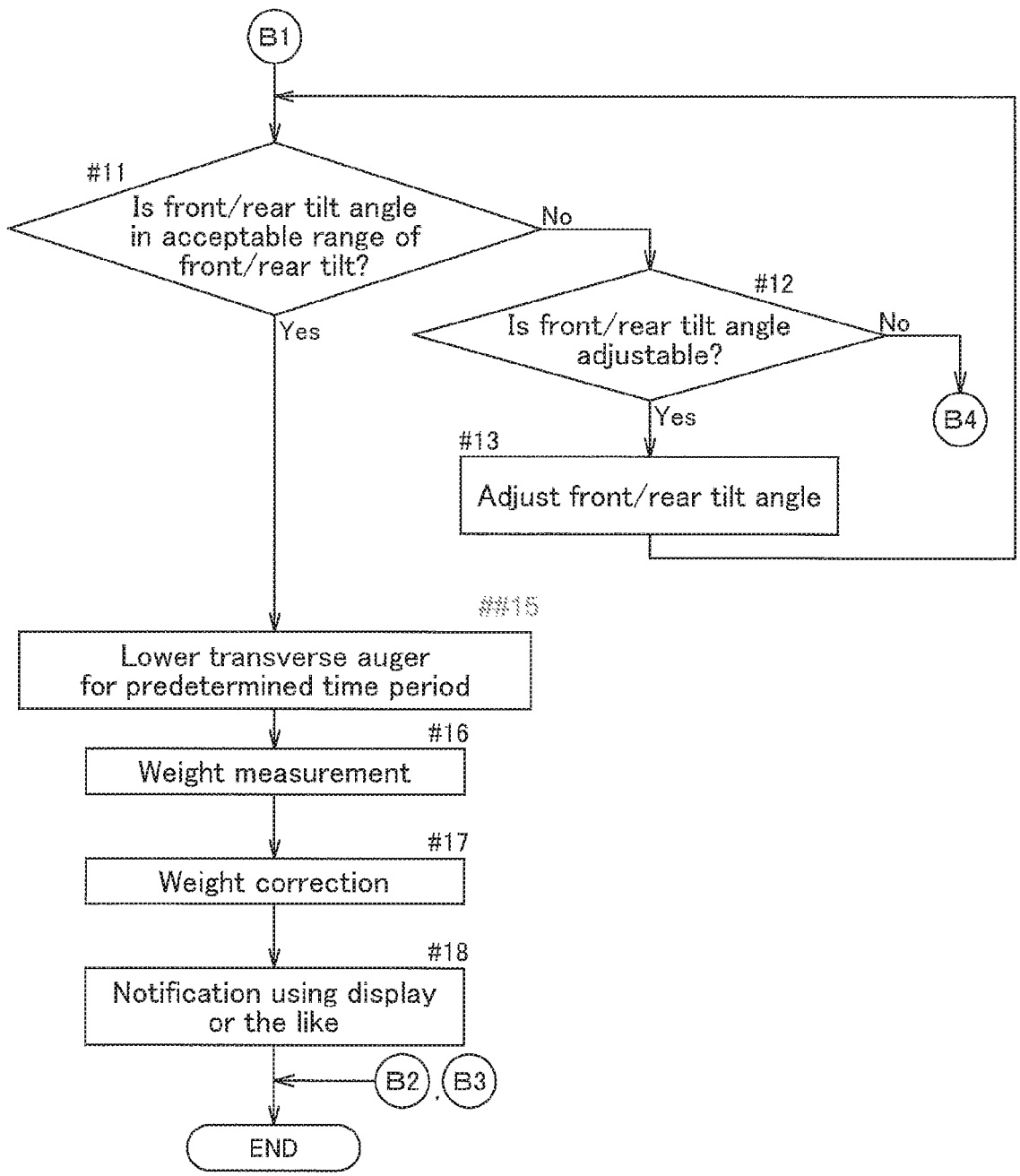
FIG. 9 is a flowchart according to another aspect of the first embodiment.

(1-5) The foregoing first embodiment shows an example in which if it is determined that the transverse auger 41 is not at an accommodation position, the transverse auger 41 is controlled so as to be moved to the accommodation position, but the present invention is not limited to this. In a configuration where, for example, the pivot position of the transverse auger 41 is automatically controlled so as to be located at a correct position, only the vertical position of the transverse auger 41 is located at an incorrect position. In other words, if it is determined by the working state determination unit 71 that the combine is in the non-working state, the weight measurement decision unit 75 controls the motor 46 to lower the transverse auger 41 for a predetermined time period, and then instructs the load cell 39 to perform weight measurement. In the flowcharts as shown in FIGS. 8 and 9 together, the transverse auger 41 is lowered for a predetermined time period (step ##15), instead of steps #14 and #15 in FIGS. 4 and 5. Furthermore, although the foregoing first embodiment shows an example in which it is determined whether or not the transverse auger 41 is correctly accommodated, the present invention is not limited to this and the determination for determining whether or not the transverse auger 41 is correctly accommodated does not necessarily need to be made.

(1-6) The foregoing first embodiment shows an example in which if weight measurement by the load cell 39 is not performed, an operator is notified of information relating to the measurement, but the present invention is not limited to this and a configuration is also possible in which even if weight measurement by the load cell 39 is not performed, an operator does not need to be notified of information relating to the measurement.

(1-7) The foregoing first embodiment shows an example of a crawler traveling type culm-head feeding combine, but the present invention is not limited to this and another combine such as a wheel traveling type culm-head feeding combine or a whole culm charging type combine may be used.

Second Embodiment

Figure 10:
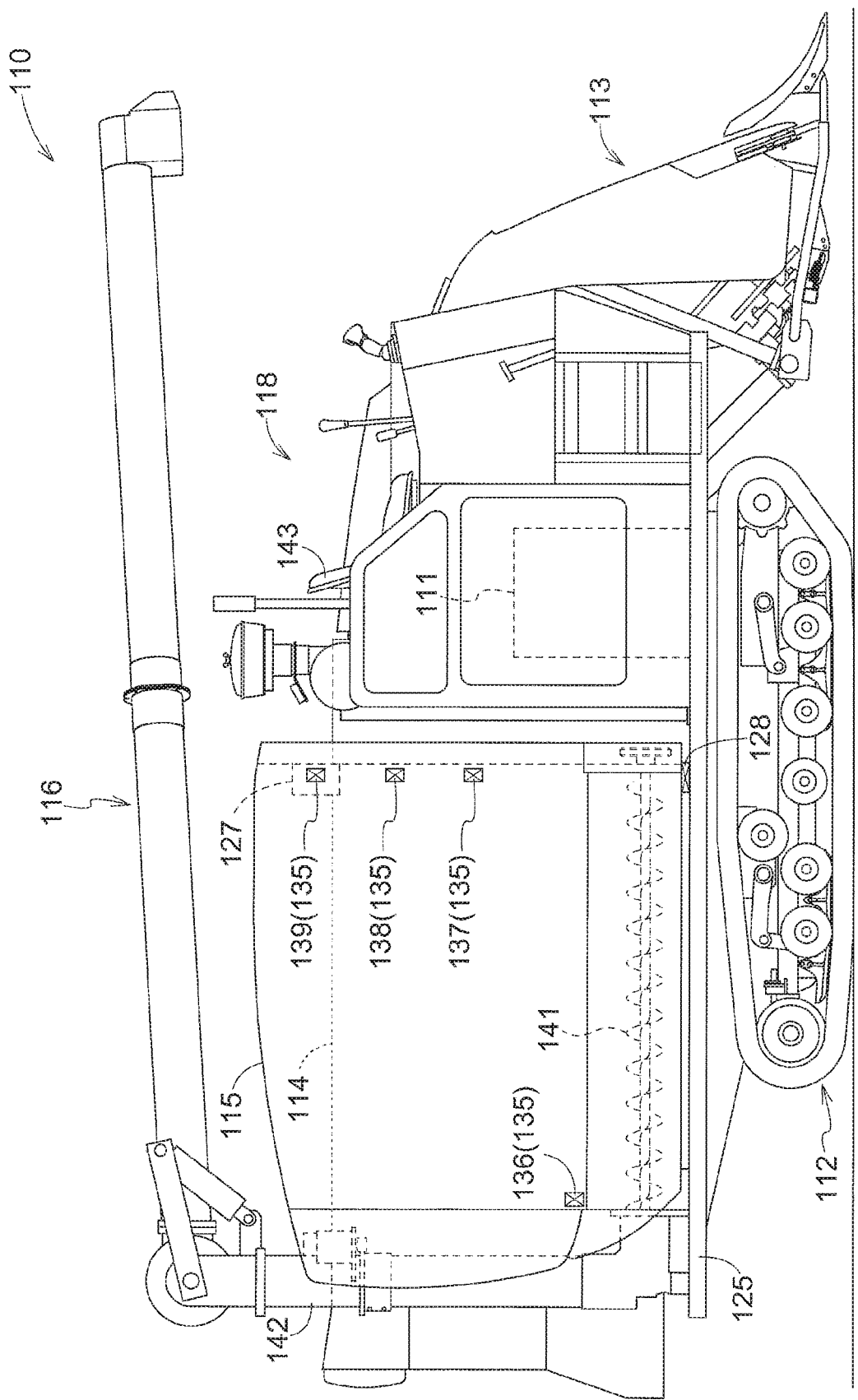
FIG. 10 is an overall side view illustrating a combine according to a second embodiment.
Figure 11:
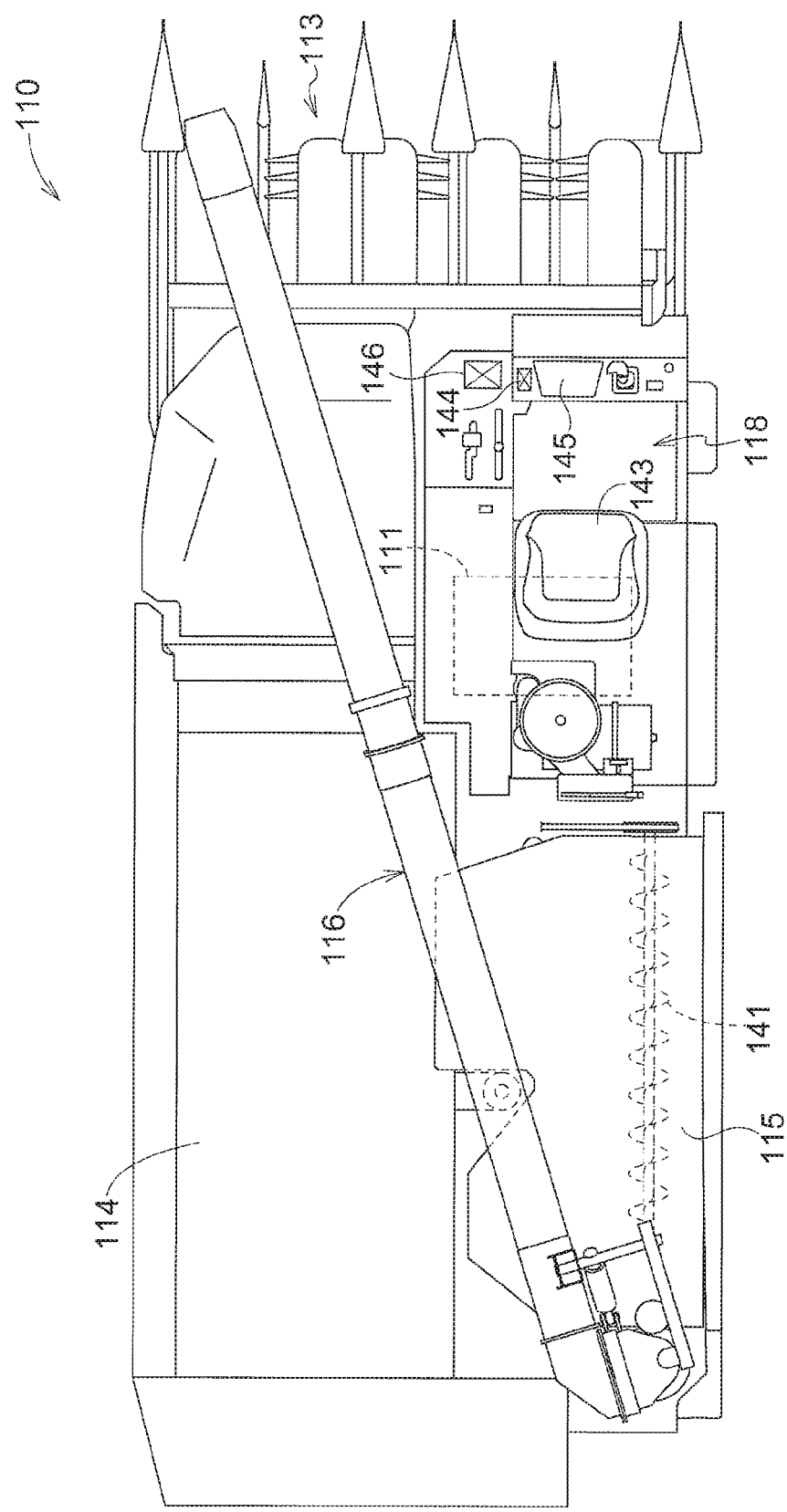
FIG. 11 is an overall plan view illustrating the combine according to the second embodiment.
Figure 12:
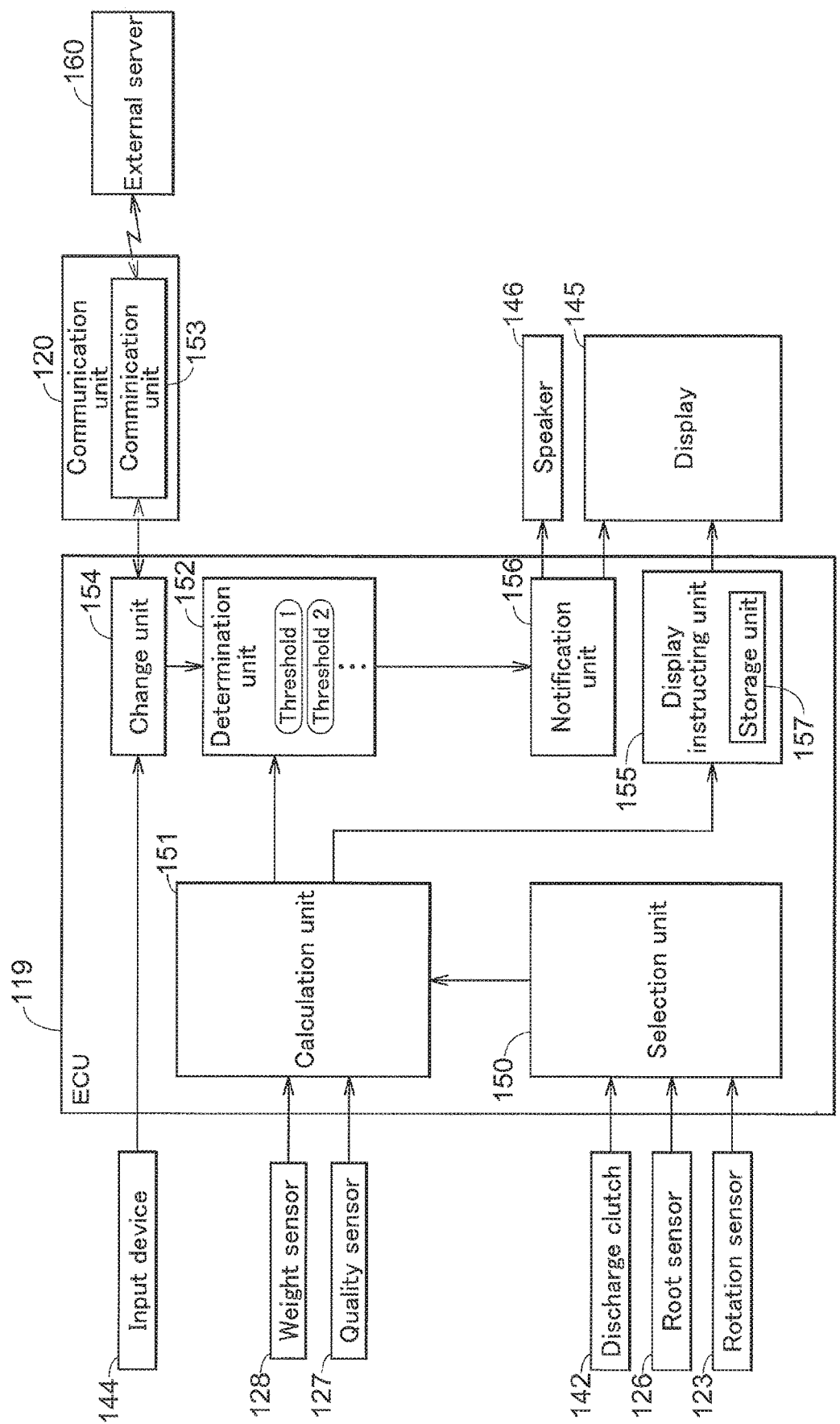
FIG. 12 is a block diagram illustrating a control configuration according to the second embodiment.

Hereinafter, a second embodiment of the present invention will be described with reference to the drawings.
<Schematic Configuration of Combine>
A combine 110 is a crawler traveling type culm-head feeding combine, and is provided with, as shown in FIGS. 10 to 12, a right and left pair of crawler traveling devices 112 serving as traveling mechanisms that are driven by an engine 111 so as to rotate, a traveling machine body configured to automatically travel using the crawler traveling devices 112, a reaper unit 113 that reaps standing grain culms, a threshing unit 114 that threshes the grain culms reaped by the reaper unit 113, a grain tank 115 that retains the grain threshed by the threshing unit 114, an unloader 116 capable of discharging the grain retained in the grain tank 115 to the outside, an operation and steering unit 118 by which an operator performs steering, an ECU 119 that serves as a control device, and a communication unit 120 capable of communicating with the outside.

In the vicinity of the crawler traveling devices 112, a rotation sensor 123 (see FIG. 12) that detects rotation of the crawler traveling devices 112 about their axes of rotation (not shown) is provided. The rotation sensor 123 is used for detecting the traveling speed.

As shown in FIGS. 10 and 11, the reaper unit 113 is supported by the front portion of a machine body frame 125 of the traveling machine body so as to be able to be vertically raised and lowered. The grain culms reaped by the reaper unit 113 are fed to the threshing unit 114. The reaper unit 113 is operated by the power of the engine 111. The reaper unit 113 is provided with a root sensor 126 (see FIG. 12) that is configured to detect the roots of the reaped grain culms that are present in the reaper unit 113, the root sensor 126 serving as a grain culm sensor. The fact that the roots of grain culms were detected by the root sensor 126 means that the reaper unit 113 is operating.

As shown in FIGS. 10 and 11, the threshing unit 114 is supported by the rear portion of the machine body frame 125. The threshing unit 114 threshes the grain from the grain culms reaped by the reaper unit 113, and feeds the threshed grain to the grain tank 115. The threshing unit 114 is operated by the power of the engine 111.

As shown in FIGS. 10 and 11, the grain tank 115 is located on the machine body right side of the threshing unit 114 of the machine body frame 125, and is arranged behind the engine 111. The grain tank 115 is provided with, on the front side thereof, a quality sensor 127 capable of measuring the moisture value, protein value, and the like of the grain retained in the grain tank 115. The quality sensor 127 measures the quality (taste quality) such as the moisture value or the protein value of part of the grain that was fed from the threshing unit 114 to the grain tank 115. Furthermore, a weight sensor 128 (an example of a "measurement sensor") is provided below the grain tank 115. The weight sensor 128 is configured to be able to measure the weight of the grain tank 115 in which grain is retained. That is, the weight sensor 128 is used for measuring the weight of the grain retained in the grain tank 115, and the weight of the grain retained in the grain tank 115 based on the measurement of the weight sensor 128 is used for calculating a "retention volume amount" of the grain retained in the grain tank 115.

Furthermore, a level sensor 135 capable of measuring the retention level of the grain retained in the grain tank 115 is provided within the grain tank 115. The level sensor 135 is constituted by one contact sensor or a plurality of contact sensors arranged at different heights. For example, a first sensor 136, a second sensor 137, a third sensor 138, and a fourth sensor 139, which serve as the level sensors 135, are disposed at different heights in the stated order moving upward from the bottom. The first sensor 136 is provided on the rear side of the inner surface of the grain tank 115. The second sensor 137, the third sensor 138, and the fourth sensor 139 are provided on the front side of the inner surface of the grain tank 115.

Furthermore, a discharge auger 141 is provided on the bottom of the grain tank 115. The discharge auger 141 is configured to operate to discharge the grain to the outside via the unloader 116 when a discharge clutch 142 (see FIG. 12) is put into the engaged state, and to be stopped when the discharge clutch 142 is put into the disengaged state without discharging the grain. The discharge auger 141 is operated by the power of the engine 111.

As shown in FIGS. 10 and 11, the operation and steering unit 118 is provided with an operator seat 143 on which an operator is seated, an input device 144 which is operated to input a "new threshold" of the "retention volume amount", a display 145 (which corresponds to a "display unit") capable of displaying various types of information, a speaker 146 capable of outputting various sounds, and the like.

The display 145 includes a plurality of display modes, namely, a "retention volume amount mode" in which the "retention volume amount" of the grain retained in the grain tank 115 is displayed, a "fuel consumption amount display mode" in which the "fuel consumption amount", which is an integrated value of amounts of fuel consumption of the engine 111, can be displayed, and other display modes. The display 145 is configured so as to be switchable in order from a specific display mode to another display mode by pushing a changing-over switch (not shown) for a short time.

<ECU and Communication Unit>

As shown in FIG. 12, a selection unit 150, a calculation unit 151, a determination unit 152, a communication unit 153, a change unit 154, a display instructing unit 155, and a notification unit 156 are provided as control configurations. The selection unit 150, the calculation unit 151, the determination unit 152, the change unit 154, the display instructing unit 155, and the notification unit 156 are included in the ECU 119. The display instructing unit 155 includes a storage unit 157. The communication unit 153 is capable of transmitting and receiving information to and from an external server 160 arranged in a management center or the like via wireless communication using Wi-Fi standard or the like, and is included in the communication unit 120.

The selection unit 150 selects which one of the real-time "retention volume amount mode" and the determined "retention volume amount" is to be displayed on the display 145 in the "retention amount display mode" depending on the states of the discharge clutch 142, the root sensor 126, and the rotation sensor 123. The selection unit 150 is connected to the discharge clutch 142, the root sensor 126, the rotation sensor 123, and the calculation unit 151. Ordinarily, the selection unit 150 continues to output a "real-time display signal" to the calculation unit 151. Note that upon recognizing that the discharge clutch 142 has been put into the engaged state from the disengaged state, the selection unit 150 outputs a "storage instruction signal" to the calculation unit 151, and continues to output a "determination display signal", instead of the "real-time display signal", to the calculation unit 151. Then, when the root sensor 126 is put into the detecting state from this state, and the rotation sensor 123 is put into the detecting state of detecting rotation about the drive axis, the selection unit 150 returns again to the state of continuing to output the "real-time display signal", instead of the "determination display signal", to the calculation unit 151.

The calculation unit 151 calculates the "retention volume amount" of the grain retained in the grain tank 115 based on the information from the weight sensor 128 and the quality sensor 127. The calculation unit 151 is connected to the weight sensor 128, the quality sensor 127, the determination unit 152, and the display instructing unit 155. The calculation unit 151 is configured to calculate the "approximate weight" of the grain retained in the grain tank 115 by subtracting the tare weight of the grain tank 115 from the weight of the grain tank 115 measured by the weight sensor 128. Then, the calculation unit 151 reads out the "value for specific gravity" of the grain that corresponds to the moisture value, the protein value, and the like that is stored in advance in the storage unit 157, based on the moisture value and the protein value of the grain that were measured by the quality sensor 127. Then, the calculation unit 151 calculates the "retention volume amount" of the grain retained in the grain tank 115, based on the "approximate weight" of the grain retained in the grain tank 115 obtained by the measurement of the weight sensor 128, and the "value for specific gravity" that is determined by the moisture value, the protein value, and the like of the grain detected by the quality sensor 127. The calculation unit 151 is configured to continue to output in real time the "retention volume amount" to the determination unit 152 and the display instructing unit 155 while an input of a "real-time display signal" is received from the selection unit 150. Furthermore, upon receiving an input of the "determination display signal" from the selection unit 150, the calculation unit 151 stores, as the determined "retention volume amount", the retention volume amount that was calculated immediately before the discharge clutch 142 is put into the engaged state from the disengaged state, that is, immediately before the discharge auger 141 is operated in the storage unit 157. Also, the calculation unit 151 is configured to continue to output a "read-out display signal" to the display instructing unit 155 while the "determination display signal" is input from the selection unit 150.

The determination unit 152 determines whether or not the "retention volume amount" exceeds a "threshold". The determination unit 152 is connected to the calculation unit 151, the change unit 154, and the notification unit 156. The determination unit 152 has stored therein a "threshold" that is set in units of volume. The determination unit 152 is configured to be able to set a plurality of "thresholds". For example, a "first threshold", which is a desired target value for retention in the grain tank 115, a "second threshold", which is smaller than the desired target value, and the like can suitably be set as the "thresholds". The determination unit 152 is configured to determine whether or not the "retention volume amount" that is input from the calculation unit 151 exceeds the "threshold" set in advance. The determination unit 152 compares the "retention volume amount" input from the calculation unit 151 with the "threshold", and if the "retention volume amount" exceeds the "threshold", a "notification signal" will be output to the notification unit 156.

The communication unit 153 is configured to output, upon receiving information including a "new threshold" or the like from the external server 160, this "new threshold" to the change unit 154. Furthermore, when a "threshold" is changed by the change unit 154, the communication unit 153 is configured to transmit this change result to the external server 160. That is, the communication unit 153 is configured to transmit information relating to the change result including the fact that a "threshold" was changed by the input device 144, the changed "new threshold", and the like to the external server 160.

The change unit 154 changes the "threshold" set in the determination unit 152 to the "new threshold". The change unit 154 is connected to the input device 144, the determination unit 152, and the communication unit 153. The change unit 154 is configured to, upon receiving an input of a "new threshold" from the input device 144, change the "threshold" set in the determination unit 152 to the "new threshold". The change unit 154 is configured to be able to change the "threshold" based on the information including the "new threshold" and the like that was input from the external server 160 via the communication unit 153. That is, the change unit 154 is configured to, upon receiving an input of the "new threshold" from the communication unit 153, change the "threshold" set in the determination unit 152 to the "new threshold". Upon receiving inputs of "new thresholds" from the input device 144 and the communication unit 153 at the same time, the change unit 154 changes the "threshold" set in the determination unit 152 to the "new threshold" input from the communication unit 153. Furthermore, upon receiving an input of a "new threshold" from the input device 144, the change unit 154 outputs, to the communication unit 153, the information relating to the change result including the fact that the "threshold" was changed by the input device 144, the changed "new threshold", and the like.

The display instructing unit 155 instructs the display 145 to display the real-time "retention volume amount" or the determined "retention volume amount" in the "retention volume amount mode". The display instructing unit 155 is connected to the calculation unit 151 and the display 145. The storage unit 157 included in the display instructing unit 155 is configured to be able to store/delete various types of information. The storage unit 157 has stored therein in advance "values for specific gravity" for the respective stored moisture value and protein value of the grain. Furthermore, in the storage unit 157, the determined "retention volume amount" input from the calculation unit 151. Furthermore, the storage unit 157 has a configuration such that the "fuel consumption amount", which is an integrated value of the amounts of fuel consumption of the engine 111, is stored in real time, although the detailed description thereof is omitted. The display instructing unit 155 gives an instruction such that the display 145 in the "retention volume amount mode" continues to display its real-time "retention volume amount" while the real-time "retention volume amount" is input from the calculation unit 151. Then, the display instructing unit 155 gives an instruction such that the display 145 in the "retention volume amount mode" continues to display the determined "retention volume amount" stored in the storage unit 157 while an input of a "read-out display signal" is received from the calculation unit 151.

When the "retention volume amount" exceeds the "threshold", the notification unit 156 notifies the operator. The notification unit 156 is connected to the determination unit 152, the display 145, and the speaker 146. Upon receiving an input of a "notification signal" from the determination unit 152, the notification unit 156 causes the display 145 to display information that "the amount of the grain exceeds the threshold" and causes the speaker 146 to output a sound such as a buzzer meaning that "the amount of the grain exceeds the threshold". That is, when it is determined by the determination unit 152 that the "retention volume amount" of the grain in the grain tank 115 exceeds the "threshold", the notification unit 156 notifies the operator of the information relating to the fact that the "retention volume amount" of the grain in the grain tank 115 exceeds the "threshold". The notification may have various types of forms, for example, a form in which characters, symbols, and figures showing that "harvest in the target retention volume amount is achieved" are displayed on the display 145, or a form in which a buzzer sound or the like is made by the speaker 146.

<Description of Operation>

The following will describe the operation of the combine 110 provided with the ECU 119 and the communication unit 120.

For example, before or during the reaping work, the operator operates the input device 144 to input any "new threshold" such as the "threshold" that corresponds to the capacity of the container or the grain bag, for example. Accordingly, the "threshold" in the determination unit 152 is changed to the "new threshold", and this change result is transmitted to the external server 160 via the communication unit 153 of the communication unit 120. Furthermore, when the communication unit 153 of the communication unit 120 receives information including a "new threshold" from the external server 160, the "threshold" in the determination unit 152 is changed to the "new threshold".

When the reaping work is performed in the state in which the "new threshold" is set in the determination unit 152, the "retention volume amount" of the grain in the grain tank 115 is updated in real time and continues to be displayed on the display 145 in the "retention volume amount mode". Then, when the grain in the "retention volume amount" that exceeds the "new threshold" is retained in the grain tank 115, the operator is notified that the grain in the desired "retention volume amount" is retained in the grain tank 115 by a display of the display 145 or a sound from the speaker 146.

Then, when the discharge auger 141 is operated to discharge the grain to the outside, the "retention volume amount" before the start of the discharge auger 141 continues to be displayed on the display 145 in the "retention volume amount mode" during the time period from the start of the operation of the discharge auger 141 to the next reaping work. Based on the fact that both the root sensor 126 and the rotation sensor 123 are put into the detecting states, it is determined that the next reaping work is to be executed. When the next reaping work is performed, the display 145 in the "retention volume amount mode" returns again to the state in which the "retention volume amount" of the grain in the grain tank 115 is updated in real time and displayed.

<Reset of Fuel Consumption Amount>

When the display 145 is in the "fuel consumption amount mode", it is configured such that the value of the "fuel consumption amount" stored in the storage unit 157 can be reset to zero by an operation of pressing the changing-over switch for a longer time than the operation of pushing it for a short time. Then, the reset "fuel consumption amount" is counted again from zero. Accordingly, by making the "fuel consumption amount" resettable, it is possible using the display 145 in the "fuel consumption amount mode" to easily recognize a difference in fuel consumption amount, for example, between agricultural fields on which reaping works are performed or between operators who perform reaping works.

Other Aspects of Second Embodiment (2-1) The foregoing second embodiment shows an example in which a "threshold" can be set in units of volume, but the present invention is not limited to this and a "threshold" may be set in units of weight. In this case, the determination unit 152 compares, with the "threshold", the "approximate weight" of the grain retained in the grain tank 115 based on the measurement of the weight sensor 128.

Figure 13:
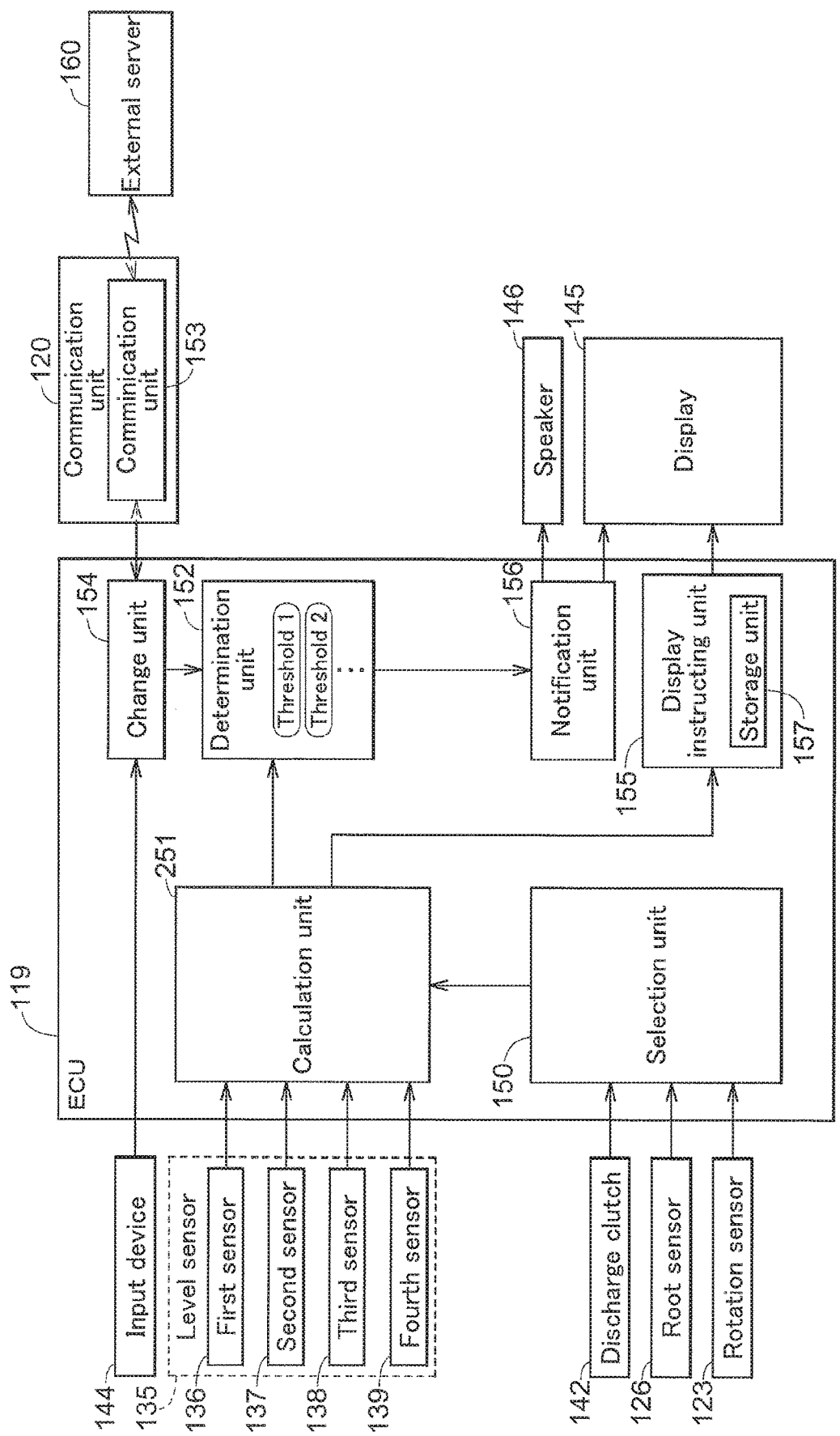
FIG. 13 is a block diagram illustrating a control configuration according to another aspect of the second embodiment.

(2-2) The foregoing second embodiment shows an example in which the "retention volume amount" of the grain retained in the grain tank 115 is calculated based on the weight sensor 128 and the quality sensor 127, which serve as the "measurement sensors", but the present invention is not limited to this. For example, the level sensor 135 may be used as the "measurement sensor" to calculate the "retention volume amount" of grain retained in the grain tank 115, based on the retention level of the grain retained in the grain tank 115 that is measured by the level sensor 135. In this case, as shown in FIG. 13, the ECU 119 includes, instead of the calculation unit 151, a calculation unit 251 that calculates the "retention volume amount" of the grain retained in the grain tank 115 based on the retention level measured by the level sensor 135. Detection signals from the first sensor 136, the second sensor 137, the third sensor 138, and the fourth sensor 139, which serve as the level sensors 135, are input into the calculation unit 251. When a detection signal is input only from the first sensor 136, the calculation unit 251 calculates the volume from the bottom of the grain tank 115 to the position of the first sensor 136 as the "retention volume amount" of the grain in the grain tank 115. Furthermore, when detection signals are input from the first sensor 136 and the second sensor 137, the calculation unit 251 calculates the volume from the bottom of the grain tank 115 to the positon of the second sensor 137 as the "retention volume amount" of the grain in the grain tank 115. Furthermore, when detection signals are input from the first sensor 136, the second sensor 137, and the third sensor 138, the calculation unit 251 calculates the volume from the bottom of the grain tank 115 to the position of the third sensor 138 as the "retention volume amount" of the grain in the grain tank 115. Furthermore, when detection signals are input from all of the first sensor 136 to the fourth sensor 139, the calculation unit 251 calculates the volume from the bottom of the grain tank 115 to the position of the fourth sensor 139 as the "retention volume amount" of the grain in the grain tank 115. In this case, it is advantageous that the "threshold" of the determination unit 152 is settable in four stages in units of volume, namely, for example, four stages corresponding to the first sensor 136 to the fourth sensor 139, and it is configured such that the "threshold" of the determination unit 152 can be changed to any one of the four stages by the change unit 154. Note that the number of the level sensors 135 is not limited to 4, and 1 to 3, or 5 level sensors 135 or more may be provided.

(2-3) The foregoing second embodiment shows an example in which the quality sensor 127 measures the quality of grain such as the moisture value or the protein, but the present invention is not limited to this and it is sufficient that the quality sensor 127 can measure at least the moisture value of grain.

(2-4) The foregoing second embodiment shows an example in which based on the fact that both the root sensor 126 and the rotation sensor 123 are put into the detecting states, it is determined that the next reaping work is to be executed, but the present invention is not limited to this. It is also possible that based on the fact that either the root sensor 126 or the rotation sensor 123 is put into the detecting state, it is determined that the next reaping work is to be executed.

(2-5) The foregoing second embodiment shows an example in which the "first threshold", which is a desired target value for retention in the grain tank 115, the "second threshold", which is smaller than the desired target value, and the like can be set as "thresholds" in the determination unit 152, but the present invention is not limited to this. For example, the number of thresholds that is settable in the determination unit 152 may be one or three or more.

(2-6) The foregoing second embodiment shows an example in which the communication unit 153 is provided in the communication unit 120, but the present invention is not limited to this and the communication unit 153 may be provided in the ECU 119.

(2-7) The foregoing first embodiment shows an example of a crawler traveling type culm-head feeding combine, but the present invention is not limited to this, and another combine such as a wheel traveling type culm-head feeding combine or a whole culm charging type combine may be used.

Third Embodiment

Hereinafter, the third embodiment of the present invention will be described with reference to the drawings.

FIRST EXAMPLE

First, a first example of a third embodiment will be described.

<Schematic Configuration of Combine>

Figure 14:
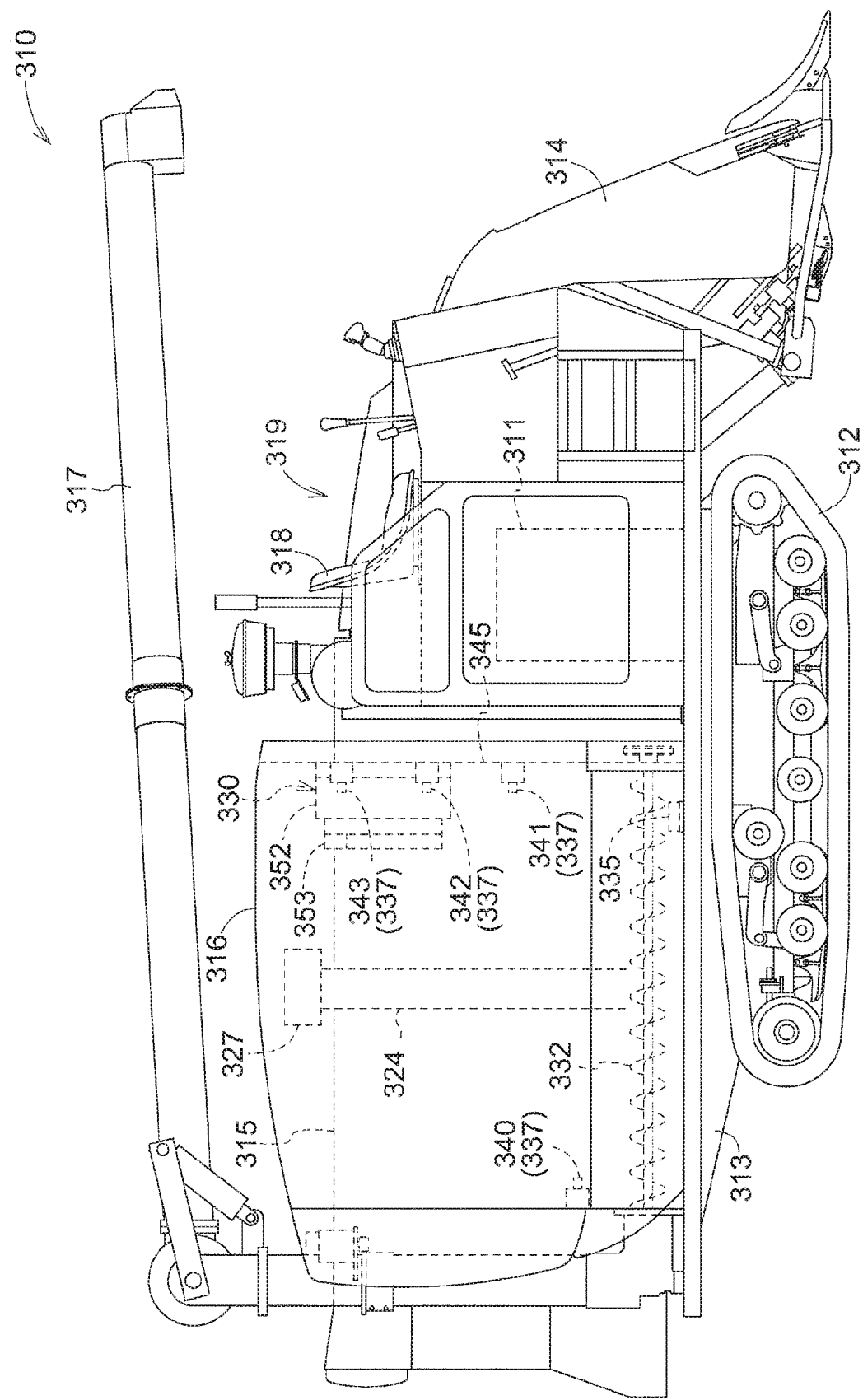
FIG. 14 is an overall side view illustrating a combine according to a first example of a third embodiment.
Figure 15:
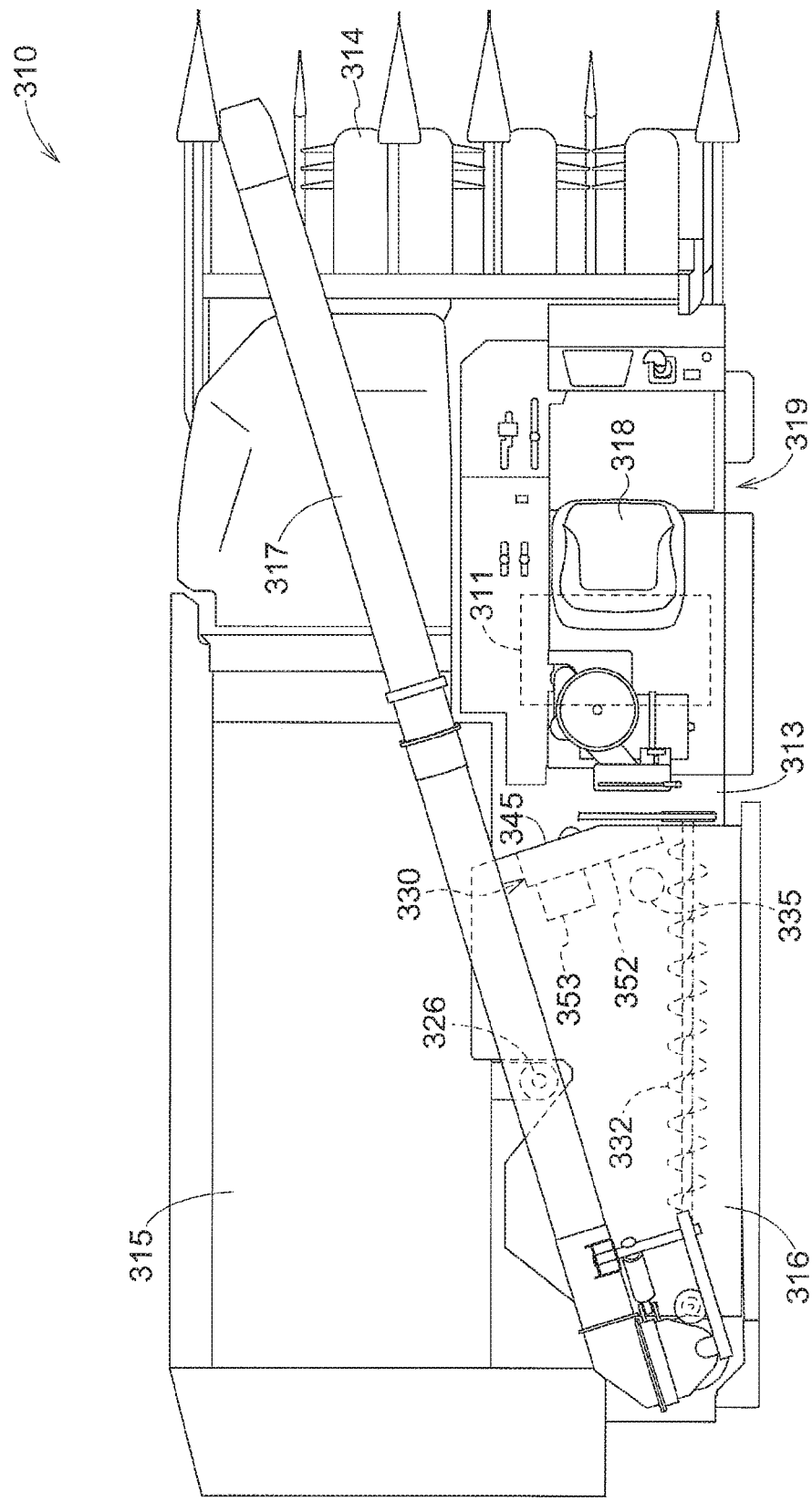
FIG. 15 is an overall plan view illustrating the combine according to the first example of the third embodiment.

A combine 310 is a crawler traveling type culm-head feeding combine, and is provided with, as shown in FIGS. 14 and 15, a traveling machine body that is configured to automatically travel using a right and left pair of crawler devices 312 that are driven by an engine 311. The combine 310 is further provided with a reaper unit 314 that reaps standing grain culms and is supported by the front portion of a machine body frame 313 of the traveling machine body, a threshing device 315 that threshes the reaped grain culms, a grain tank 316 that retains the grain threshed by the threshing device 315, an unloader 317 that discharges the grain in the grain tank 316 to the outside, an operation and steering unit 319 including an operator seat 318 on which an operator is seated, and the like.

<Grain Tank>

Figure 16:
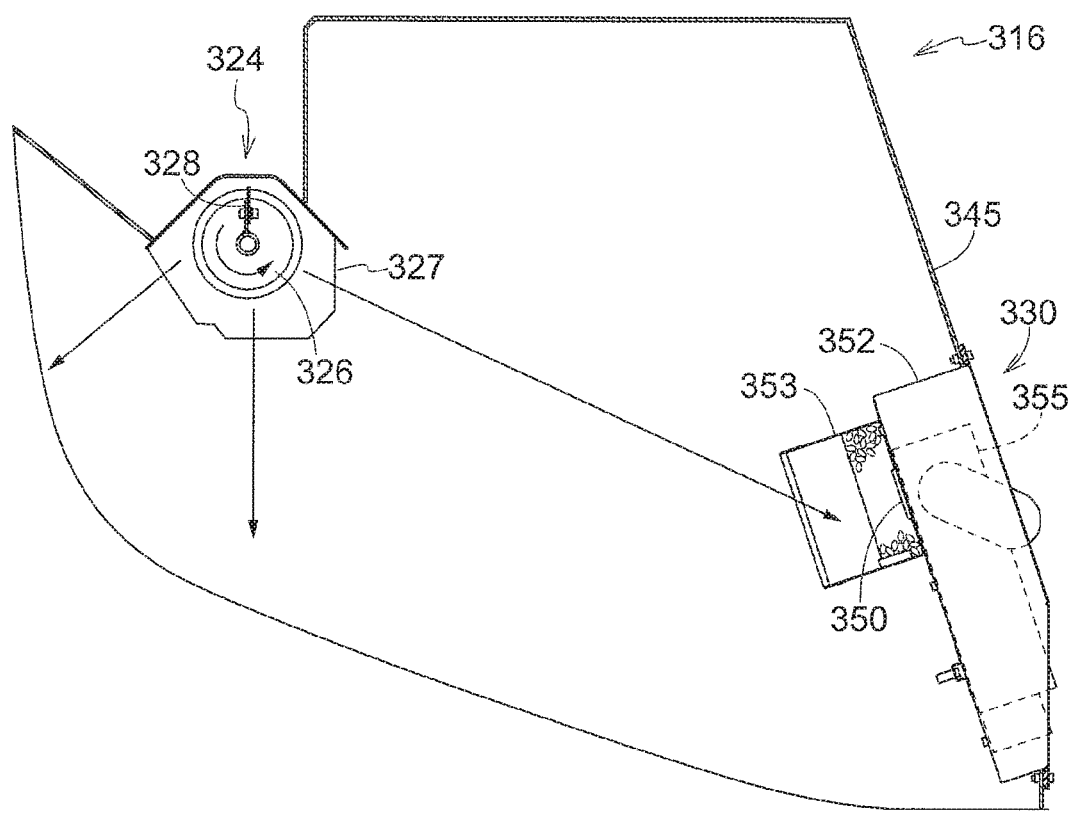
FIG. 16 is a transverse sectional plan view illustrating the front portion of a grain tank according to the first example of the third embodiment.

As shown in FIGS. 14 and 15, the grain tank 316 is arranged on the machine body right side of the threshing device 315 of the machine body frame 313, and is located rearward of the engine 311. A grain lifting device 324 is provided on the left side of the grain tank 316. The grain lifting device 324 is arranged in the machine body left lateral portion of the grain tank 316. As shown in FIGS. 14 to 16, the grain lifting device 324 lifts and feeds the grain conveyed from the threshing device 315 to a spout 327 by a lift and feed screw 326. The grain lifted and fed to the spout 327 is scattered from the spout 327 by a moving vane 328, which is provided integrally with the lift and feed screw 326 and is driven to rotate in a counterclockwise fashion, and is supplied while being distributed in a wide range in the grain tank 316. Most of the grain supplied from the spout 327 is supplied to an internal space M in the grain tank 316 (see FIGS. 18 and 19). Part of the grain supplied from the spout 327 is supplied to a measurement unit 330, which is disposed in the front portion of the grain tank 316 and measures the quality of grain retained in the grain tank 316 (see FIGS. 18 and 19). Accordingly, the grain conveyed from the threshing device 315 is retained in the grain tank 316.

Figure 17:
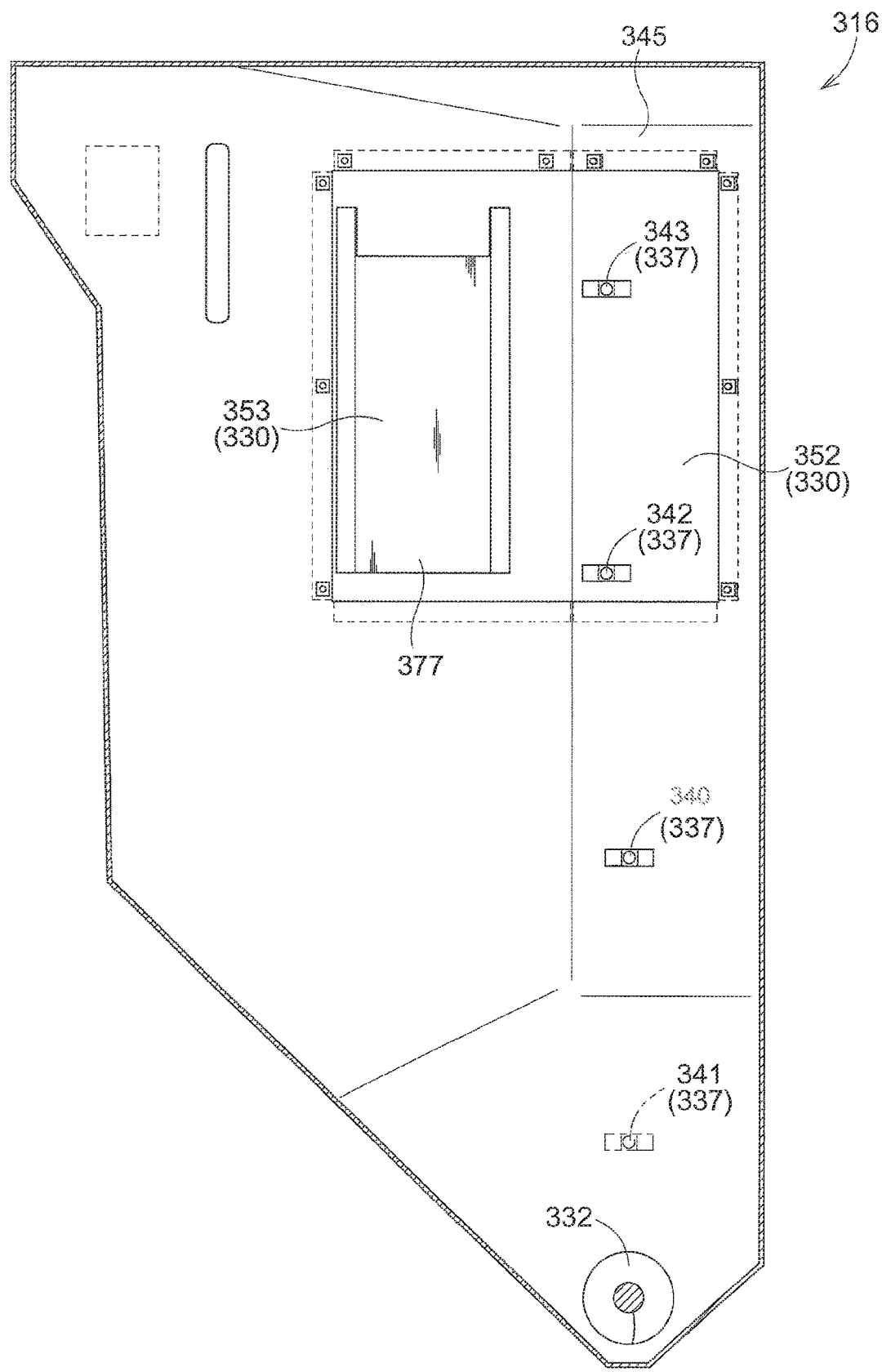
FIG. 17 is a diagram illustrating an arrangement of level sensors in the grain tank according to the first example of the third embodiment.

As shown in FIGS. 14, 15, and 17, a discharge auger 332 that is configured to discharge the grain retained in the grain tank 316 to the outside and is directed in the front-rear direction of the machine body is provided on the bottom of the grain tank 316. The discharge auger 332 is provided with a discharge clutch 333 (see FIG. 23) that is operated by the driving force of the engine 311 and is for switching on/off driving power transmission to the discharge auger 332. When the discharge clutch 333 is put into an engaged state, the discharge auger 332 is operated, and the grain retained in the grain tank 316 is discharged by the discharge auger 332 from the rear of the grain tank 316 and discharged to the outside through the unloader 317 shown in FIGS. 14 and 15. When the discharge clutch 333 is put into a disengaged state, the operation of the discharge auger 332 is stopped.

As shown in FIGS. 14 and 15, a load cell 335, which serves as a weight sensor and is configured to measure the weight of the grain in the grain tank 316 based on the weight of the grain tank 316, is provided at the lower position in the front portion of the grain tank 316.

As shown in FIGS. 14 and 17, level sensors 337 for detecting the retention levels of the grain in the grain tank 316 are provided in the grain tank 316. As the level sensors 337, a first sensor 340, a second sensor 341, a third sensor 342, and a fourth sensor 343 are disposed in the stated order moving upward from the bottom. The first sensor 340, the second sensor 341, the third sensor 342, and the fourth sensor 343 are disposed respectively at different heights. The first sensor 340 is provided on the rear part of the inner surface of the grain tank 316. The second sensor 341, the third sensor 342, and the fourth sensor 343 are provided on the front part of the inner surface of the grain tank 316. The third sensor 342 is provided as a "level measurement device" that is an example of a "volume measurement unit" for detecting the retention volume.

<Measurement Unit>

Figure 19:
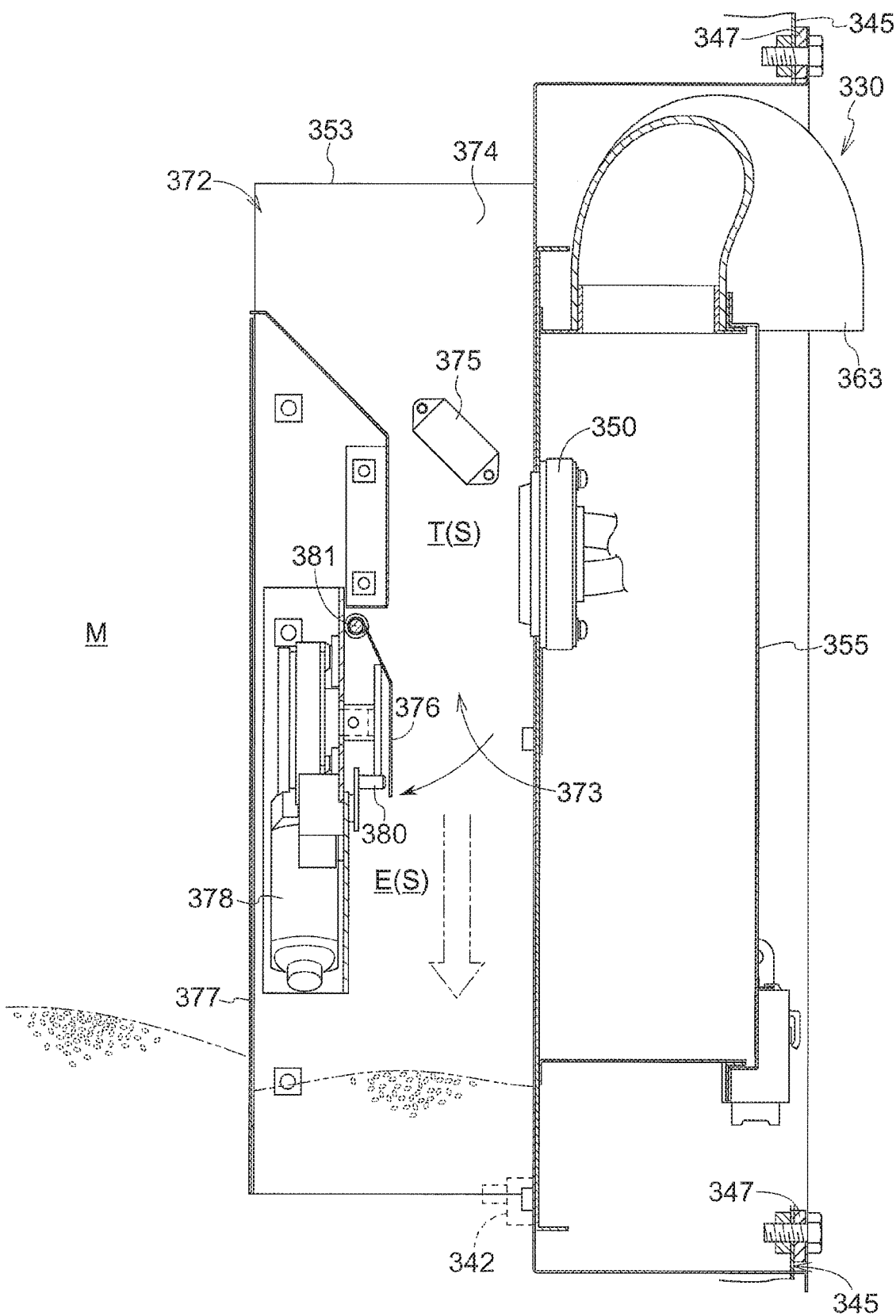
FIG. 19 is a longitudinal sectional side view illustrating the sampling unit when the shutter is in the open position, according to the first example of the third embodiment.
Figure 20:
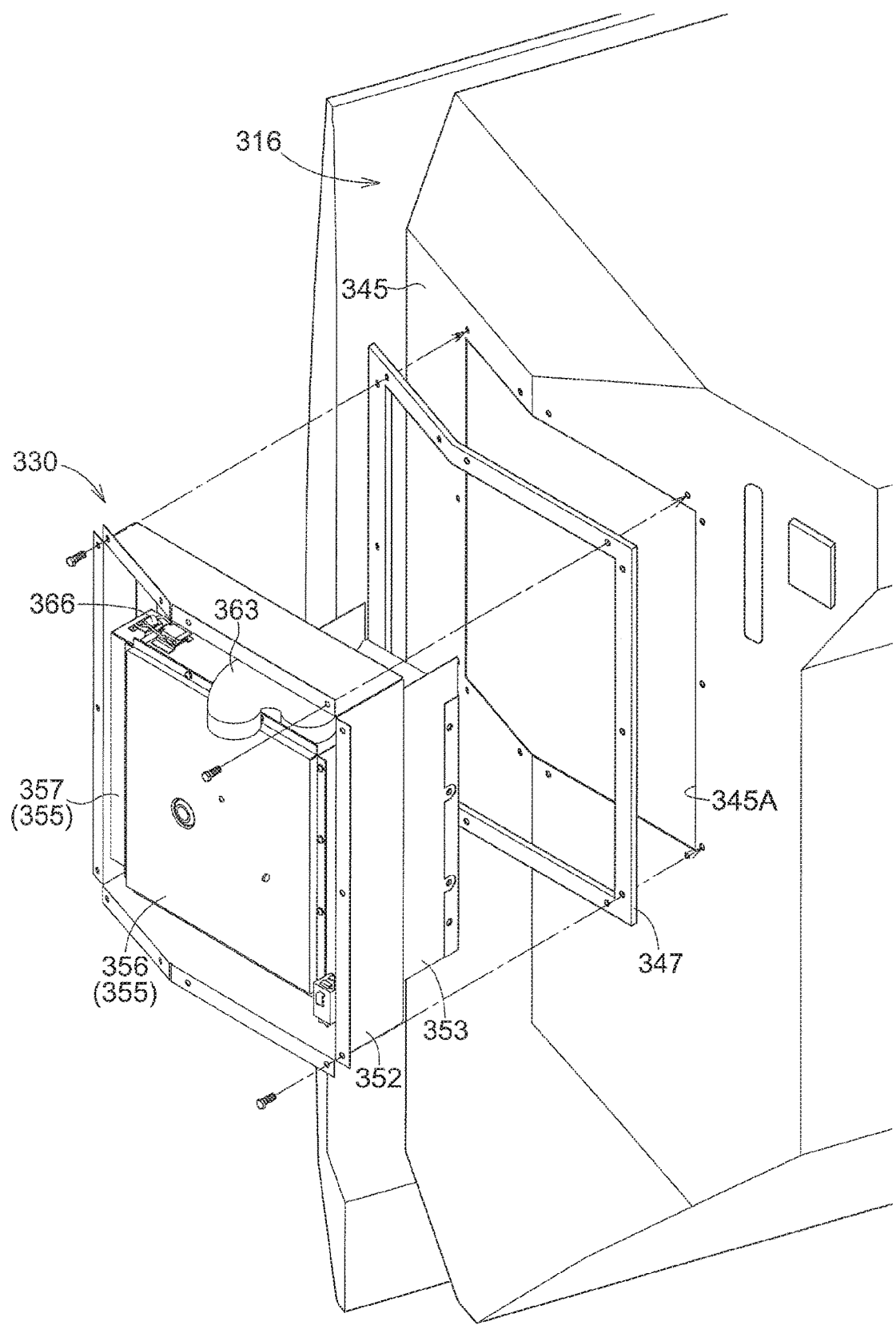
FIG. 20 is a diagram illustrating attaching a quality measurement device to the grain tank, according to the first example of the third embodiment.

As shown in FIG. 20, the measurement unit 330 is fixed by being fitted into a mounting hole 345A of a front wall 345 of the grain tank 316 via an anti-vibration rubber 347 for sealing. As shown in FIGS. 14 to 22, the measurement unit 330 is provided with a box-shaped measurement room forming body 352 in which a quality sensor 350 (which corresponds to a "quality measurement unit") for measuring the quality of grain is included, and a tubular supporting unit forming body 353 through which grain to be subjected to quality measurement by the quality sensor 350 passes.

Figure 21:
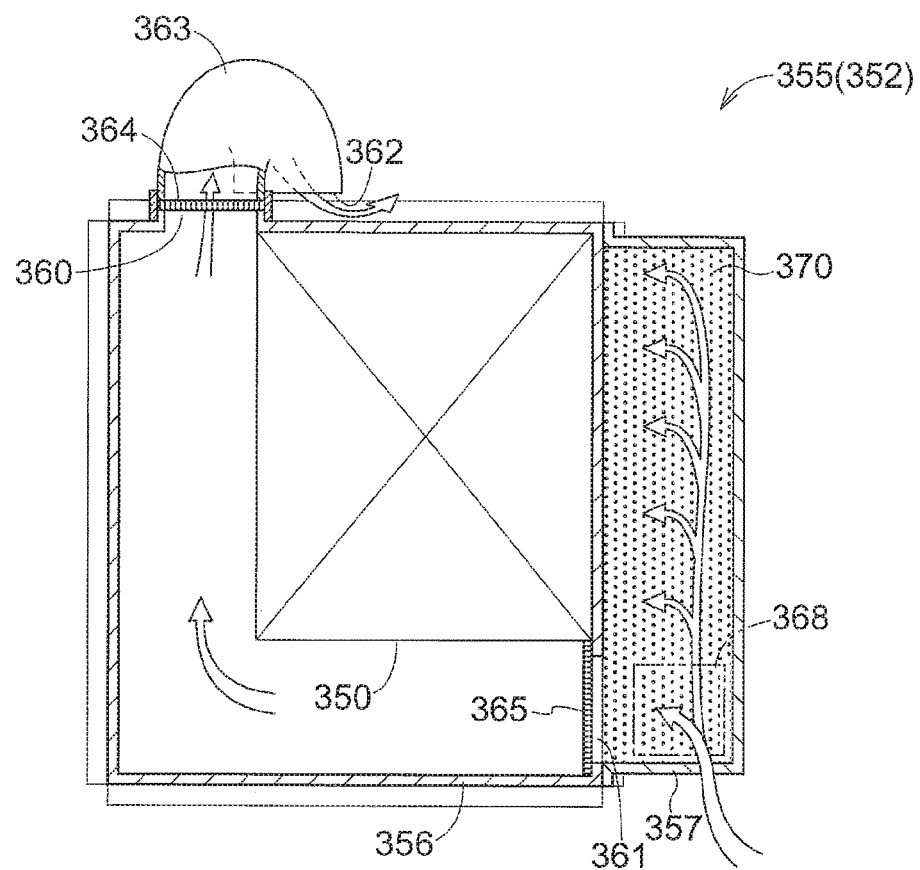
FIG. 21 is a partially cut-out rear cross-sectional view schematically illustrating the structure of the quality measurement device according to the first example of the third embodiment.
Figure 22:
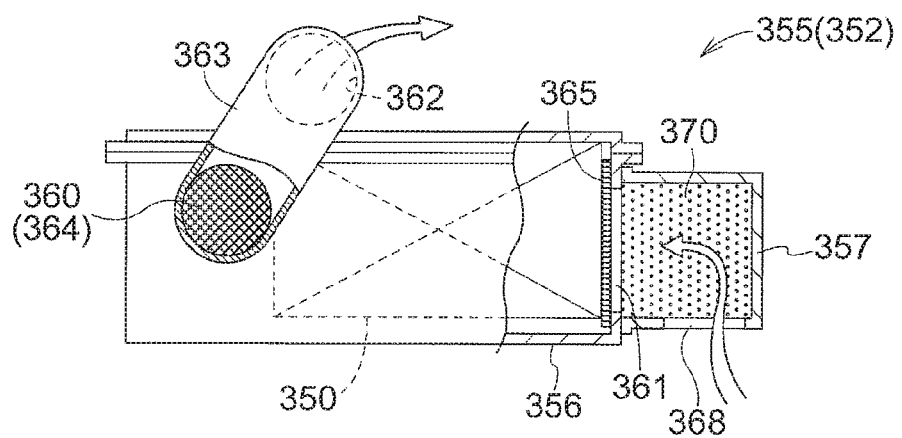
FIG. 22 is a partially cut-out planer cross-sectional view schematically illustrating the structure of the quality measurement device according to the first example of the third embodiment.

As shown in FIGS. 21 and 22, the measurement room forming body 352 includes a housing 355 in which the quality sensor 350 is accommodated. The housing 355 includes a main case 356 in which the quality sensor 350 is accommodated, and a filter case 357 that is detachable to the main case 356.

As shown in FIGS. 21 and 22, an air exhaust opening 360 is formed in the upper portion of the main case 356, and an air introduction opening 361 is formed on the filter case 357 of the main case 356. A guide pipe 363 that is curved so as to discharge air introduced from the exhaust opening 360 in the downward direction from a front end hole 362 is detachably mounted to the exhaust opening 360. The guide pipe 363 is mounted on the main case 356 so that the front end hole 362 is located closer to the central portion of the main case 356 than the exhaust opening 360. An exhaust-side net body 364, which is formed in the shape of a net to prevent water, dust, and the like from passing therethrough, is detachably mounted on the exhaust opening 360 of the main case 356. Furthermore, an intake-side net body 365, which is formed in the shape of a net to prevent water, dust, and the like from passing therethrough, is detachably mounted on the introduction opening 361.

As shown in FIG. 20, the filter case 357 is configured to be detachably connected to the main case 356 via buckle type connectors 366. The connectors 366 are respectively provided on the upper and lower ends of the main case 356, and are configured to be connectable and disconnectable to the upper and lower ends of the filter case 357. As shown in FIGS. 21 and 22, the filter case 357 has, on the rear face side of the housing 355, an intake opening 368 through which air is suctioned. Within the filter case 357, a filter 370 that covers the face opposite to the main case 356 is arranged. Dust and the like is removed from the air suctioned from the intake opening 368 by the filter 370, and the air passes through the introduction opening 361, passes through the intake-side net body 365, cools the quality sensor 350, passes through the exhaust-side net body 364, passes through the exhaust opening 360, passes through the guide pipe 363, and is discharged from the front end hole 362. At that time, even if the filter 370 is partially clogged, the air bypasses the clogged portion and passes through an unclogged portion of the filter 370. Accordingly, it is possible to use the entire region of the filter 370. Furthermore, since the main case 356 has the introduction opening 361 to which the intake-side net body 365 is mounted and the exhaust opening 360 to which the exhaust-side net body 364 is mounted, when the guide pipe 363 or the filter case 357 is removed and washing of the combine 310 or the like is performed, it is possible to prevent water and dust from entering the main case 356.

Figure 18:
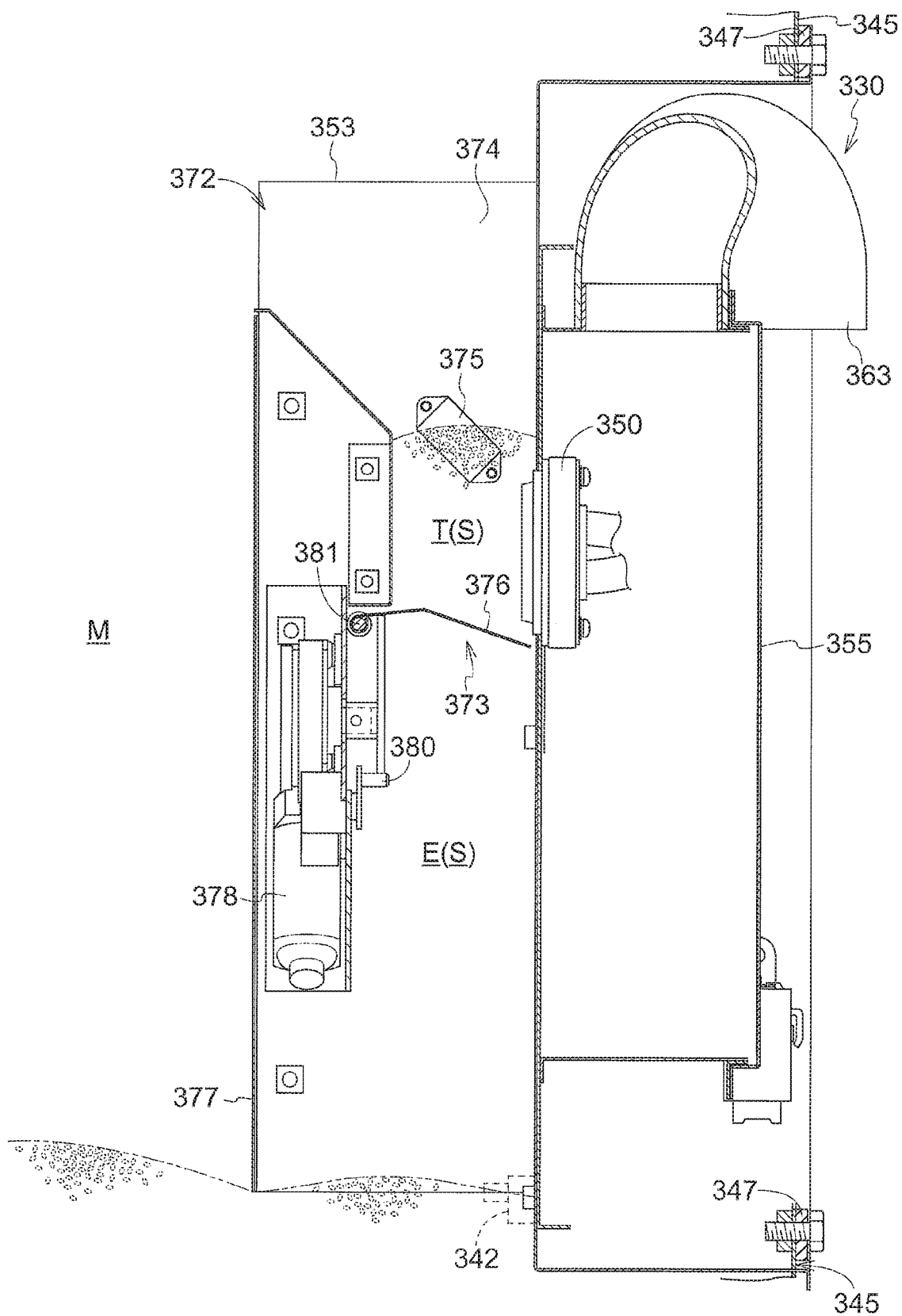
FIG. 18 is a longitudinal sectional side view illustrating a sampling unit when a shutter is in the closed position, according to the first example of the third embodiment.

As shown in FIGS. 18 and 19, the supporting unit forming body 353 has a sampling space S, which is partially partitioned from the internal space M of the grain tank 316 in which mainly grain is retained. The grain is taken in the sampling space S and quality measurement is performed therein. The sampling space S includes a temporary retaining section T in which grain is temporarily retained for quality measurement, and a discharge count ensuring section E formed below the temporary retaining section T, which discharges the grain subjected to the quality measurement into the internal space M.

As shown in FIGS. 18 and 19, the temporary retaining section T is provided on the front internal surface of the grain tank 316, and is configured to temporarily retain part of the grain that was conveyed from the threshing device 315 and is scattered by the moving vane 328. Specifically, the temporary retaining section T has an upper take-in port 372 for taking in grain, and a lower discharge port 373 for discharging grain. The temporary retaining section T is configured to be able to, via the take-in port 372 formed in the upper portion of the temporary retaining section T, take in part of the grain conveyed from the threshing device 315 so as to temporarily retain the part of the grain, and to discharge the grain retained in the temporary retaining section T from the discharge port 373 formed in the lower portion of the temporary retaining section T into the internal space M of the grain tank 316. In the upper portion of the temporary retaining section T, a proximity sensor 375 (which corresponds to a "requisite amount measurement unit") that detects grain is provided on an internal wall 374 of the supporting unit forming body 353. In the lower portion of the temporary retaining section T, a shutter 376 that closes or opens the discharge port 373 is provided. Furthermore, the temporary retaining section T includes the quality sensor 350 that detects the quality of grain retained in the temporary retaining section T and the proximity sensor 375 that detects whether or not the amount of grain needed for measurement by the quality sensor 350 is retained in the temporary retaining section T. The quality sensor 350 is disposed in the vicinity of the temporary retaining section T. The quality sensor 350 covers the detection range of grains that are located above the shutter 376 in the closed position and below the detection positon of the proximity sensor 375.

As shown in FIGS. 18 and 19, the discharge count ensuring section E is provided below the lower portion of the temporary retaining section T and adjacent to the lower portion of the shutter 376. That is, the discharge count ensuring section E is in communication with the above temporary retaining section T via the discharge port 373. The side portion of the discharge count ensuring section E is separated from the internal space M by a partition member 377 of the supporting unit forming body 353, and the lower portion thereof is in communication with the internal space M in the vicinity of the lower end of the partition member 377. Accordingly, the discharge count ensuring section E differs from the internal space M of the grain tank 316 in the extent of accumulation of grain. The third sensor 342 is disposed so as to have a grain detection height about as high as the lower end of the partition member 377. The discharge count ensuring section E has, as the retention volume in which grain can be retained, a height in the range from the lower end of the shutter 376 in the open position to the lower end of the partition member 377. The retention volume of the discharge count ensuring section E in which grain can be retained is configured to be larger than the temporary retention volume of the temporary retaining section T in which grain can be retained. Preferably, the retention volume of the discharge count ensuring section E in which grain can be retained is twice as large as the volume of grain that falls from the temporary retaining section T when the shutter 376 is brought to the open position, or greater.

As shown in FIGS. 18 and 19, when the measurement unit 330 is fitted into and fixed to the grain tank 316, the quality sensor 350 is located in the grain tank 316. That is, the quality sensor 350 is provided in the grain tank 316. The quality sensor 350 measures the quality of grain retained in the grain tank 316. The quality sensor 350 performs quality measurement on the grain temporarily retained in the temporary retaining section T of the sampling space S, and covers the grain detection range from the lower position of the proximity sensor 375 and the upper position of the shutter 376. The quality sensor 350 is of an optical detection type, and is configured to be able to detect the internal quality of still grains such as the moisture value and the protein value in a contactless manner.

As shown in FIGS. 18 and 19, the proximity sensor 375 is configured to detect the grain that has reached the detection height of the proximity sensor 375 in the temporary retaining section T. That is, the proximity sensor 375 is configured to detect whether or not the amount of grain needed for measurement by the quality sensor 350 is retained in the temporary retaining section T.

<Shutter>

As shown in FIGS. 18 and 19, the shutter 376 has a configuration of a plate-shaped swinging type shutter. The shutter 376 is switched between the closed position at which the discharge port 373 is closed and the open position at which the discharge port 373 is opened, by a switching mechanism 380 that is driven by a motor 378 and is constituted by a cam and the like. That is, the shutter 376 is controlled to move to the closed position and to the open position by the driving of the motor 378. The shutter 376 is provided in the vicinity of the lower portion of the temporary retaining section T, and is configured to change its position from the open position at which the discharge port 373 is opened to the closed position at which the discharge port 373 is closed. The shutter 376 is configured to swing about a lateral spindle 381 that is perpendicular to the open/close direction of the shutter 376, and to change its orientation between the open position and the closed position. The spindle 381 is supported by the internal wall 374 of the supporting unit forming body 353. The shutter 376 is configured to swing about the lateral spindle 381 supported by the internal wall 374 of the supporting unit forming body 353, and to change its orientation between the closed position and the open position. When the shutter 376 is brought to the closed position, the shutter 376 is in the lateral orientation to close the discharge port 373, and grain is retained in the temporary retaining section T due to the grain accumulated on the upper surface of the shutter 376 in the lateral orientation. The shutter 376 is formed so as to have, when it is brought to the closed position, an upwardly-projecting bent shape viewed in the axial direction of the spindle 381. Also, the shutter 376 is configured to enter the vertical orientation to open the discharge port 373 when brought to the open position, and to be able to downwardly discharge the grain retained in the temporary retaining section T. The shutter 376 is pushed upward by the switching mechanism 380 to change its position from the open position to the closed position. Furthermore, the shutter 376 changes its position from the closed position to the open position by no longer being pushed upward by the switching mechanism 380.

<ECU>

Figure 23:
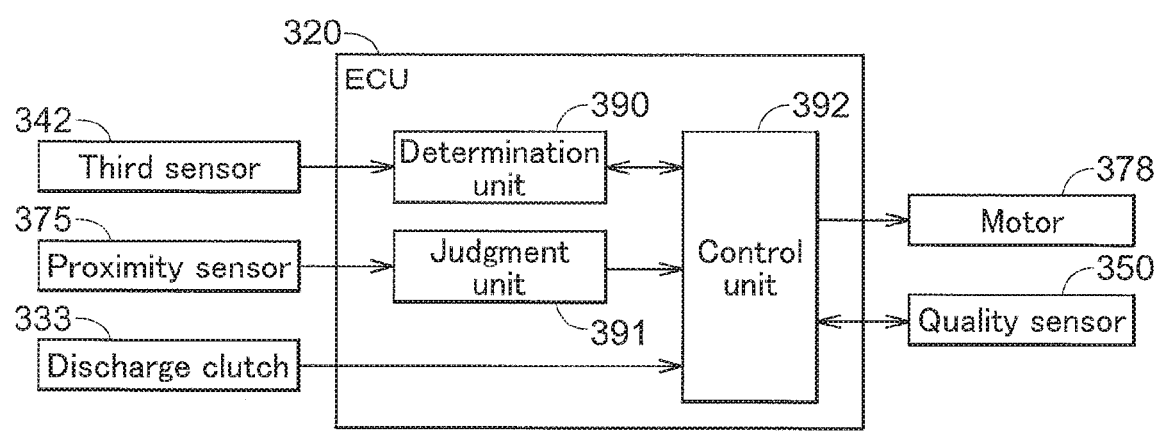
FIG. 23 is a block diagram illustrating a control configuration according to the first example of the third embodiment.

As shown in FIG. 23, the combine 310 is provided with an ECU 320 for performing opening/closing control of the shutter. The ECU 320 includes a determination unit 390, a judgment unit 391, and a control unit 392.

The determination unit 390 determines whether or not the retention volume of grain in the grain tank 316 has reached a "preliminary value" or a "predetermined value". The determination unit 390 is connected to the third sensor 342 and the control unit 392. When the retention level of the grain is detected by the third sensor 342, the determination unit 390 determines that the retention volume of the grain in the grain tank 316 has reached the "preliminary value", and outputs a "preliminary value reaching signal" to the control unit 392. Furthermore, upon receiving an input from the control unit 392 that opening of the shutter was performed a predetermined number of times after the determination that the retention volume of the grain in the grain tank 316 has reached the "preliminary value", the determination unit 390 determines that the retention volume of the grain in the grain tank 316 has reached the "predetermined value", and outputs a "predetermined value reaching signal" to the control unit 392. That is, if the level sensor 337 serving as the volume measurement unit detects that the retention volume exceeds the "preliminary value", which is lower than the "predetermined value", and after the detection, the number of times that the shutter 376 is opened exceeds a predetermined number of times, the determination unit 390 will determine that the retention volume exceeds the "predetermined value".

The judgment unit 391 judges whether or not grain is retained in the temporary retaining section T, and whether or not the grain has been discharged from the temporary retaining section T. The judgment unit 391 is connected to the proximity sensor 375 and the control unit 392. When the proximity sensor 375 is put into the detecting state (ON state) in which detection of grain is performed from the non-detecting state (OFF state) in which detection of grain is not performed, and the detecting state (ON state) continues for a predetermined time period, the judgment unit 391 outputs a "retention completion signal" to control unit 392. Furthermore, the proximity sensor 375 is put into the non-detecting state (OFF state) in which detection of grain is not performed from the detecting state (ON state) in which detection of grain is performed, and the non-detecting state (OFF state) continues for a predetermined time period, the judgment unit 391 outputs a "discharge completion signal" to the control unit 392.

The control unit 392 controls the motor 378 for operating the shutter 376, and gives an instruction regarding the measurement timing to the quality sensor 350. The control unit 392 is connected to the determination unit 390, the judgment unit 391, the discharge clutch 333, the motor 378, and the quality sensor 350. Upon receiving an input of the "retention completion signal" from the judgment unit 391, the control unit 392 instructs the quality sensor 350 to perform grain quality measurement, and upon the elapse of the time period needed for the quality measurement by the quality sensor 350, the control unit 392 drives the motor 378 to bring the shutter 376 to the open position. Then, upon receiving an input of the "discharge completion signal" from the judgment unit 391, all the grains in the temporary retaining section T are deemed to have been discharged to the discharge count ensuring section E in the grain tank 316, and the motor 378 is driven to bring the shutter 376 to the closed position. That is, when the control unit 392 brings the shutter 376 to the open position in the opening/closing control, and then the state in which the amount of grain needed for measurement by the quality sensor 350 is not retained in the temporary retention unit continues for a predetermined time period, the shutter 376 is controlled to move to the closed position. Basically, the control unit 392 executes such opening/closing control of the shutter 376.

On the other hand, upon receiving an input of the "preliminary value reaching signal" from the determination unit 390, the control unit 392 continuously outputs, to the determination unit 390, the number of times that the motor 378 is driven and the shutter 376 is controlled to the open position after the input of the "preliminary value reaching signal". Upon receiving an input of the "predetermined value reaching signal" from the determination unit 390 after the determination by the determination unit 390 that the retention volume exceeded the "predetermined value", the control unit 392 stops driving the motor 378 to stop the opening/closing control of the shutter 376. That is, if it is determined by the determination unit 390 that the retention volume exceeds the "predetermined value", the control unit 392 does not control the shutter 376 to move to the open position even if the measurement by the quality sensor 350 is completed. Furthermore, the control unit 392 restarts opening/closing control of the shutter 376 when the opening/closing control of the shutter 376 is stopped, and then the discharge clutch 333 is put into the engaged state.

<Flowchart>

Figure 24:
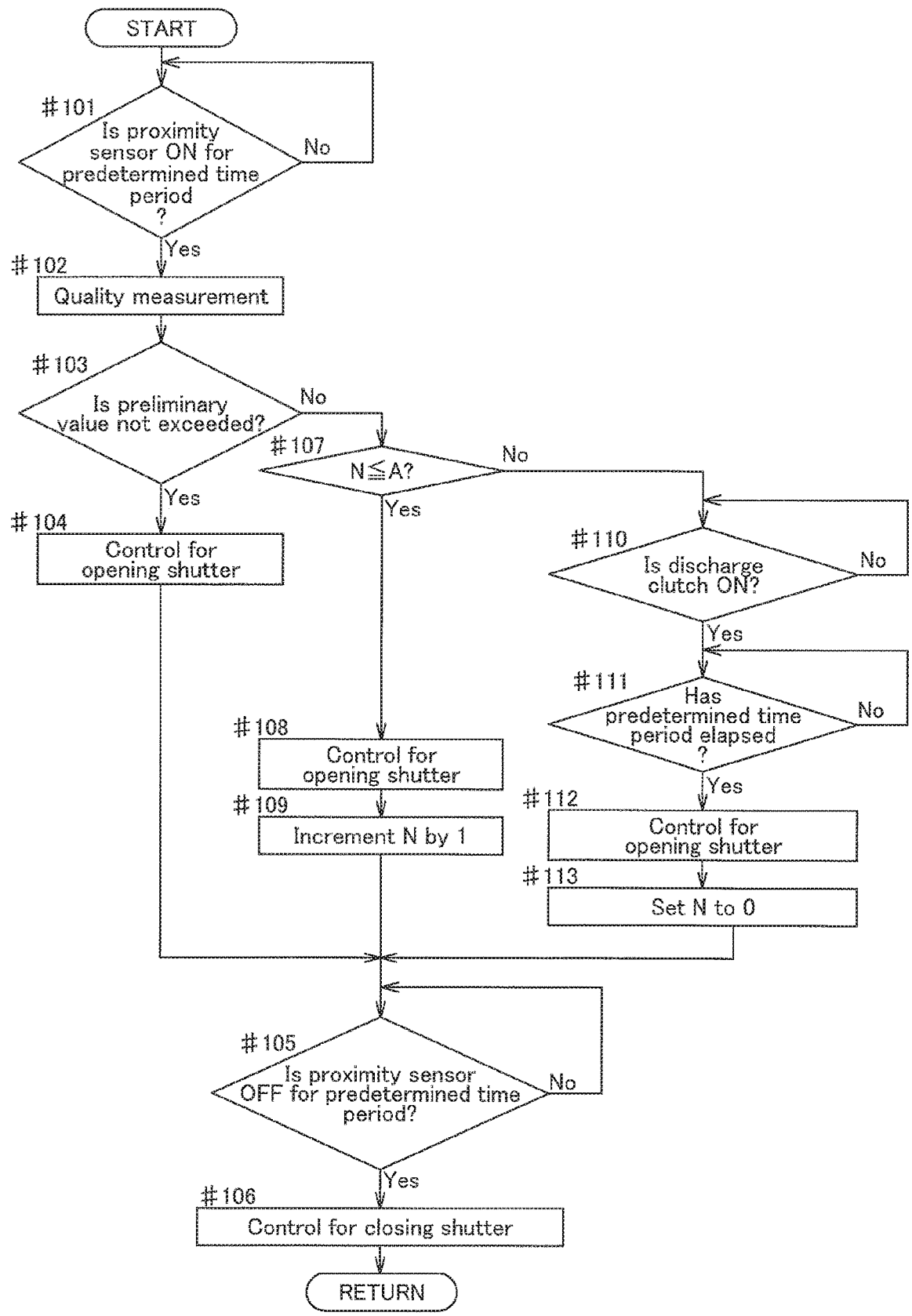
FIG. 24 is a flowchart schematically illustrating the control according to the first example of the third embodiment.

The procedure of the above-described opening/closing control of the shutter 376 by the ECU 320 will be described with reference to the flowchart of FIG. 24.

First, in the state in which the shutter 376 is in the closed position, it is determined whether or not the proximity sensor 375 is in the detecting state (ON state) for a predetermined time period (step #101). In step #101, if it is determined that the proximity sensor 375 is not in the detecting state for a predetermined time period (No in step #101), the procedure returns to step #101. If it is determined in step #101 that the proximity sensor 375 is in the detecting state for a predetermined time period (Yes in step #101), it is apparent that the amount of grain needed for measurement by the quality sensor 350 is retained in the temporary retaining section T, and then quality measurement is performed on the grain retained in the temporary retaining section T by the quality sensor 350 for a predetermined time period (step #102). After step #102, it is determined whether or not the retention volume of the grain retained in the grain tank 316 does not exceed a "preliminary value" (step #103). In step #103, specifically, if the grain is detected by the third sensor 342, the retention volume of the grain retained in the grain tank 316 is regarded as exceeding the "preliminary value". If it is determined in step #103 that the retention volume of the grain retained in the grain tank 316 does not exceed the "preliminary value" (Yes in step #103), it is apparent that the shutter 376 will not interfere with the grain even when the shutter 376 is controlled to move to the open position, and thus control for bringing the shutter 376 to the open position is performed (step #104). After step #104, it is determined whether or not the proximity sensor 375 is in the non-detecting state (OFF state) for a predetermined time period (step #105). If it is determined in step #105 that the proximity sensor 375 is not in the non-detecting state for a predetermined time period (No in step #105), the procedure returns to step #105. If it is determined in step #105 that the proximity sensor 375 is not in the non-detecting state for a predetermined time period (Yes in step #105), it is apparent that the grain whose quality has been measured has been discharged from the temporary retaining section T to the discharge count ensuring section E, and thus the shutter 376 is controlled to move to the closed position (step #106). When step #106 ends, the procedure returns in order to perform the next quality measurement.

On the other hand, if it is determined in step #103 that the retention volume of the grain retained in the grain tank 316 exceeds the "preliminary value" (No in step #103), it is then determined whether or not the number of times N that the shutter 376 is opened is a predetermined number of times A or smaller (step #107). If it is determined in step #107 that the number of times N that the shutter 376 is opened is the predetermined number of times A or less (Yes in step #107), it is apparent that the discharge count ensuring section E has still a sufficient volume, and the shutter 376 will not interfere with the grain even when the shutter 376 is controlled to move to the open position, and then the shutter 376 is controlled to move to the open position (step #108). In step #108, the amount of grain that corresponds to the amount obtained when the shutter 376 is opened one time falls into the discharge count ensuring section E, and thus after step #108, the number of times N that the shutter 376 is opened is incremented by "1" (step #109). When step #109 ends, the procedure advances to step #105 in order to perform the next quality measurement.

Furthermore, if, in step #107, the number of times N that the shutter 376 is opened exceeds the predetermined number of times A (No in step #107), it is apparent that the shutter 376 has been opened a predetermined number of times after the retention volume of the grain retained in the grain tank 316 exceeded the "preliminary value", and the discharge count ensuring section E no longer has a sufficient empty volume. Therefore, since there is a risk that by controlling the shutter 376 to move to the open position, the shutter 376 will interfere with the grain retained in the discharge count ensuring section E, the opening/closing control of the shutter 376 is stopped temporarily so that the shutter 376 remains in the closed position, and control for moving the shutter 376 to the open position is not performed. That is, if the determination result shows No in step #107, opening/closing control of the shutter 376 is stopped temporarily until the discharge clutch 333 is put into the engaged state (ON state). Therefore, if the determination result shows No in step #107, it is then determined whether or not the discharge clutch 333 is in the engaged state (ON state) (step #110). In step #110, if the discharge clutch 333 is not in the ON state (No in step #110), the procedure returns to step #110. If, in step #110, the discharge clutch 333 is in the engaged state (Yes in step #110), it is apparent that the grain has been discharged from the grain tank 316 to the outside by the discharge auger 332, and the retention level of the grain in the discharge count ensuring section E is reduced. Also, if the determination result of step #110 shows Yes, it is then determined whether or not a predetermined time period has elapsed (step #111), and if it is determined that a predetermined time period has not elapsed (No in step #111), the procedure returns to step #111. If it is determined in step #111 that a predetermined time period has elapsed (Yes in step #111), it is apparent that the retention level of the grain in the discharge count ensuring section E has sufficiently decreased. Since it is thus apparent that there is no problem even if the opening/closing control of the shutter 376 is restarted, after the determination result in step #111 shows YES, the shutter 376 is controlled to move to the open position (step #112). After step #112, the number of times N that the shutter 376 is opened is reset to "0" (step #113). When step #113 ends, the procedure advances to step #105 in order to perform the next quality measurement.

Note that in the procedure of the foregoing first example, instead of steps #107 to #109, it is also possible to determine whether or not a predetermined time period has elapsed since the retention volume of the grain retained in the grain tank 316 exceeded the "preliminary value". In this case, in step #103, if the retention volume of the grain retained in the grain tank 316 exceeds a "preliminary value" (No in step #103), it is then determined whether or not a predetermined time period has elapsed since the retention volume of the grain retained in the grain tank 316 exceeded the "preliminary value". Here, if a predetermined time period has not elapsed since the retention volume of the grain retained in the grain tank 316 exceeded the "preliminary value", the procedure advances to step #105 in order to perform the next quality measurement. Furthermore, if a predetermined time period has elapsed since the retention volume of the grain retained in the grain tank 316 exceeded the "preliminary value", there is a risk that controlling the shutter 376 to move to the open position will cause the shutter 376 to interfere with the retained grain, because, for example, the shutter 376 has been opened a predetermined number of times and the discharge count ensuring section E no longer has a sufficient empty volume. Accordingly, when a predetermined time period has elapsed since the retention volume of the grain retained in the grain tank 316 exceeded the "preliminary value", it is apparent that the retention volume of the grain retained in the grain tank 316 has reached the "predetermined value". Accordingly, if a predetermined time period has elapsed since the retention volume of the grain retained in the grain tank 316 exceeded the "preliminary value", the opening/closing control of the shutter 376 is stopped temporarily, and the shutter 376 remains in the closed position and is not controlled to move to the open position. That is, if a predetermined time period has elapsed since the retention volume of the grain retained in the grain tank 316 exceeded the "preliminary value", the opening/closing control of the shutter 376 is stopped temporarily until the discharge clutch 333 is put into the engaged state (ON state). Then, after a predetermined time period has elapsed since the retention volume of the grain retained in the grain tank 316 exceeded the "preliminary value", it is determined whether or not the discharge clutch 333 is in the engaged state (ON state) (step #110). In this case, if the third sensor 342 serving as the volume measurement unit detects that the retention volume exceeds the "preliminary value", which is a value smaller than the "predetermined value" and a predetermined time period has elapsed since the detection, the determination unit 390 determines that the retention volume of grain in the grain tank 316 has exceeded the "predetermined value".

Furthermore, in the procedure of the foregoing first example, step #111 may be omitted. That is, if the discharge clutch 333 is in the engaged state (ON state), the shutter 376 may be controlled to move to the open position (step #112) in order to immediately restart the opening/closing control of the shutter 376.

SECOND EXAMPLE

Next, a second example of the third embodiment will be described.

Figure 25:
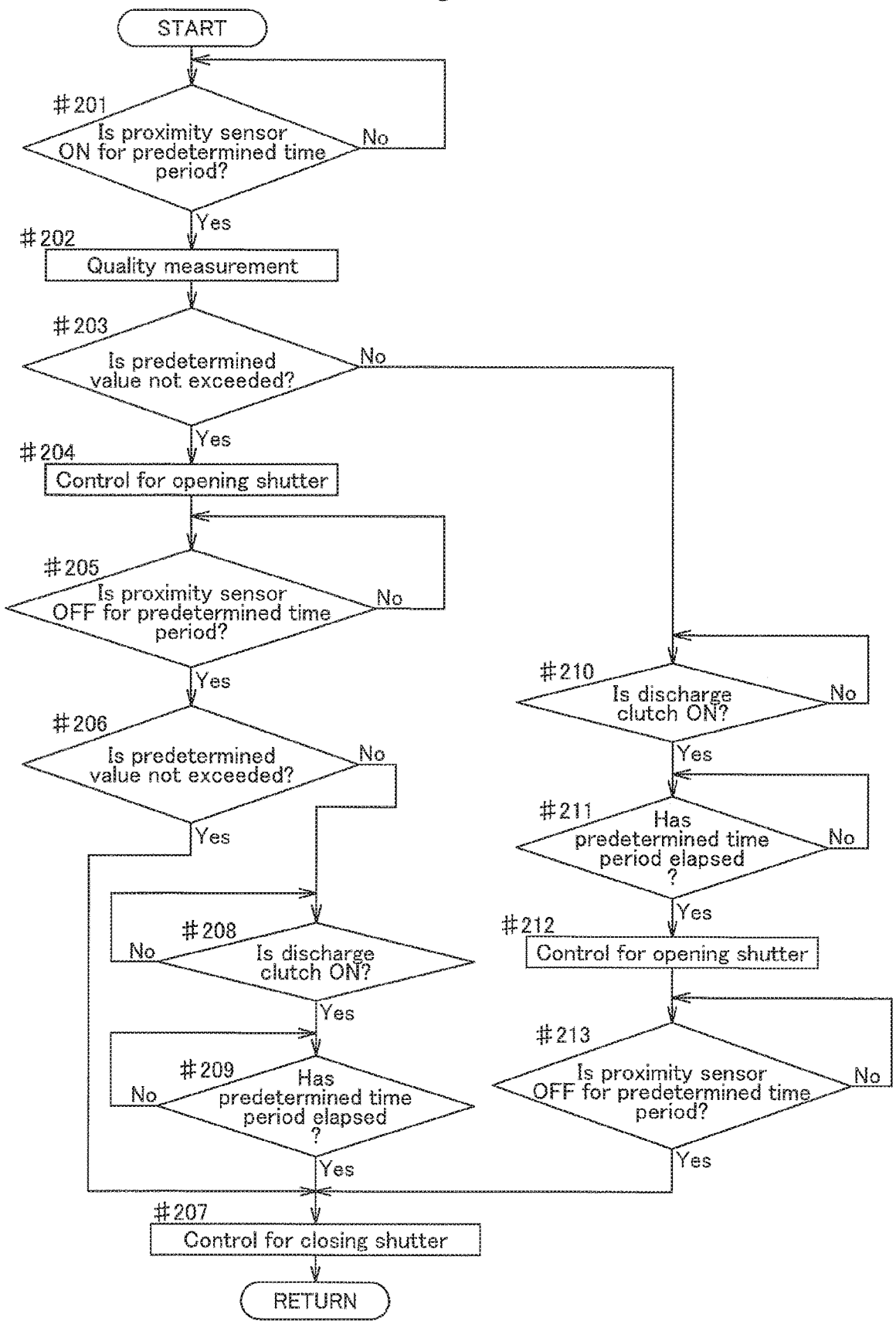
FIG. 25 is a flowchart schematically illustrating the control according to a second example of the third embodiment.

In the first example, in the opening/closing control of the shutter 376, it is determined, particularly, whether or not the control for moving the shutter 376 to the open position is to be stopped. As shown in the following second example, it is also possible to particularly determine, in the opening/closing control of the shutter 376, whether or not the control for moving the shutter 376 to the closed position is to be stopped. The procedure of the control in the second example will be described with reference to the flowchart of FIG. 25. Note that the second example is the same as the first example except for the features that will be described below.

First, in the state in which the shutter 376 is in the closed position, it is determined whether or not the proximity sensor 375 is in the detecting state (ON state) for a predetermined time period (step #201). In step #201, if the proximity sensor 375 is not in the detecting state for a predetermined time period (No in step #201), the procedure returns to step #201. If, in step #201, the proximity sensor 375 is in the detecting state for a predetermined time period (Yes in step #201), it is apparent that the amount of grain needed for measurement by the quality sensor 350 is retained in the temporary retaining section T, and thus the grain retained in the temporary retaining section T is subjected to quality measurement by the quality sensor 350 for a predetermined time period (step #202). After step #202, it is determined whether or not the retention volume of the grain retained in the grain tank 316 exceeds a "predetermined value" (step #203). If the retention volume does not exceed a "predetermined value", the shutter 376 will not interfere with the grain even when the shutter 376 is controlled to move to the open position. In step #203, if the retention volume of the grain retained in the grain tank 316 does not exceed the "predetermined value" (Yes in step #203), the shutter 376 is controlled to move to the open position (step #204). After step #204, it is determined whether or not the proximity sensor 375 is in the non-detecting state (OFF state) for a predetermined time period (step #205). If, in step #205, it is determined that the proximity sensor 375 is not in the non-detecting state for a predetermined time period (No in step #205), the procedure returns to step #205. If, in step #205, the proximity sensor 375 is in the non-detecting state for a predetermined time period (Yes in step #205), it is apparent that the grain subjected to the quality measurement has been discharged from the temporary retaining section T. Accordingly, after step #205, it is determined again whether or not the retention volume of the grain retained in the grain tank 316 does not exceed the "predetermined value" (step #206). This is because there is a case where the shutter 376 in the open position is buried in the grain that has fallen from the temporary retaining section T. If, in step #206, the retention volume of the grain retained in the grain tank 316 does not exceed the "predetermined value" (Yes in step #206), it is apparent that the shutter 376 will not interfere with the retained grain even by being controlled to move to the closed position, and thus the shutter 376 is controlled to move to the closed position (step #207). When the step #207 ends, the procedure returns in order to perform the next quality measurement.

If, in step #206, the retention volume of the grain retained in the grain tank 316 exceeds the "predetermined value" (No in step #206), it is apparent that control for moving the shutter 376 to the closed position may cause the shutter 376 to catch and lift the grain retained in the discharge count ensuring section E, and thus the closing control of the shutter 376 is stopped temporarily and the shutter 376 remains in the open position without being controlled to move to the closed position. That is, if the determination result of step #206 shows No, closing control of the shutter 376 is stopped temporarily until the discharge clutch 333 is put into the engaged state (ON state). Therefore, if the determination result of step #206 shows No, it is then determined whether or not the discharge clutch 333 is in the engaged state (ON state) (step #208). If, in step #208, the discharge clutch 333 is not in the engaged state (No in step #208), the procedure returns to step #208. If, in step #208, the discharge clutch 333 is in the engaged state (Yes in step #208), it is apparent that the grain has been discharged by the discharge auger 332 from the grain tank 316 to the outside, and the retention level of the grain in the discharge count ensuring section E is reduced. Then, if the determination result of step #208 shows Yes, it is then determined whether or not a predetermined time period has elapsed (step #209), and if a predetermined time period has not elapsed (No in step #209), the procedure returns to step #209. If, in step #209, a predetermined time period has elapsed (Yes in step #209), it is apparent that the retention level of the grain in the discharge count ensuring section E has sufficiently decreased. Therefore, it is apparent that control for moving the shutter 376 to the closed position will not cause a problem, and thus if the determination result of step #209 shows Yes, the shutter 376 is then controlled to move to the closed position (step #207). When step #207 ends, the procedure returns in order to perform the next quality measurement.

If, in step #203, the retention volume of the grain retained in the grain tank 316 exceeds the "predetermined value" (No in step #203), there is the risk that control for moving the shutter 376 to the open position will cause the shutter 376 to interfere with the grain retained in the discharge count ensuring section E, and thus opening control of the shutter 376 is stopped temporarily and the shutter 376 remains in the closed position without performing control for moving the shutter 376 to the open position. That is, if the determination result of step #203 shows No, opening control of the shutter 376 is stopped temporarily until the discharge clutch 333 is put into the engaged state (ON state). Accordingly, if the determination result of step #203 shows No, it is then determined whether or not the discharge clutch 333 is in the engaged state (ON state) (step #210). If, in step #210, the discharge clutch 333 is not in the engaged state (No in step #210), the procedure returns to step #210. If, in step #210, the discharge clutch 333 is in the engaged state (Yes in step #210), it is apparent that the grain has been discharged from the grain tank 316 to the outside by the discharge auger 332, and the retention level of the grain in the discharge count ensuring section E is reduced. That is, if the determination result of step #210 shows Yes, it is then determined whether or not a predetermined time period has elapsed (step #211). If a predetermined time period has not elapsed (No in step #211), the procedure returns to step #211. If, in step #211, a predetermined time period has elapsed (Yes in step #211), it is apparent that the retention level of the grain in the discharge count ensuring section E has sufficiently decreased. Therefore, since it is apparent that control for moving the shutter 376 to the open position will not cause a problem, the shutter 376 is then controlled to move to the open position (step #212) if the determination result of step #211 shows Yes. After step #212, it is determined whether or not the proximity sensor 375 is in the non-detecting state (OFF state) for a predetermined time period (step #213). If, in step #213, the proximity sensor 375 is not in the non-detecting state for a predetermined time period (No in step #213), the procedure returns to step #213. If, in step #213, the proximity sensor 375 is in the non-detecting state for a predetermined time period (Yes in step #213), the procedure advances to step #207 in order to perform the next quality measurement.

THIRD EXAMPLE

Hereinafter, a third example of the third embodiment will be described.

Third example is an example in which the timing of controlling the shutter 376 to move to the closed position in the first or second example is changed. The procedure of control of the third example will be described with reference to the flowchart of FIG. 26. Note that the third example is the same as that of the first or second example except for the features that will be described below.

For example, if, in step #107 of the first example, the number of times N that the shutter 376 is opened exceeds a predetermined number of times A (No in step #107), or if, in step #203 of the second example, the retention volume of the grain retained in the grain tank 316 exceeds a "predetermined value" (No in step #203), it is then determined whether or not the discharge clutch 333 is in the engaged state (ON state) (step #301). If, in step #301, the discharge clutch 333 is not in the engaged state (No in step #301), the procedure returns to step #301. If, in step #301, the discharge clutch 333 is in the engaged state (Yes in step #301), then the shutter 376 is controlled to move to the open position (step #302). Then, after step #302, it is determined whether or not the discharge clutch 333 is disengaged (OFF state) (step #303). If the discharge clutch 333 is not in the disengaged state (No in step #303), the procedure returns to step #303. Here, since the shutter 376 remains in the open position until the discharge clutch 333 is put into the disengaged state (OFF state), it is possible to completely discharge all the grain in the temporary retaining section T. If, in step #303, the discharge clutch 333 is in the disengaged state (Yes in step #303), it is then determined whether or not a predetermined time period has elapsed (step #304). If, in step #304, a predetermined time period has not elapsed (No in step #304), the procedure returns to step #304. If, in step #304, a predetermined time period has elapsed (Yes in step #304), the shutter 376 is controlled to move to the closed position (step #305). When step #305 ends, the procedure returns.

In this case, when the discharge clutch 333 is in the engaged state, the control unit 392 drives the motor 378 and controls the shutter 376 to move to the open position so that no grain remains in the temporary retaining section T when the discharge auger 332 discharges the grain.

Note that in the above-described third example, step #304 may be omitted. In this case, in step #303, if the discharge clutch 333 is in the disengaged state (Yes in step #303), the procedure advances to step #305, and immediately thereafter the shutter 376 is controlled to move to the closed position.

Furthermore, in the above-described third example, it is also possible that in step #305, the shutter 376 is controlled to move to the open position, and then it is determined whether or not a predetermined time period has elapsed since the shutter 376 was controlled to move to the open position. If it is determined that a predetermined time period has elapsed since the shutter 376 was controlled to move to the open position, the procedure advances to step #305, where closing control of the shutter 376 is performed.

Note that in the above-described third example, determination based on a "preliminary value" or a "predetermined value" is performed, but it is also possible that determination based on a "preliminary value" or a "predetermined value" is not performed in the third example.

FOURTH EXAMPLE

Hereinafter, a fourth example of the third embodiment will be described.

In the fourth example, instead of the third sensor 342 in the first to third examples, the load cell 335 is provided as a "weight measurement device" serving as an example of the "volume measurement unit". Note that the fourth example is the same as the first to third examples except for the features that will be described below.

The load cell 335 that measures the weight of grain retained in the grain tank 316 is provided as a volume measurement unit for detecting the retention volume of the grain retained in the grain tank 316, and the retention volume of the grain retained in the grain tank 316 is fixed based on the detection result of the load cell 335. In this case, as shown in the block diagram of FIG. 27, the ECU 320 includes a calculation unit 493 and another determination unit 490, instead of the determination unit 390. The calculation unit 493 is connected to the quality sensor 350 and the load cell 335. The calculation unit 493 is configured to calculate the retention volume of grain in the grain tank 316, based on a moisture value input from the quality sensor 350 and a weight value input from the load cell 335, and to output the calculated retention volume to the determination unit 490. The determination unit 490 determines whether or not the retention volume input from the calculation unit 493 exceeds a "preliminary value" and a "predetermined value". The determination unit 490 is connected to the calculation unit 493 and the control unit 392. If the retention volume input from the calculation unit 493 exceeds a "preliminary value" and a "predetermined value", the determination unit 490 outputs a "preliminary value reaching signal" and a "predetermined value reaching signal" to the control unit 392.

Other Examples of Third Embodiment (3-1) The foregoing first to fourth examples show an example of the proximity sensor 375 serving as a requisite amount measurement unit, but the present invention is not limited to this, and another requisite amount measurement unit capable of detecting grain such as a contactless type sensor may be used.

Figure 28:
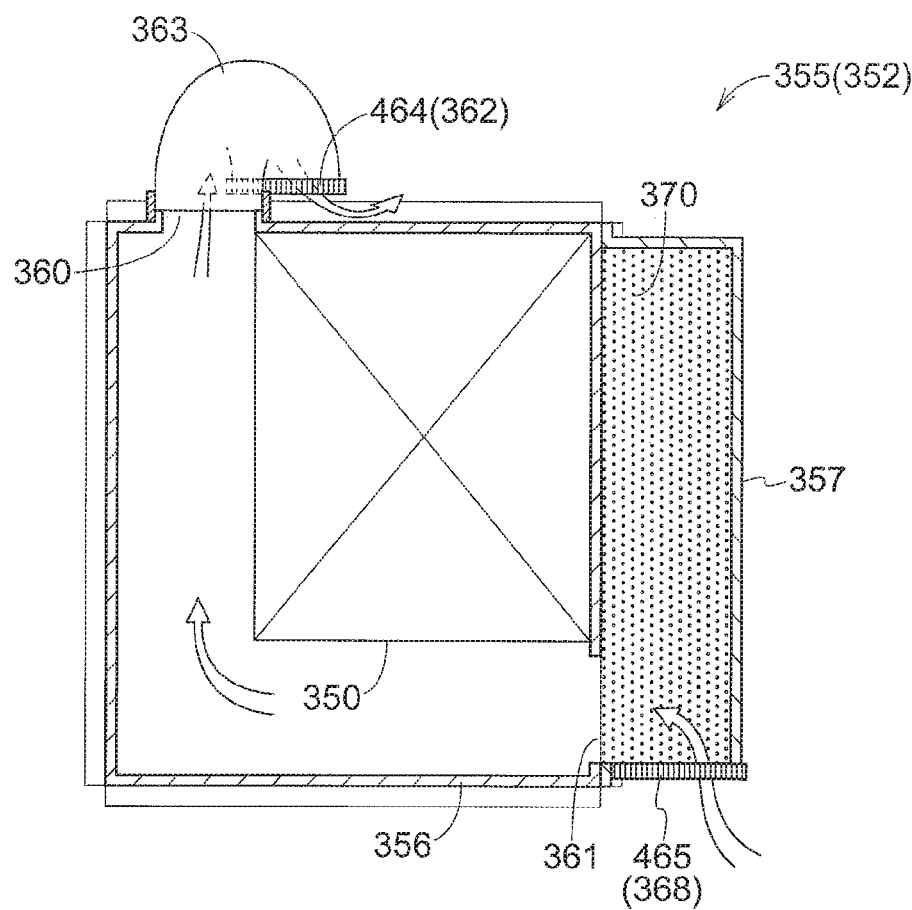
FIG. 28 is a partially cut-out rear cross-sectional view schematically illustrating the structure of a quality measurement device according to another example of the third embodiment.
Figure 29:
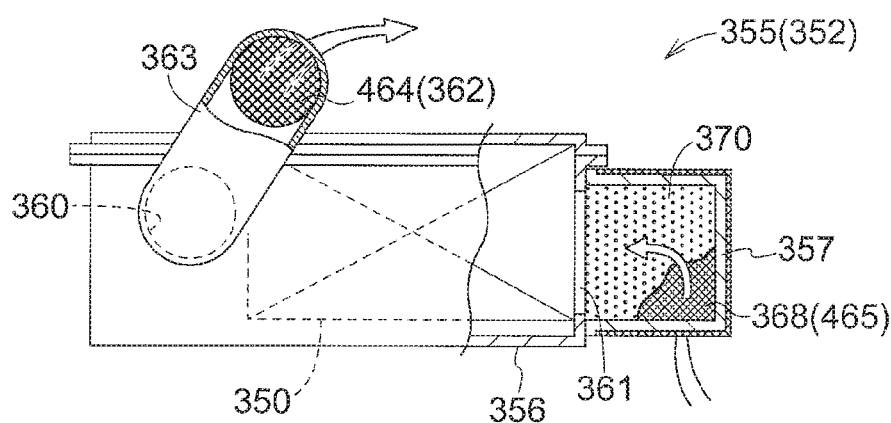
FIG. 29 is a partially cut-out planer cross-sectional view schematically illustrating the structure of a quality measurement device according to another example of the third embodiment.

(3-2) The foregoing first to fourth examples show an example in which the exhaust-side net body 364 is fitted in the exhaust opening 360 and the intake-side net body 365 is mounted to the introduction opening 361, but the present invention is not limited to this. For example, it is also possible that, as shown in FIGS. 28 and 29, an exhaust-side net body 464 is fitted in the front end hole 362 of the guide pipe 363 and an intake-side net body 465 is fitted in the intake opening 368 of the filter case 357. In this case, the exhaust-side net body 464 and the intake-side net body 465 prevent water and dust from entering the main case 356, when washing of the combine 310 or the like is performed, for example.

(3-3) The foregoing first to fourth examples show an example in which the shutter 376 is pushed upward by the switching mechanism 380 driven by the motor 378 and changes its position from the open position to the closed position, but the present invention is not limited to this. For example, a configuration may be used in which there is no switching mechanism 380, and the shutter 376 is directly subjected to opening/closing control by driving of the motor 378.

(3-4) The foregoing first to fourth examples show an example in which the discharge count ensuring section E is provided below and adjacent to the shutter 376, but the present invention is not limited to this. For example, a configuration is also possible in which the discharge count ensuring section E is not included, and the lower part of the shutter 376 is directly in communication with the internal space M of the grain tank 316. In this case, it is preferable that instead of using a "preliminary value", a "predetermined value" be directly measured by a level measurement device such as the third sensor 342 or a weight measurement device such as the load cell 335.

(3-5) The foregoing first to fourth examples show an example in which grain retained in the grain tank 316 is discharged by the discharge auger 332 from the rear of the grain tank 316, but the present invention is not limited to this. For example, grain retained in the grain tank 316 may be discharged from the side, the front, or the like of the grain tank 316. Furthermore, an example is taken in which the temporary retaining section T is provided in the front portion of the grain tank 316, but the temporary retaining section T may be provided in the center or the rear portion of the grain tank 316.

(3-6) The foregoing third embodiment show an example of a culm-head feeding type combine, but the present invention is not limited to this and another combine such as a whole-culm charging type combine may be used. The foregoing third embodiment shows an example of a crawler traveling type combine, but the present invention is not limited to this and another combine such as a wheel type combine may be used.

DESCRIPTION OF REFERENCE SIGNS

First Embodiment

10: Combine
11: Traveling machine body
12: Crawler traveling device
13: Reaper unit
14: Threshing device
15: Grain tank
16: Unloader
19: Left/right tilt sensor (left/right tilt angle detection unit)
20: Front/rear tilt sensor (front/rear tilt angle detection unit)
23: First hydraulic cylinder (left/right orientation change unit, front/rear orientation change unit)
27: Second hydraulic cylinder (left/right orientation change unit, front/rear orientation change unit)
29: Third hydraulic cylinder (left/right orientation change unit, front/rear orientation change unit)
31: Fourth hydraulic cylinder (left/right orientation change unit, front/rear orientation change unit)
33: Vehicle speed sensor
35: Root sensor (grain culm sensor)
36: Reaping height sensor
37: Threshing clutch
38 : Discharge auger
39: Load cell (weight measurement unit)
40: Longitudinal auger
41: Transverse auger
42: Auger receiver
46: Motor (pivot driving unit)
47: Swing cylinder (vertical swing driving unit)
66: Measurement switch (measurement instruction unit)
71: Working state determination unit
72: Orientation determination unit 73: Accommodation detection unit
75: Weight measurement decision unit (control unit)

Second Embodiment

110: Combine
113: Reaper unit
114: Threshing unit
115: Grain tank
127: Quality sensor
128: Weight sensor (measurement sensor)
135: Level sensor
145: Display (display unit)
151: Calculation unit
152: Determination unit
153: Communication unit
154: Change unit
156: Notification unit
160: External server Third Embodiment 310: Combine
315: Threshing device
316: Grain tank
332: Discharge auger
333: Discharge clutch
335: Load cell (weight measurement device)
342: Third sensor (level measurement device)
350: Quality sensor (quality measurement unit)
372: Take-in port
373: Discharge port
375: Proximity sensor (requisite amount measurement unit)
376: Shutter
390: Determination unit
392: Control unit
490: Determination unit
E: Discharge count ensuring section
M: Internal space
T: Temporary retention unit

The invention claimed is:

1. A combine comprising:
a grain tank that retains grain conveyed from a threshing device;
a discharge auger that is provided on the bottom of the grain tank, and discharges the grain retained in the grain tank to the outside;
a temporary retention unit that is provided within the grain tank, has a take-in port, and temporarily retains part of the grain conveyed from the threshing device, the part of the grain being taken in from the take-in port;
a quality measurement unit that detects quality of the grain retained in the temporary retention unit;
a discharge port that is formed in the temporary retention unit and is capable of discharging the retained grain into the grain tank;
a shutter whose position can be changed between an open position at which the discharge port is opened and a closed position at which the discharge port is closed;
a control unit that performs opening/closing control in which the shutter is moved to the open position when the measurement by the quality measurement unit is completed, and the shutter is moved to the closed position when all of the grain in the temporary retention unit is discharged into the grain tank;
a volume measurement unit that detects the retention volume of the grain retained in the grain tank; and
a determination unit that determines whether the retention volume of the grain retained in the grain tank exceeds a predetermined value,
wherein if it is determined by the determination unit that the retention volume exceeds the predetermined value, the control unit stops the opening/closing control.

2. The combine according to claim 1, wherein if it is determined by the determination unit that the retention volume exceeds the predetermined value, the control unit does not control the shutter to move to the open position even when the measurement by the quality measurement unit is completed.

3. The combine according to claim 1, wherein a discharge count ensuring section whose side portion is separated from the internal space of the grain tank and whose lower portion is in communication with the internal space is provided below and adjacent to the shutter, the discharge count ensuring section being in communication with the temporary retention unit via the discharge port.

4. The combine according to claim 3,
wherein if it is detected by the volume measurement unit that the retention volume exceeds a preliminary value, which is a value lower than the predetermined value, and after the detection, the number of times that the shutter is opened exceeds a predetermined number of times, the determination unit determines that the retention volume exceeds the predetermined value.

5. The combine according to claim 3,
wherein if it is detected by the volume measurement unit that the retention volume exceeds a preliminary value, which is a value lower than the predetermined value, and a predetermined time period has elapsed since the detection, the determination unit determines that the retention volume exceeds the predetermined value.

6. The combine according to claim 1, comprising:
a discharge clutch that switches on/off driving power transmission to the discharge auger,
wherein when the discharge clutch is switched on after the opening/closing control is stopped, the control unit restarts the opening/closing control.

7. The combine according to claim 1, comprising:
a requisite amount measurement unit that detects whether or not the amount of grain needed for the measurement by the quality measurement unit is retained in the temporary retention unit,
wherein in the opening/closing control, if a state in which the amount of grain needed for the quality measurement unit is not retained in the temporary retention unit continues for a predetermined time period after the shutter is moved to the open position, the control unit controls the shutter to move to the closed position.

8. The combine according to claim 1, comprising:
a level measurement device that detects a retention level of the grain in the grain tank, the level measurement device serving as the volume measurement unit that detects the retention volume,
wherein the retention volume is determined based on a detection result of the level measurement device.

9. The combine according to claim 1, comprising:
a weight measurement device that performs weight measurement on the grain retained in the grain tank, the weight measurement device serving as the volume measurement unit that detects the retention volume,
wherein the retention volume is determined based on a detection result of the weight measurement device.

10. The combine according to claim 1,
wherein the grain retained in the grain tank is discharged from the rear portion of the grain tank by the discharge auger, and
the temporary retention unit is provided in the front portion of the grain tank.

\* \* \* \* \*